US011457497B2

(12) United States Patent
Wang et al.

(10) Patent No.: US 11,457,497 B2
(45) Date of Patent: Sep. 27, 2022

(54) CONNECTION REESTABLISHMENT METHOD AND APPARATUS

(71) Applicant: Huawei Technologies Co., Ltd., Shenzhen (CN)

(72) Inventors: Rui Wang, Shanghai (CN); Mingzeng Dai, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 17/061,167

(22) Filed: Oct. 1, 2020

(65) Prior Publication Data

US 2021/0022198 A1    Jan. 21, 2021

Related U.S. Application Data

(63) Continuation of application No. PCT/CN2019/081546, filed on Apr. 4, 2019.

(30) Foreign Application Priority Data

Apr. 4, 2018   (CN) .......................... 201810301277.6

(51) Int. Cl.
  *H04W 4/00* (2018.01)
  *H04W 76/19* (2018.01)
  *H04W 36/14* (2009.01)

(52) U.S. Cl.
  CPC ........... *H04W 76/19* (2018.02); *H04W 36/14* (2013.01)

(58) Field of Classification Search
  CPC . H04W 76/19; H04W 36/14; H04W 36/0079; H04W 76/30; H04W 36/0011

USPC .......................................... 370/331; 455/312
See application file for complete search history.

(56) References Cited

U.S. PATENT DOCUMENTS

| 2003/0162529 | A1  | 8/2003  | Noblins |
| 2011/0299486 | A1  | 12/2011 | Wu |
| 2016/0269952 | A1  | 9/2016  | Moon et al. |
| 2017/0071021 | A1* | 3/2017  | Jin .......................... H04W 76/27 |
| 2018/0092156 | A1* | 3/2018  | Kim ................... H04W 72/1273 |

(Continued)

FOREIGN PATENT DOCUMENTS

| CN | 102271413 A | 12/2011 |
| CN | 103428793 A | 12/2013 |

(Continued)

OTHER PUBLICATIONS

Huawei et al., "Message content in inter-RAT handover", 3GPP TSG-RAN2 Meeting #101, R2-1802480, Athens, Greece, Feb. 26-Mar. 2, 2018, 3 pages.

(Continued)

*Primary Examiner* — Marcos Batista
(74) *Attorney, Agent, or Firm* — Slater Matsil, LLP

(57) ABSTRACT

A method applied to an application scenario in which the terminal device initiates connection reestablishment, comprises: selecting a first cell; when a radio access technology (RAT) of the first cell is the same as a RAT of a source cell, sending, a first message to a reselected radio access network device, and receiving a second message from the reselected radio access network device, wherein the second message is used to indicate the terminal device to establish a connection to the reselected radio access network device.

15 Claims, 28 Drawing Sheets

(56) References Cited

U.S. PATENT DOCUMENTS

2019/0053135 A1    2/2019  Hahn et al.
2019/0174571 A1*   6/2019  Deenoo ................ H04W 76/11

FOREIGN PATENT DOCUMENTS

| CN | 106961748 A   | 7/2017  |
|----|---------------|---------|
| CN | 107277868 A   | 10/2017 |
| CN | 107734573 A   | 2/2018  |
| JP | 2017103536 A  | 6/2017  |
| KR | 20110039378 A | 4/2011  |
| WO | 2017047831 A1 | 3/2017  |
| WO | 2017119247 A1 | 7/2017  |
| WO | 2018006017 A1 | 1/2018  |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.1.0 (Mar. 2018), 786 pages.

3rd Generation Partnership Project; Technical Specification Group Core Network and Terminals; 5G System Phase 1; CT WG1 Aspects (Release 15), 3GPP TR 24.890 V15.1.0 (Mar. 2018), 309 pages.

3rd Generation Partnership Project; Technical Specification Group Radio Access Network; Evolved Universal Terrestrial Radio Access (E-UTRA); User Equipment (UE) procedures in idle mode (Release 14), 3GPP TS 36.304 714.6.0 (Mar. 2018), 50 pages.

* cited by examiner

CONNECTION REESTABLISHMENT METHOD AND APPARATUS

CROSS-REFERENCE TO RELATED APPLICATIONS

This application is a continuation of International Application No. PCT/CN2019/081546, filed on Apr. 4, 2019, which claims priority to Chinese Patent Application No. 201810301277.6, filed on Apr. 4, 2018. The disclosures of the aforementioned applications are hereby incorporated by reference in their entireties.

TECHNICAL FIELD

Embodiments of this application relate to the field of communications technologies, and in particular, to a connection reestablishment method and apparatus.

BACKGROUND

Currently, a method for triggering radio resource control (RRC) connection reestablishment after a terminal device fails to be handed over is specified in the 3rd generation partnership project (3GPP) TS36.331 communication protocol. The method is as follows: When a RAT of a cell selected by a terminal device for reestablishment (referred to as a first cell for short) is the same as a RAT of a source cell, the terminal device sends an RRC connection reestablishment request message to a base station that serves the first cell, to resume an RRC connection to the terminal device. When a RAT of a first cell is different from a RAT of a source cell, the terminal device enters an idle mode.

However, the foregoing connection reestablishment method is not applicable to a 5G system.

SUMMARY

Embodiments of this application provide a connection reestablishment method and apparatus, to implement connection reestablishment for a terminal device in a 5G system, and effectively increase a probability of resuming an RRC connection by the terminal device.

To achieve the foregoing objectives, the following technical solutions are used in the embodiments of this application:

According to a first aspect, a connection reestablishment method is provided. The terminal device selects a first cell. When a RAT of the first cell is different from a RAT of a source cell and the first cell is not a first-type cell, the terminal device leaves a connected mode, and sends a connection release cause value to an upper layer, where the connection release cause value includes at least one of a handover failure, a type of the first cell, a core network type corresponding to the first cell, the RAT of the first cell, whether the first cell is connected to a source core network, a non-access stratum NAS resume indication, a NAS change, and a core network type change, the connection release cause value is used to indicate the upper layer to determine whether to change a type of a core network connected to the terminal device, the first-type cell is a cell connected to the source core network, and the source core network is a core network accessed in the source cell by the terminal device.

It can be learned that, in this application, after selecting the first cell, the terminal device further determines, after determining that the RAT of the first cell is different from the RAT of the source cell, whether the first cell is a first-type cell. When the RAT of the first cell is different from the RAT of the source cell, and the first cell is not a first-type cell, the terminal device leaves the connected mode, thereby effectively increasing a probability of resuming an RRC connection by the terminal device. When leaving the connected mode, the terminal device further sends the connection release cause value to the upper layer, so that the upper layer determines whether to change the type of the core network connected to the terminal device, to increase a probability of resuming an RRC connection by the terminal device.

According to a second aspect, a connection reestablishment method is provided. The terminal device selects a first cell. When a RAT of the first cell is the same as a RAT of a source cell, or when a RAT of the first cell is different from a RAT of a source cell and the first cell is a first-type cell, the terminal device sends a first message to a reselected radio access network device, where the first message is used to request to reestablish a radio resource control RRC connection between the terminal device and an access network, the reselected radio access network device is a radio access network device to which the first cell belongs, the first-type cell is a cell connected to a source core network, and the source core network is a core network accessed in the source cell by the terminal device. The terminal device receives a second message sent by the reselected radio access network device, where the second message is used to indicate the terminal device to establish a connection to a target radio access network device.

It can be learned that in the connection reestablishment method provided in this application, even if the RAT of the first cell is different from the RAT of the source cell, the terminal device still determines whether the first cell is a first-type cell. When the first cell is a first-type cell, a radio access network device (namely, the reselected radio access network device) to which the first cell belongs can obtain a context of the terminal device, and can resume an RRC connection to the terminal device. Correspondingly, when the RAT of the first cell is different from the RAT of the source cell, and the first cell is a first-type cell, the terminal device sends the first message to the reselected radio access network device.

Optionally, in a possible implementation of this application, before sending the first message to the reselected radio access network device, the terminal device further retains a security configuration used in the source cell, where the security configuration includes at least one of an RRC integrity protection key and an RRC integrity protection algorithm.

Optionally, in another possible implementation of this application, before sending the first message to the target radio access network device, the terminal device further resets a media access control MAC entity; releases a MAC configuration; releases/reestablishes/retains a source service data adaptation protocol SDAP entity corresponding to a data radio bearer DRB; releases/reestablishes/retains a source RLC entity corresponding to an SRB; releases/reestablishes/retains a source RLC entity corresponding to the DRB; releases/reestablishes/retains a source PDCP entity corresponding to the SRB; and releases/reestablishes/retains a source PDCP entity corresponding to the DRB.

Optionally, in another possible implementation of this application, after receiving the second message sent by the reselected radio access network device, when the terminal device has released a source PDCP entity of a first signaling radio bearer SRB 1, and the second message includes first configuration information, the terminal device establishes a new PDCP entity of the SRB 1 based on the first configuration information. Alternatively, after receiving the second message sent by the reselected radio access network device, when the terminal device has released a source PDCP entity of a first signaling radio bearer SRB 1, and the second message does not include first configuration information, the terminal device establishes a new PDCP entity of the SRB 1 based on first preset configuration information. Alternatively, after receiving the second message sent by the reselected radio access network device, when the terminal device has retained a source PDCP entity of a first signaling radio bearer SRB 1, the terminal device reestablishes the PDCP entity of the SRB 1. Alternatively, after receiving the second message sent by the reselected radio access network device, when the terminal device has retained a source PDCP entity of a first signaling radio bearer SRB 1, the terminal device establishes a new PDCP entity of the SRB 1 after releasing the source PDCP entity of the SRB 1. Alternatively, after receiving the second message sent by the reselected radio access network device, when the terminal device has reestablished an NR PDCP entity of a first signaling radio bearer SRB 1, the terminal device applies the NR PDCP entity of the SRB 1.

Optionally, in another possible implementation of this application, alternatively, after receiving the second message sent by the reselected radio access network device, when the terminal device has released a source RLC entity of the first signaling radio bearer SRB 1, and the second message includes second configuration information, the terminal device establishes a new RLC entity of the SRB 1 based on the second configuration information. Alternatively, after receiving the second message sent by the reselected radio access network device, when the terminal device has released a source RLC entity of the first signaling radio bearer SRB 1, and the second message does not include second configuration information, the terminal device establishes a new RLC entity of the SRB 1 based on second preset configuration information. Alternatively, after receiving the second message sent by the reselected radio access network device, when the terminal device has retained a source RLC entity of the first signaling radio bearer SRB 1, the terminal device releases the source RLC entity of the SRB 1, and establishes a new RLC entity of the SRB 1.

Optionally, in another possible implementation of this application, the terminal device further receives a third message sent by the reselected radio access network device, where the third message includes configuration information of a radio bearer RB, and the RB includes at least one of a second signaling radio bearer SRB 2 and the DRB. Subsequently, when the terminal device has released a source PDCP entity of the RB, and the configuration information of the RB includes third configuration information, the terminal device establishes a new PDCP entity of the RB based on the third configuration information. Alternatively, when the terminal device has released a source PDCP entity of the RB, and the third message does not include third configuration information, the terminal device establishes a new source PDCP entity of the RB based on third preset configuration information. Alternatively, when the terminal device has reestablished a source PDCP entity of the RB, the terminal device applies the source PDCP entity of the RB. Alternatively, when the terminal device has retained a source PDCP entity of the RB, the terminal device reestablishes the source PDCP entity of the RB. Alternatively, when the terminal device has retained a source PDCP entity of the RB, the terminal device releases the source PDCP entity of the RB, and reestablishes the PDCP entity of the RB.

Optionally, in another possible implementation of this application, after the terminal device receives the third message sent by the reselected radio access network device, when the terminal device has released a source RLC entity of the RB, and the configuration information of the RB includes fourth configuration information, the terminal device establishes a new RLC entity of the RB based on the fourth configuration information; or when the terminal device has released a source RLC entity of the RB, and the configuration information of the RB does not include fourth configuration information, the terminal device establishes a new RLC entity of the RB based on fourth preset configuration information; or when the terminal device has retained a source RLC entity of the RB, the terminal device releases the source RLC entity of the RB, and establishes a new RLC entity of the RB.

Optionally, in another possible implementation of this application, when the source core network is a 5th generation core network 5GC and the RB includes the DRB, when the terminal device has released the source SDAP entity of the DRB, and the configuration information of the RB includes fifth configuration information, the terminal device establishes a new SDAP entity of the DRB based on the fifth configuration information; or when the terminal device has retained the source SDAP entity of the DRB, the terminal device releases the source SDAP entity of the DRB, and establishes a new SDAP entity of the DRB; or when the terminal device has retained the source SDAP entity of the DRB, the terminal device reestablishes the SDAP entity of the DRB.

Regardless of an entity, after receiving the third message, the terminal device configures the entity by using configuration information corresponding to a configuration performed by the terminal device before the terminal device sends the first message.

Optionally, in any one of the first aspect, the second aspect, and the possible implementations of the second aspect, before the terminal device sends the first message to the reselected radio access network device, when the RAT of the first cell is the same as the RAT of the source cell, the terminal device further determines that the first cell is connected to the source core network.

In a 5G system, in a scenario in which the RAT of the first cell is the same as the RAT of the source cell, the first cell may be connected to the source core network, or may not be connected to the source core network. When the first cell is not connected to the source core network, the RRC connection to the terminal device cannot be resumed. Therefore, after determining that the RAT of the first cell is the same as the RAT of the source cell, the terminal device further determines whether the first cell is connected to the source core network, thereby effectively increasing a probability of resuming an RRC connection by the terminal, and reducing signaling exchange.

Optionally, in any one of the first aspect, the second aspect, and the possible implementations of the second aspect, when the RAT of the first cell is the same as the RAT of the source cell, and the first cell is not connected to the source core network, the terminal device leaves a connected mode, and sends a connection release cause value to an upper layer, where the connection release cause value includes at least one of a handover failure, a type of the first cell, the RAT of the first cell, a core network type corresponding to the first cell, whether the first cell is connected to a source core network, a non-access stratum NAS resume indication, a NAS change, and a core network type change.

It can be learned from the foregoing description that if the first cell is not connected to the source core network, the reselected radio access network device cannot obtain the context of the terminal. In this way, even if the RAT of the first cell is the same as the RAT of the source cell, the RRC connection to the terminal device cannot be resumed.

According to a third aspect, a connection reestablishment method is provided, and is applied to an application scenario in which a terminal device initiates connection reestablishment. Specifically, the terminal device selects a first cell; when a RAT of the first cell is the same as a RAT of a source cell, the terminal device sends a first message to a reselected radio access network device, where the first message is used to request to reestablish a radio resource control RRC connection between the terminal device and an access network, and the reselected radio access network device is a radio access network device to which the first cell belongs; and the terminal device receives a fourth message sent by the reselected radio access network device, where the fourth message is used to indicate that the reselected radio access network device rejects reestablishment of the RRC connection to the access network by the terminal device, the fourth message includes a reject cause value, and the reject cause value is used to indicate that the first cell is not connected to the source core network.

When the RAT of the first cell is the same as the RAT of the source cell, the terminal device may receive the fourth message sent by the reselected radio access network device, where the fourth message includes the reject cause value, and the reject cause value is used to indicate that the first cell is not connected to the source core network. The terminal device can determine, based on the reject cause value, whether to reselect a cell, to establish a connection between the terminal device and the access network.

Optionally, in any one of the first aspect, the second aspect, the third aspect, and the possible implementations of the second aspect, the terminal device may determine a to-be-selected cell connected to the source core network, as the first cell. In this way, behavior of the terminal device in a subsequent process is relatively simplified.

According to a fourth aspect, a connection reestablishment apparatus is provided, where the connection reestablishment apparatus is a terminal device. Specifically, the connection reestablishment apparatus includes a selection unit, a determining unit, a control unit, and a sending unit.

The selection unit is configured to select a first cell. The determining unit is configured to: determine whether a RAT of the first cell selected by the selection unit is the same as a RAT of a source cell; and determine whether the first cell is a first-type cell, where the first-type cell is a cell connected to a source core network, and the source core network is a core network accessed in the source cell by the terminal device. The control unit is configured to leave a connected mode when the determining unit determines that the RAT of the first cell is different from the RAT of the source cell and that the first cell is not a first-type cell. The sending unit is configured to: when the determining unit determines that the RAT of the first cell is different from the RAT of the source cell and that the first cell is not a first-type cell, send a connection release cause value to an upper layer, where the connection release cause value includes at least one of a handover failure, a type of the first cell, a core network type corresponding to the first cell, the RAT of the first cell, whether the first cell is connected to the source core network, a non-access stratum NAS resume indication, a NAS change, and a core network type change, and the connection release cause value is used to indicate the upper layer to determine whether to change a type of a core network connected to the terminal device.

According to a fifth aspect, a connection reestablishment apparatus is provided, where the connection reestablishment apparatus is a terminal device. Specifically, the connection reestablishment apparatus includes a selection unit, a determining unit, a sending unit, and a receiving unit.

Functions implemented by units and modules provided in this application are specifically as follows.

The selection unit is configured to select a first cell. The determining unit is configured to: determine whether a RAT of the first cell selected by the selection unit is the same as a RAT of a source cell; and determine whether the first cell is a first-type cell, where the first-type cell is a cell connected to a source core network, and the source core network is a core network accessed in the source cell by the terminal device. The sending unit is configured to: when the determining unit determines that the RAT of the first cell is the same as the RAT of the source cell, or when the determining unit determines that the RAT of the first cell is different from the RAT of the source cell and that the first cell is a first-type cell, send a first message to a reselected radio access network device, where the first message is used to request to reestablish a radio resource control RRC connection between the terminal device and an access network, and the reselected radio access network device is a radio access network device to which the first cell belongs. The receiving unit is configured to receive a second message sent by the reselected radio access network device, where the second message is used to indicate the terminal device to establish a connection to a target radio access network device.

Optionally, in a possible implementation of this application, the connection reestablishment apparatus in this application further includes a configuration unit. The configuration unit is configured to: before the sending unit sends the first message to the reselected radio access network device, retain a security configuration used in the source cell, where the security configuration includes at least one of an RRC integrity protection key and an RRC integrity protection algorithm.

Optionally, in another possible implementation of this application, the configuration unit is further configured to: before the sending unit sends the first message to the target radio access network device, reset a media access control MAC entity; release a MAC configuration; release/reestablish/retain a source service data adaptation protocol SDAP entity corresponding to a data radio bearer DRB; release/reestablish/retain a source RLC entity corresponding to an SRB; release/reestablish/retain a source RLC entity corresponding to the DRB; release/reestablish/retain a source PDCP entity corresponding to the SRB; and release/reestablish/retain a source PDCP entity corresponding to the DRB.

Optionally, in another possible implementation of this application, the configuration unit is further configured to: after the receiving unit receives the second message sent by the reselected radio access network device, when a source PDCP entity of a first signaling radio bearer SRB 1 has been released, and the second message includes first configuration information, establish a new PDCP entity of the SRB 1 based on first preset configuration information; or when a source PDCP entity of a first signaling radio bearer SRB 1 has been released, and the second message does not include first configuration information, establish a new PDCP entity of the SRB 1 based on first preset configuration information;

or when a source PDCP entity of a first signaling radio bearer SRB 1 has been retained, reestablish the PDCP entity of the SRB 1; or when a source PDCP entity of a first signaling radio bearer SRB 1 has been retained, establish a new PDCP entity of the SRB 1 after the source PDCP entity of the SRB 1 is released; or when an NR PDCP entity of a first signaling radio bearer SRB 1 has been reestablished, apply the NR PDCP entity of the SRB 1.

Optionally, in another possible implementation of this application, the configuration unit is further configured to: after the receiving unit receives the second message sent by the reselected radio access network device, when a source RLC entity of the first signaling radio bearer SRB 1 has been released, and the second message includes second configuration information, establish a new RLC entity of the SRB 1 based on the second configuration information; or when a source RLC entity of the first signaling radio bearer SRB 1 has been released, and the second message does not include second configuration information, establish a new RLC entity of the SRB 1 based on second preset configuration information; or when a source RLC entity of the first signaling radio bearer SRB 1 has been retained, release the source RLC entity of the SRB 1, and establish a new RLC entity of the SRB 1.

Optionally, in another possible implementation of this application, the receiving unit is further configured to receive a third message sent by the reselected radio access network device, where the third message includes configuration information of a radio bearer RB, and the RB includes at least one of a second signaling radio bearer SRB 2 and the DRB. The configuration unit is further configured to: when a source PDCP entity of the RB has been released, and the configuration information of the RB includes third configuration information, establish a new PDCP entity of the RB based on the third configuration information; or when a source PDCP entity of the RB has been released, and the third message does not include third configuration information, establish a new source PDCP entity of the RB based on third preset configuration information; or when a source PDCP entity of the RB has been reestablished, apply the source PDCP entity of the RB; or when a source PDCP entity of the RB has been retained, reestablish the source PDCP entity of the RB; or when a source PDCP entity of the RB has been retained, release the source PDCP entity of the RB, and reestablish the PDCP entity of the RB.

Optionally, in another possible implementation of this application, the configuration unit is further configured to: when a source RLC entity of the RB has been released, and the configuration information of the RB includes fourth configuration information, establish a new RLC entity of the RB based on the fourth configuration information; or when a source RLC entity of the RB has been released, and the configuration information of the RB does not include fourth configuration information, establish a new RLC entity of the RB based on fourth preset configuration information; or when a source RLC entity of the RB has been retained, release the source RLC entity of the RB, and establish a new RLC entity of the RB.

Optionally, in another possible implementation of this application, when the source core network is a 5th generation core network 5GC and the RB includes the DRB, the configuration unit is further configured to: when the source SDAP entity of the DRB has been released, and the configuration information of the RB includes fifth configuration information, establish a new SDAP entity of the DRB based on the fifth configuration information; or when the source SDAP entity of the DRB has been retained, release the source SDAP entity of the DRB, and establish a new SDAP entity of the DRB; or when the terminal device has retained the source SDAP entity of the DRB, reestablish, by the terminal device, the SDAP entity of the DRB.

Optionally, in any one of the fourth aspect, the fifth aspect, and the possible implementations of the fifth aspect, the determining unit is further configured to: before the sending unit sends the first message to the reselected radio access network device, when the RAT of the first cell is the same as the RAT of the source cell, determine that the first cell is connected to the source core network.

Optionally, in any one of the fourth aspect, the fifth aspect, and the possible implementations of the fifth aspect, the determining unit is further configured to: before the sending unit sends the first message to the reselected radio access network device, when the RAT of the first cell is the same as the RAT of the source cell, determine that the first cell is not connected to the source core network. In this scenario, the connection reestablishment apparatus in this application further includes a control unit. The control unit is configured to leave a connected mode when the determining unit determines that the RAT of the first cell is the same as the RAT of the source cell and that the first cell is not connected to the source core network. The sending unit is further configured to: when the determining unit determines that the RAT of the first cell is the same as the RAT of the source cell and that the first cell is not connected to the source core network, send a connection release cause value to an upper layer, where the connection release cause value includes at least one of a handover failure, a type of the first cell, the RAT of the first cell, a core network type corresponding to the first cell, whether the first cell is connected to a source core network, a non-access stratum NAS resume indication, a NAS change, and a core network type change.

According to a sixth aspect, a connection reestablishment apparatus is provided, where the connection reestablishment apparatus is a terminal device. The connection reestablishment apparatus includes a selection unit, a determining unit, a sending unit, and a receiving unit.

Specifically, the selection unit is configured to select a first cell. The determining unit is configured to determine whether a RAT of the first cell selected by the selection unit is the same as a RAT of a source cell. The sending unit is configured to: when the determining unit determines that the RAT of the first cell is the same as the RAT of the source cell, send a first message to a reselected radio access network device. The receiving unit is further configured to receive a fourth message sent by the reselected radio access network device, where the fourth message is used to indicate that the reselected radio access network device rejects reestablishment of an RRC connection to the access network by the terminal device, the fourth message includes a reject cause value, and the reject cause value is used to indicate that the first cell is not connected to the source core network.

Optionally, in any one of the fourth aspect, the fifth aspect, the sixth aspect, and the possible implementations of the fifth aspect, the selection unit is specifically configured to determine a to-be-selected cell connected to the source core network, as the first cell.

According to a seventh aspect, a terminal device is provided. The terminal device includes one or more processors, a memory, and a communications interface. The memory and the communications interface are coupled to the one or more processors. The terminal device communicates with another device through the communications interface. The memory is configured to store computer program code. The computer program code includes an instruction. When the one or more processors execute the instruction, the terminal device performs the connection reestablishment methods according to the first aspect, the second aspect, the third aspect, and the possible implementations of the aspect.

According to an eighth aspect, a computer-readable storage medium is further provided. The computer-readable storage medium stores an instruction, and when the instruction is run on a terminal device, the terminal device is enabled to perform the connection reestablishment methods according to the first aspect, the second aspect, the third aspect, and the possible implementations of the aspects.

According to a ninth aspect, a computer program product including an instruction is further provided. When the computer program product runs on a terminal device, the terminal device is enabled to perform the connection reestablishment methods according to the first aspect, the second aspect, the third aspect, and the possible implementations of the aspects.

For detailed descriptions of the fourth aspect, the fifth aspect, the sixth aspect, the seventh aspect, the eighth aspect, the ninth aspect, and the implementations of the aspects, refer to the detailed descriptions of the first aspect, the second aspect, the third aspect, and the implementations of the aspects. In addition, for beneficial effects of the fourth aspect, the fifth aspect, the sixth aspect, the seventh aspect, the eighth aspect, the ninth aspect, and the implementations of the aspects, refer to the analysis on beneficial effects in the first aspect, the second aspect, the third aspect, and the implementations of the aspects. Details are not described herein again.

According to a tenth aspect, a connection reestablishment method is provided. A reselected radio access network device receives a first message sent in a first cell (where the first cell belongs to the reselected radio access network device) by a terminal device, where the first message is used to request to reestablish a radio resource control RRC connection between the terminal device and an access network. When the reselected radio access network device is connected to a source core network, the reselected radio access network device sends, in response to the first message, a fifth message to the terminal device, where the fifth message is used to indicate that the reselected radio access network device accepts reestablishment of the radio resource control RRC connection to the access network by the terminal device, the source core network is a core network accessed in a source cell by the terminal device, and the source cell is an original serving cell of the terminal device or a source cell existing before handover of the terminal device.

Optionally, in a possible implementation of this application, when a RAT of the first cell is evolved universal terrestrial radio access E-UTRA, and the first cell is connected to the source core network, the reselected radio access network device receives a handover request message sent by a source base station, where the handover request message is used to request to perform a process of terminal device handover for changing a core network, the handover request message includes a source context of the terminal device, the source context of the terminal device includes first security parameter information used to indicate the reselected radio access network device to check the terminal device, and the source base station is a base station to which the source cell belongs. Correspondingly, a method for "the reselected radio access network device sends, in response to the first message, a fifth message to the terminal device" is: checking, by the reselected radio access network device, the terminal device based on the first security parameter information; and determining, by the reselected radio access network device, to accept the reestablishment of the RRC connection to the access network by the terminal device, and sending the fifth message to the terminal device.

According to an eleventh aspect, a connection reestablishment method is provided. A reselected radio access network device receives a first message sent in a first cell (where the first cell belongs to the reselected radio access network device) by a terminal device, where the first message is used to request to reestablish a radio resource control RRC connection between the terminal device and an access network. When the reselected radio access network device is not connected to a source core network, the reselected radio access network device sends, in response to the first message, a fourth message to the terminal device, where the fourth message is used to indicate that the reselected radio access network device rejects reestablishment of the RRC connection to the access network by the terminal device, the fourth message includes a reject cause value, the reject cause value is used to indicate that the first cell is not connected to the source core network, the source core network is a core network accessed in a source cell by the terminal device, and the source cell is an original serving cell of the terminal device or a source cell existing before handover of the terminal device.

The reject cause value is used to indicate that the first cell is not connected to the source core network. In this way, after obtaining the reject cause value, the terminal device determines, based on the reject cause value, whether to reselect a cell, to establish a connection between the terminal device and the access network.

According to a twelfth aspect, a connection reestablishment apparatus is provided, where the connection reestablishment apparatus is a radio access network device. The connection reestablishment apparatus includes a receiving unit, a determining unit, and a sending unit.

Specifically, the receiving unit is configured to receive a first message sent in a first cell by a terminal device, where the first message is used to request to reestablish a radio resource control RRC connection between the terminal device and an access network, and the first cell belongs to the reselected radio access network device. The determining unit is configured to determine whether the apparatus is connected to a source core network, where the source core network is a core network accessed in a source cell by the terminal device, and the source cell is an original serving cell of the terminal device or a source cell existing before handover of the terminal device. The sending unit is configured to: when the determining unit determines that the apparatus is connected to the source core network, send, in response to the first message, a fifth message to the terminal device, where the fifth message is used to indicate that the reselected radio access network device accepts reestablishment of the radio resource control RRC connection to the access network by the terminal device.

Optionally, in a possible implementation of this application, The receiving unit is further configured to: when a RAT of the first cell is evolved universal terrestrial radio access E-UTRA, and the first cell is connected to the source core network, receive a handover request message sent by a source base station, where the handover request message is used to request to perform a process of terminal device handover for changing a core network, the handover request message includes a source context of the terminal device, the source context of the terminal device includes first security parameter information used to indicate the reselected radio access network device to check the terminal device, and the source base station is a base station to which the source cell belongs. The determining unit is further configured to: check the terminal device based on the first security parameter information, and determine to accept the reestablishment of the RRC connection to the access network by the terminal device. The sending unit is specifically configured to send the fifth message to the terminal device after the determining unit accepts the reestablishment of the RRC connection to the access network by the terminal device.

According to a thirteenth aspect, a connection reestablishment apparatus is provided, where the connection reestablishment apparatus is a radio access network device. The connection reestablishment apparatus includes a receiving unit, a determining unit, and a sending unit.

The receiving unit is configured to receive a first message sent by a terminal device, where the first message is used to request to reestablish a radio resource control RRC connection between the terminal device and an access network. The determining unit is configured to determine whether the radio access network device is connected to a source core network, where the source core network is a core network accessed in a source cell by the terminal device, and the source cell is an original serving cell of the terminal device or a source cell existing before handover of the terminal device. The sending unit is configured to: when the determining unit determines that the reselected radio access network device is not connected to the source core network, send, in response to the first message, a fourth message to the terminal device, where the fourth message is used to indicate that the reselected radio access network device rejects reestablishment of the RRC connection to the access network by the terminal device, the fourth message includes a reject cause value, and the reject cause value is used to indicate that a first cell is not connected to the source core network.

According to a fourteenth aspect, a radio access network device is provided. The radio access network device includes one or more processors, a memory, and a communications interface. The memory and the communications interface are coupled to the one or more processors. The radio access network device communicates with another device through the communications interface. The memory is configured to store computer program code. The computer program code includes an instruction. When the one or more processors execute the instruction, the radio access network device performs the connection reestablishment methods according to the tenth aspect, the eleventh aspect, and the possible implementations of the aspects.

According to a fifteenth aspect, a computer-readable storage medium is further provided. The computer-readable storage medium stores an instruction, and when the instruction is run on a radio access network device, the radio access network device is enabled to perform the connection reestablishment methods according to the tenth aspect, the eleventh aspect, and the possible implementations of the aspects.

According to a sixteenth aspect, a computer program product including an instruction is further provided. When the computer program product runs on a radio access network device, the radio access network device is enabled to perform the connection reestablishment methods according to the tenth aspect, the eleventh aspect, and the possible implementations of the aspects.

For detailed descriptions of the twelfth aspect, the thirteenth aspect, the fourteenth aspect, the fifteenth aspect, the sixteenth aspect, and the implementations of the aspects, refer to detailed descriptions of the tenth aspect, the eleventh aspect, and the implementations of the aspects. In addition, for beneficial effects of the twelfth aspect, the thirteenth aspect, the fourteenth aspect, the fifteenth aspect, the sixteenth aspect, and the implementations of the aspects, refer to the analysis on beneficial effects of the tenth aspect, the eleventh aspect, and the implementations of the aspects. Details are not described again herein.

In this application, a name of the connection reestablishment apparatus constitutes no limitation on devices or functional modules. During actual implementation, the devices or the functional modules may have other names. Provided that functions of the devices or the functional modules are similar to those in this application, the devices or the functional modules fall within the scope of the claims in this application and equivalent technologies thereof.

According to a seventeenth aspect, a chip is provided, where the chip may include one or more processors, a memory, and a communications bus. The memory is configured to store one or more computer instructions. The one or more processors are connected to the memory through the communications bus. When the chip runs, the one or more processors execute the one or more computer instructions stored in the memory, so that the chip performs the connection reestablishment method according to any one of the first aspect and the possible implementations of the first aspect, the second aspect and the possible implementations of the second aspect, or the third aspect and the possible implementations of the third aspect.

According to an eighteenth aspect, a chip is provided, where the chip may include one or more processors, a memory, and a communications bus. The memory is configured to store one or more computer instructions. The one or more processors are connected to the memory through the communications bus. When the chip runs, the one or more processors execute the one or more computer instructions stored in the memory, so that the chip performs the connection reestablishment method according to any one of the tenth aspect and the possible implementations of the tenth aspect, or the eleventh aspect and the possible implementations of the eleventh aspect.

The source cell is an evolved universal terrestrial radio access E-UTRA cell. Correspondingly, the source core network is a 5th generation core network 5GC, and the first-type cell is an NR cell. Alternatively, the source cell is a new radio NR cell. Correspondingly, the source core network is a 5GC, and the first-type cell is an E-UTRA cell.

These aspects or other aspects in this application are more concise and comprehensible in the following description.

DETAILED DESCRIPTION OF ILLUSTRATIVE EMBODIMENTS

In addition, in embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" is intended to present a relative concept in a specific manner.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions of the embodiments of this application, unless otherwise stated, "a plurality of" means two or more than two.

Mobility is a main feature of a wireless communications system, and is mainly implemented through cell reselection in idle mode and handover in connected mode. In connected mode, a signal strength contrast between cells constantly changes in a handover process due to complexity of multi-cell coverage in some areas. Consequently, there is a relatively high probability that handover fails. In a long term evolution (LTE) system, user equipment (UE) needs to use an RRC connection reestablishment procedure to ensure service continuity.

In the embodiments of this application, an evolved node base station (eNB) in an LTE system is referred to as an LTE eNB, and user equipment (UE) in the LTE system is referred to as LTE UE.

Figure 1:
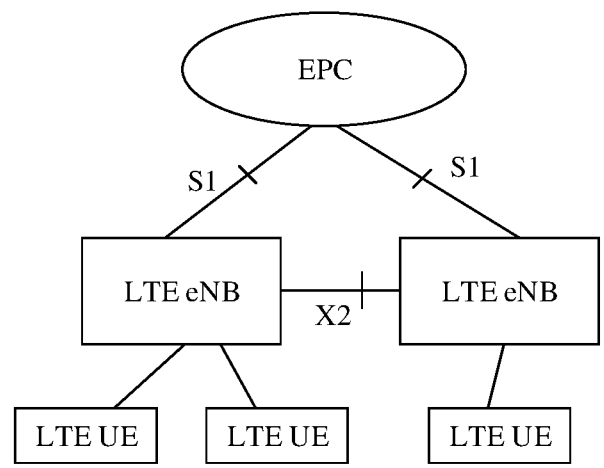
FIG. 1 shows a network architecture of a conventional LTE system.

In a conventional LTE system, an LTE eNB accesses an evolved packet core (EPC) network through an S1 interface, and different LTE eNBs are connected to each other through an X2 interface. Each LTE eNB is connected to at least one LTE UE. FIG. 1 shows a network architecture of a conventional LTE system. During actual application, a connection between the LTE eNB and the LTE UE is a wireless connection. To conveniently and intuitively represent a connection relationship between devices, solid lines are used for illustration in FIG. 1.

As communications technologies develop, the LTE eNB may evolve into a next generation LTE base station (ng-eNB). The ng-eNB provides a wireless transmission resource for UE by using an evolved universal terrestrial radio access (E-UTRA) technology. The ng-eNB may provide a 5th generation core network (5GCN) service for the UE, or may provide an EPC service for the UE. During actual deployment, the ng-eNB may be connected to only a 5GCN/EPC, or may be connected to both a 5GCN and an EPC. 5GCN may also be referred to as 5GC.

In the embodiments of this application, a cell in which the ng-eNB provides a 5GC service is referred to as an E-UTRA-5GC cell, and a cell in which the ng-eNB or the LTE eNB provides an EPC service is referred to as an E-UTRA-EPC cell.

When UE moves between two LTE cells, UE in connected mode (RRC Connected mode) triggers an intra-LTE-system handover procedure, and UE in idle mode (RRC Idle mode) triggers a cell reselection procedure. During the intra-LTE handover, a core network accessed by the UE does not change, and a radio access technology (RAT) does not change either. A source configuration used in a source cell by the UE is available in a cell of a same RAT, and both a base station that serves the source cell and a base station that serves a target cell have a context of the UE. When UE moves between an LTE cell and a cell of another RAT (for example, a third-generation communications technology (3G)/second-generation communications technology (2G)), UE in connected mode triggers an inter-radio-access-technology handover procedure, and UE in idle mode triggers a cell reselection procedure. During the inter-RAT handover, both a core network and a RAT change. A source configuration used in a source cell by the UE cannot be used in a cell of a different RAT, a base station that serves the source cell has a context, in a source core network, related to the UE, and a base station that serves a target cell has a context, in a target core network, related to the UE.

If the UE is unsuccessfully handed over, the UE may trigger an RRC connection reestablishment procedure. Correspondingly, the UE performs cell reselection. If a cell (referred to as a first cell) reselected by UE has a same RAT as a source cell, the UE sends an RRC connection reestablishment request message to a base station that serves the first cell. It can be learned from the foregoing description that, if the first cell and the source cell have a same RAT, and the base station that serves the first cell also has a context of the UE, after the UE sends the RRC connection reestablishment request message to the base station that serves the first cell, the base station can resume an RRC connection to the UE by performing security check on the UE. If the first cell and the source cell have different RATs, the UE leaves an RRC connected mode, in other words, the UE does not send an RRC connection reestablishment request message to a base station that serves the first cell.

An access network (RAN) in a 5G system is referred to as a next generation RAN (NG-RAN), and an NG-RAN node includes an ng-eNB and a gNB (base stations in the 5G system). The gNB provides a wireless transmission resource for a terminal device by using a new radio (NR) technology, and provides a 5GC service for the terminal device. In the embodiments of this application, UE in the 5G system is referred to as 5G UE, and a cell in which the gNB provides a 5GC service is referred to as an NR cell.

Figure 2:
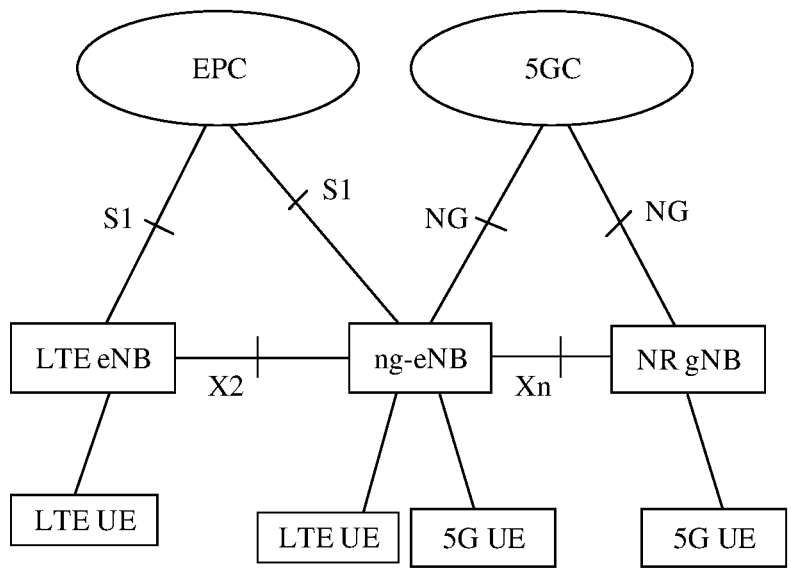
FIG. 2 is a schematic structural diagram of a network in which a 4G system and a 5G system coexist.

FIG. 2 shows a structure of a network in which a 4G system and a 5G system coexist. As shown in FIG. 2, an ng-eNB may access an EPC through an S1 interface, and may further access a 5GC through another corresponding interface (represented by NG in FIG. 2). 5G UE connected to the ng-eNB may access the 5GC via the ng-eNB. LTE UE connected to the ng-eNB may access the EPC via the ng-eNB. An LTE eNB is connected, through an X2 interface, to the ng-eNB connected to the EPC, and the ng-eNB is connected to an NR gNB through an Xn interface. Similarly, during actual application, connections between the foregoing plurality of devices and the UE may be wireless connections. To conveniently and intuitively represent connection relationships between devices, solid lines are used for illustration in FIG. 2.

When UE moves between an ng-eNB cell and an NR gNB cell, UE in connected mode triggers a handover procedure. The handover procedure includes an inter-core-network (inter-system inter-RAT) handover procedure and an intra-5G-system (intra-system inter-RAT) handover procedure. The inter-system intra-RAT handover may be handover of the UE between an E-UTRA-EPC cell and an E-UTRA-5GC cell. In this handover mode, a core network changes, but a RAT does not change. The intra-system inter-RAT handover may be handover of the UE between an E-UTRA-5GC cell and an NR cell. In this handover mode, a core network does not change, but a RAT changes.

In the network structure shown in FIG. 2, the UE has the following three handover scenarios:

1. Intra-5G-system inter-RAT (Intra 5GS inter-RAT) handover scenario: for example, handover between an E-UTRA-5GC cell and an NR cell.

2. Inter-system inter-RAT handover scenario: for example, handover between an E-UTRA-EPC cell and an NR cell, and handover between an LTE cell and an NR cell.

3. Inter-system intra-RAT handover scenario: for example, handover between an E-UTRA-EPC cell and an E-UTRA-5GC cell, and handover between an LTE cell and an E-UTRA-5GC cell.

In the foregoing intra 5GS inter-RAT handover scenario, an example in which the source cell is an E-UTRA-5GC cell and the first cell is an NR cell is used. The E-UTRA-5GC cell and the NR cell have different RATs. If an existing RRC connection reestablishment procedure is used, after determining that the RAT of the first cell is different from the RAT of the source cell, the UE leaves an RRC connected mode. However, considering that a core network does not change in the handover scenario, neither service data adaptation protocols (SDAP) nor PDCP types (both of which are NR PDCPs) in the source cell and the target cell change. Therefore, a quality of service (QoS)-related configuration, a data radio bearer (DRB) configuration, an SDAP configuration, and a packet data convergence protocol (PDCP) configuration of the UE may also be used in the first cell, thereby ensuring service/data continuity. In this case, the UE may resume an RRC connection by sending an RRC connection reestablishment request message.

In the foregoing inter system intra-RAT handover scenario, an example in which the source cell is an E-UTRA-EPC cell and the first cell is an E-UTRA-5GC cell is used. The E-UTRA-EPC cell and the E-UTRA-5GC cell have a same RAT. If an existing RRC connection reestablishment procedure is used, after determining that handover fails, the UE sends an RRC connection reestablishment request message to an ng-eNB that serves the E-UTRA-5GC cell. However, before the UE determines the first cell, the UE has reverted to (revert back to) a configuration used in the source cell by the UE (source configuration), and the source configuration cannot be used in the first cell. Therefore, even if the UE sends an RRC connection reestablishment request message to the ng-eNB, the UE will receive an RRC connection reestablishment reject message sent by the ng-eNB, resulting in a reestablishment failure.

It can be learned that an existing method for reestablishing an RRC connection after handover fails is not applicable to the 5G system.

To resolve this problem, the embodiments of this application provide a connection reestablishment method. When a RAT of a first cell selected by a terminal device is different from a RAT of a source cell, and the first cell is not a first-type cell, the terminal device leaves a connected mode, and sends a connection release cause value to an upper layer, to indicate the upper layer to determine whether to change a type of a core network connected to the terminal device. Herein, the first-type cell is a cell connected to a source core network. Alternatively, when a RAT of a first cell is different from a RAT of a source cell, and the first cell is a first-type cell, a terminal device sends, to a reselected base station, a first message used to request to reestablish an RRC connection between the terminal device and an access network. In the embodiments of this application, the terminal device determines, based on a determining result of "whether the RAT of the first cell is the same as the RAT of the source cell" and a determining result of "whether the first cell is a first-type cell", whether to send the first message to the reselected radio access network device, thereby effectively increasing a probability of resuming an RRC connection by the terminal device, and reducing signaling exchange.

The RRC connection reestablishment method provided in the embodiments of this application is applicable to an RRC connection reestablishment process in a handover failure scenario, and, in addition to the RRC connection reestablishment process in the handover failure scenario, is also applicable to another RRC connection reestablishment process, for example, an RRC connection reestablishment procedure triggered by a radio link failure, an RRC reconfiguration failure, an integrity check failure, or another event.

The connection reestablishment method provided in the embodiments of this application is applicable to the communications system shown in FIG. 2. With reference to FIG. 2, in the embodiments of this application, a source radio access network device and a reselected radio access network device each may be an LTE eNB, an ng-eNB, or an NR gNB, and the terminal device may be NR UE.

The terminal device in the embodiments of this application may be a mobile phone (a mobile phone 300 shown in FIG. 3), a tablet computer, a personal computer (PC), a personal digital assistant (PDA), a smartwatch, a netbook, a wearable electronic device, or the like, and the embodiments of this application do not impose any special limitation on a specific form of the device.

Figure 3:
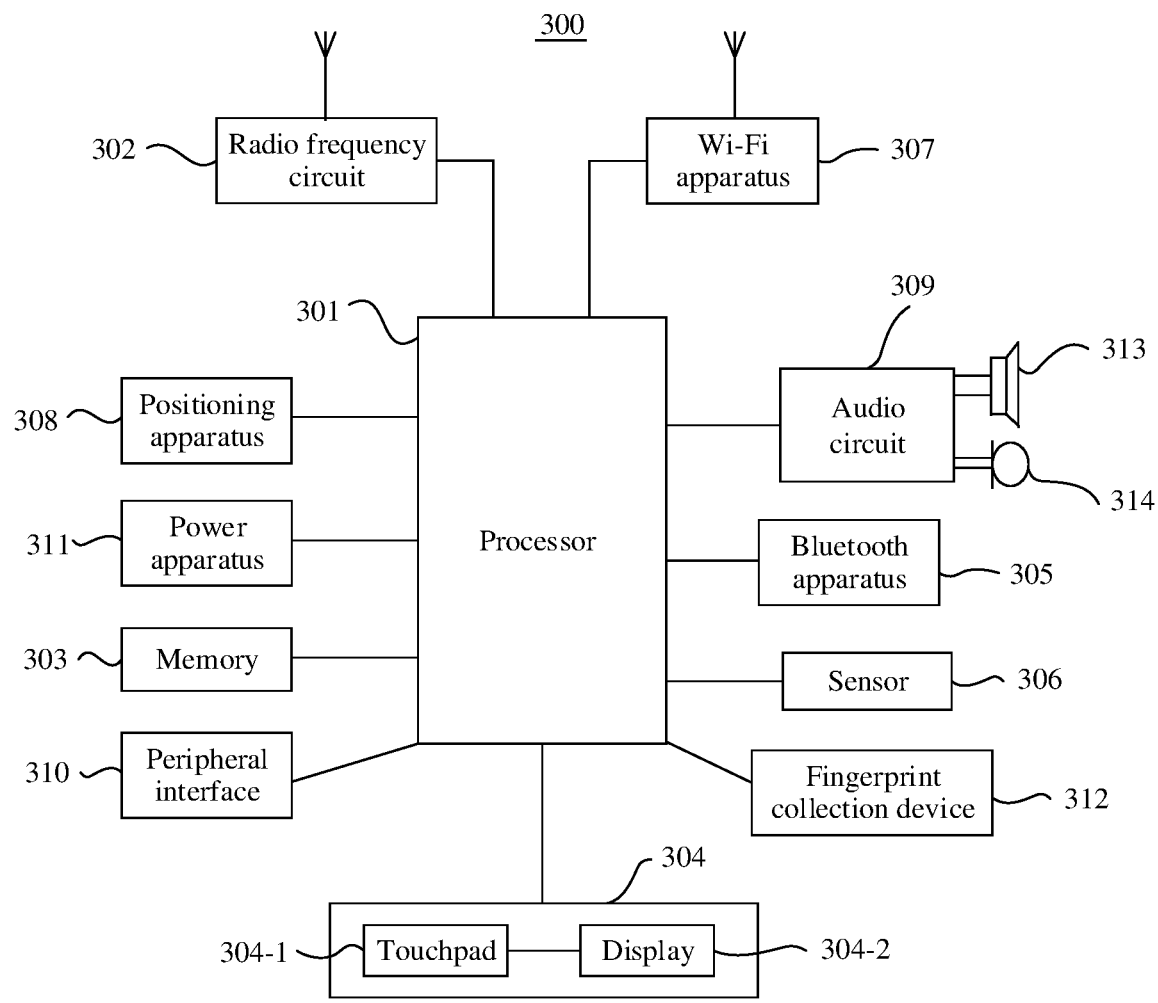
FIG. 3 is a schematic diagram of a hardware structure of a mobile phone according to an embodiment of this application.

As shown in FIG. 3, for example, the terminal is the mobile phone 300. The mobile phone 300 may specifically include components such as a processor 301, a radio frequency (RF) circuit 302, a memory 303, a touchscreen 304, a Bluetooth apparatus 305, one or more sensors 306, a wireless fidelity (Wi-Fi) apparatus 307, a positioning apparatus 308, an audio circuit 309, a peripheral interface 310, and a power apparatus 311. These components may communicate by using one or more communications buses or signal cables (not shown in FIG. 3). A person skilled in the art may understand that a hardware structure shown in FIG. 3 does not constitute a limitation on the mobile phone, and the mobile phone 300 may include more or fewer components than those shown in the figure, or some components may be combined, or the mobile phone 100 may have different component arrangements.

The following describes in detail the components of the mobile phone 300 with reference to FIG. 3.

The processor 301 is a control center of the mobile phone 300. The processor 301 is connected to all parts of the mobile phone 300 by using various interfaces and lines, and performs various functions of the mobile phone 300 and processes data by running or executing an application program stored in the memory 303 and invoking data stored in the memory 303. In some embodiments, the processor 301 may include one or more processing units. In some embodiments of this application, the processor 301 may further include a fingerprint verification chip, configured to verify a collected fingerprint.

The radio frequency circuit 302 may be configured to: receive and send a radio signal in an information sending/receiving process or a call process. Particularly, after receiving downlink data from a base station, the radio frequency circuit 302 may send the downlink data to the processor 301 for processing, and sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 302 may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

The memory 303 is configured to store the application program and the data. The processor 301 performs various functions of the mobile phone 300 and processes data by running the application program and the data that are stored in the memory 303. The memory 303 mainly includes a program storage area and a data storage area. The program storage area may store an operating system, and an application program required by at least one function (for example, a sound playing function or an image processing function). The data storage area may store data (for example, audio data or a phone book) created based on use of the mobile phone 300. In addition, the memory 303 may include a high-speed random access memory (RAM), and may further include a non-volatile memory such as a magnetic disk storage device, a flash memory, or another volatile solid-state storage device. The memory 303 may store various operating systems such as an iOS operating system and an Android operating system. The memory 303 may be standalone, and is connected to the processor 301 through the communications bus; or the memory 303 may be integrated with the processor 301.

The touchscreen 304 may specifically include a touchpad 304-1 and a display 304-2.

The touchpad 304-1 may collect a touch event (for example, an operation performed by a user of the mobile phone 300 on the touchpad 304-1 or near the touchpad 304-1 by using any proper object such as a finger or a stylus) performed by the user on or near the touchpad 304-1, and send collected touch information to another device (for example, the processor 301). The touch event performed by the user near the touchpad 304-1 may be referred to as a floating touch. The floating touch may mean that the user does not need to directly touch the touchpad to select, move, or drag an object (for example, an icon), and the user only needs to be near a device to perform a desired function. In addition, the touchpad 304-1 may be implemented in a plurality of types such as a resistive type, a capacitive type, an infrared type, and a surface acoustic wave type.

The display (also referred to as a display) 304-2 may be configured to display information entered by the user or information provided for the user, and various menus of the mobile phone 300. The display 304-2 may be configured in a form such as a liquid crystal display or an organic light-emitting diode. The touchpad 304-1 may cover the display 304-2. When detecting the touch event on or near the touchpad 304-1, the touchpad 304-1 transfers the touch event to the processor 301 to determine a type of the touch event. Then, the processor 301 can provide corresponding visual output on the display 304-2 based on the type of the touch event. Although the touchpad 304-1 and the display 304-2 in FIG. 3 are used as two independent components to implement input and output functions of the mobile phone 300, in some embodiments, the touchpad 304-1 and the display 304-2 may be integrated to implement the input and output functions of the mobile phone 300. It may be understood that the touchscreen 304 is formed by stacking a plurality of layers of materials. In the embodiments of this application, only the touchpad (layer) and the display (layer) are displayed, and another layer is not recorded in the embodiments of this application. In addition, the touchpad 304-1 may be disposed on a front side of the mobile phone 300 in a form of a full panel, and the display 304-2 may also be disposed on the front side of the mobile phone 300 in a form of a full panel. Therefore, a frameless structure can be implemented for the front side of the mobile phone.

In addition, the mobile phone 300 may further have a fingerprint recognition function. For example, a fingerprint collection device 312 may be disposed on a back side (for example, below a rear-facing camera) of the mobile phone 300, or may be disposed on the front side (for example, below the touchscreen 304) of the mobile phone 300. For another example, a fingerprint collection component 312 may be disposed on the touchscreen 304 to implement a fingerprint recognition function. In other words, the fingerprint collection component 312 may be integrated with the touchscreen 304 to implement the fingerprint recognition function of the mobile phone 300. In this case, the fingerprint collection component 312 is disposed on the touchscreen 304, and may be a part of the touchscreen 304, or may be disposed on the touchscreen 304 in another manner. A main component of the fingerprint collection device 312 in the embodiments of this application is a fingerprint sensor. The fingerprint sensor may use any type of sensing technology, including but not limited to an optical sensing technology, a capacitive sensing technology, a piezoelectric sensing technology, an ultrasonic sensing technology, or the like.

The mobile phone 300 may further include the Bluetooth apparatus 305, configured to implement data exchange between the mobile phone 300 and another short-distance device (for example, a mobile phone or a smartwatch). In the embodiments of this application, the Bluetooth apparatus may be an integrated circuit, a Bluetooth chip, or the like.

The mobile phone 300 may further include at least one type of sensor 306, such as a light sensor, a motion sensor, and another sensor. Specifically, the light sensor may include an ambient light sensor and a proximity sensor. The ambient light sensor may adjust luminance of the display of the touchscreen 304 based on intensity of ambient light. The proximity sensor may power off the display when the mobile phone 300 is moved to an ear. As one type of the motion sensor, an accelerometer sensor may detect acceleration values in all directions (usually on three axes). The accelerometer sensor may detect a value and a direction of gravity when the accelerometer sensor is stationary, and may be used in an application for recognizing a mobile phone posture (such as switching between landscape mode and portrait mode, a related game, or magnetometer posture calibration), a function related to vibration recognition (such as a pedometer or a knock), or the like. For another sensor that may be further disposed in the mobile phone 300, such as a gyroscope, a barometer, a hygrometer, a thermometer, or an infrared sensor, details are not described herein.

The Wi-Fi apparatus 307 is configured to provide, for the mobile phone 300, network access that complies with a Wi-Fi-related standard protocol. The mobile phone 300 may access a Wi-Fi access point via the Wi-Fi apparatus 307, to help the user to receive and send an email, browse a web page, access streaming media, and the like. The Wi-Fi apparatus 307 provides wireless broadband internet access for the user. In some other embodiments, the Wi-Fi apparatus 307 may also be used as a Wi-Fi wireless access point, and may provide Wi-Fi network access for another device.

The positioning apparatus 308 is configured to provide a geographical location for the mobile phone 300. It may be understood that the positioning apparatus 308 may be specifically a receiver of a positioning system such as a global positioning system (GPS), a BeiDou navigation satellite system, or a Russian GLONASS. After receiving a geographic location sent by the positioning system, the positioning apparatus 308 sends the information to the processor 301 for processing, or sends the information to the memory 303 for storage. In some other embodiments, the positioning apparatus 308 may alternatively be a receiver of an assisted global positioning system (AGPS). The AGPS system serves as an assisted server to assist the positioning apparatus 308 in completing ranging and positioning services. In this case, the assisted positioning server communicates with a device such as the positioning apparatus 308 (namely, a GPS receiver) of the mobile phone 300 through a wireless communications network, to provide positioning assistance. In some other embodiments, the positioning apparatus 308 may alternatively be a positioning technology based on a Wi-Fi access point. Each Wi-Fi access point has a globally unique MAC address, and the terminal device may scan and collect a broadcast signal of a surrounding Wi-Fi access point when Wi-Fi is enabled. Therefore, the device may obtain a MAC address broadcast through the Wi-Fi access point. The device sends such data (for example, the MAC address) that can identify the Wi-Fi access point to a location server through the wireless communications network. The location server retrieves a geographical location of each Wi-Fi access point, calculates a geographical location of the device with reference to strength of the Wi-Fi broadcast signal, and sends the geographical location of the device to the positioning apparatus 308 of the device.

The audio circuit 309, a loudspeaker 313, and a microphone 314 may provide an audio interface between the user and the mobile phone 300. The audio circuit 309 may convert received audio data into an electrical signal and then transmit the electrical signal to the speaker 313, and the speaker 313 converts the electrical signal into a sound signal for output. In addition, the microphone 314 converts a collected sound signal into an electrical signal. The audio circuit 309 receives the electrical signal, converts the electrical signal into audio data, and then outputs the audio data to the RF circuit 302, to send the audio data to, for example, another mobile phone, or outputs the audio data to the memory 303 for further processing.

The peripheral interface 310 is configured to provide various interfaces for an external input/output device (for example, a keyboard, a mouse, an external display, an external memory, or a subscriber identification module card). For example, the peripheral interface 310 is connected to the mouse by using a universal serial bus (USB) interface, and is connected, by using a metal contact on a card slot of the subscriber identification module card, to the subscriber identification module (SIM) card provided by a telecommunications operator. The peripheral interface 310 may be configured to couple the external input/output peripheral device to the processor 301 and the memory 303.

In the embodiments of this application, the mobile phone 300 may communicate with another device in a device group through the peripheral interface 310, for example, may receive, through the peripheral interface 310, display data sent by the another device, and display the display data. This is not limited in the embodiments of this application.

The mobile phone 300 may further include the power apparatus 311 (for example, a battery and a power management chip) that supplies power to the components. The battery may be logically connected to the processor 301 via the power management chip, so that the power apparatus 311 implements functions such as charging and discharging management and power consumption management.

Although not shown in FIG. 3, the mobile phone 300 may further include a camera (a front-facing camera and/or a rear-facing camera), a flash, a micro projection apparatus, a near field communication (NFC) apparatus, and the like. Details are not described herein.

The wireless access network device in the embodiments of this application may be a wireless access point (AP), or may be a base station. This is not specifically limited in the embodiments of this application.

Figure 4:
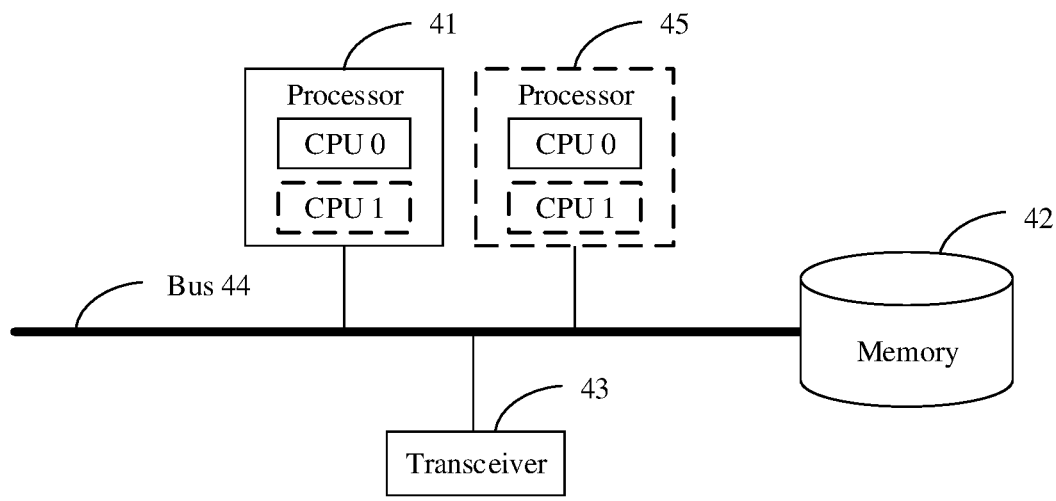
FIG. 4 is a schematic structural diagram of a radio access network device according to an embodiment of this application.

FIG. 4 is a schematic composition diagram of a radio access network device according to an embodiment of this application. As shown in FIG. 4, the radio access network device may include at least one processor 41, a memory 42, a transceiver 43, and a bus 44.

The following specifically describes each constituent component of the radio access network device with reference to FIG. 4.

The processor 41 is a control center of the radio access network device, and may be one processor, or may be a collective term for a plurality of processing elements. For example, the processor 41 is a CPU or an application-specific integrated circuit (ASIC), or is configured as one or more integrated circuits implementing the embodiments of this application, for example, one or more microprocessors (DSP) or one or more field programmable gate arrays (FPGA).

The processor 41 may perform various functions of the radio access network device by running or executing a software program stored in the memory 42 and invoking data stored in the memory 42.

During specific implementation, in an embodiment, the processor 41 may include one or more CPUs, for example, a CPU 0 and a CPU 1 shown in FIG. 4.

During specific implementation, in an embodiment, the radio access network device may include a plurality of processors, for example, the processor 41 and a processor 45 that are shown in FIG. 4. Each of the processors may be a single-core (single-CPU) processor or may be a multi-core (multi-CPU) processor. The processor herein may refer to one or more devices, circuits, and/or processing cores configured to process data (for example, a computer program instruction).

The memory 42 may be a read-only memory (ROM), another type of static storage device capable of storing static information and instructions, a random access memory (RAM), or another type of dynamic storage device capable of storing information and an instruction, or may be an electrically erasable programmable read-only memory (EE-PROM), a compact disc read-only memory (CD-ROM) or another compact disc storage, optical disc storage (including a compact disc, a laser disc, an optical disc, a digital versatile disc, a Blu-ray disc, and the like), or magnetic disk storage medium or another magnetic storage device, or any other medium that is capable of carrying or storing expected program code in a form of an instruction or a data structure and that can be accessed by a computer. However, this application is not limited thereto. The memory 42 may exist independently and is connected to the processor 41 through the communications bus 44. The memory 42 may alternatively be integrated with the processor 41.

The memory 42 is configured to store a software program that performs the solutions of this application, and the processor 41 controls execution of the software program.

The transceiver 43 is configured to communicate with another device or a communications network, for example, configured to communicate with a communications network such as an Ethernet, a radio access network (RAN), or a wireless local area network (WLAN). The transceiver 43 may include all or a part of a baseband processor, and may further optionally include an RF processor. The RF processor is configured to: send and receive an RF signal. The baseband processor is configured to process a baseband signal converted from the RF signal or a baseband signal that is to be converted into the RF signal.

The bus 44 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

The structure of the device shown in FIG. 4 does not constitute a limitation on the radio access network device. The device may include more or fewer components than those shown in the figure, or some components may be combined, or the device may have different component arrangements.

The connection reestablishment method provided in this application is now described with reference to the communications system shown in FIG. 2, the hardware structure of the mobile phone shown in FIG. 3, and the structure of the radio access network device shown in FIG. 4. For ease of description, the following uses an example in which the radio access network device is a base station for description.

Specifically, the connection reestablishment method provided in this application includes the following steps.

Step 1: After determining to hand over a terminal device from a source cell to a target cell for which a service is provided by a target base station, a source base station sends a handover preparation message to the target base station, and sends a handover command to the terminal device after receiving a response message, sent by the target base station, used to indicate that a path has been established.

Specifically, the source base station sends the handover preparation message to the target base station through an interface (for example, an Xn interface) between base stations or an interface (for example, an S1 interface or an NG interface) between a base station and a core network.

The handover preparation message includes a security context, for example, first security parameter information VarShortMAC-Input, of the terminal device. The first security parameter information is calculated by the source base station based on information such as an ID of the target cell, a cell radio network temporary identifier (C-RNTI) of the source cell, and a physical cell identifier (PCI) of the source cell. The first security parameter information is used by the target base station to perform security check on the terminal device based on the first security parameter information after the terminal device sends an RRC connection reestablishment request to the target base station.

It can be learned from the foregoing description that there are the following two handover types when the terminal device is handed over in the communications system shown in FIG. 2:

1. When a source core network is different from a target core network:

Because the first security parameter information is security information that is based on the source core network, for inter-core-network (inter-RAT) handover, the target base station cannot obtain the first security parameter information of the terminal device. If the source base station determines that the target base station is connected to the source core network, the source base station may include the first security parameter information of the terminal device in the handover preparation message, so that the terminal device initiates connection reestablishment in the target cell by using a source configuration.

2. When a source core network is the same as a target core network:

After determining that the target core network is the same as the source core network, the source base station directly includes the first security parameter information of the terminal device in the handover preparation message.

After receiving the handover preparation message, the target base station establishes a new path, and sends, to the source base station after establishment of the new path is completed, the response message used to indicate that the path has been established. After receiving the response message, the source base station sends the handover command including first duration to the terminal device. The first duration is a maximum waiting time for the terminal device to perform one handover process.

The handover command may be an RRC message. For example, in an LTE system, the handover command may be an RRC connection reconfiguration message including mobility control information.

Step 2: The terminal device updates a configuration of the terminal device to a configuration of the target cell according to the handover command.

Specifically, after receiving the handover command, the terminal device starts a first timer, and updates the related configuration of the terminal device to the configuration of the target cell. Duration of the first timer is the first duration. If the terminal device has not completed the handover when the first timer expires, the terminal device determines that the handover fails.

Step 3a: If the handover of the terminal device fails, the terminal device reverts to (revert back to) the source configuration.

In the embodiments of this application, a configuration used by the terminal device in the source cell is referred to as a source configuration for short.

Specifically, the source configuration includes a status variable and a parameter of each radio bearer (RB). The source configuration does not include configurations of a physical PHY layer and a media access control MAC layer in the source cell. Subsequently, the terminal device needs to determine a first cell based on cell signal quality. The first cell may be the source cell, may be the target cell, or may be another cell different from the source cell and the target cell. After camping on a cell, the terminal device needs to use configurations of a physical layer and a media access control layer in the cell.

Step 3b: After the terminal device reverts to the source configuration, the terminal device starts an RRC connection reestablishment procedure.

Specifically, the terminal device suspends all radio bearers except a signaling radio bearer (SRB) 0, resets a MAC entity, releases a secondary cell (Scell) in a master cell group (MCG), applies a default physical channel configuration, and applies a default MAC main configuration for the MCG. In addition, the terminal device further performs cell reselection. Cell reselection is a focus of this application. Therefore, the cell reselection performed by the terminal device is described in the embodiments of this application.

Step 4: The terminal device starts a second timer, performs cell reselection, and determines the first cell.

Specifically, when initiating the connection reestablishment, the terminal device starts the second timer. The second timer is stopped after the cell reselection is completed. For example, the second timer is stopped after the terminal device selects a suitable cell having a RAT the same as a RAT of the source cell or selects a cell of another RAT. If the second timer expires, the terminal device enters an idle mode.

With reference to the foregoing description, it can be learned that a RAT of the first cell determined by the terminal device may be the same as or different from the RAT of the source cell.

The following uses an RRC connection reestablishment procedure triggered by a handover failure as an example to describe the connection reestablishment method in the embodiments of this application from a perspective of whether the RAT of the first cell is the same as the RAT of the source cell. In this case, the source cell is a source cell in a handover process, and the source base station is a source base station (for example, a source eNB or a source gNB) in the handover process. The method in the embodiments of this application is also applicable to an RRC reestablishment procedure triggered in another case. In this case, the source cell is an original serving cell existing before the terminal device starts the reestablishment procedure, and the source base station is a base station to which the original serving cell of the terminal device belongs. For example, for an RRC reestablishment procedure triggered by an RLF, a serving cell in which the terminal device sends the RLF is a source cell.

When the RAT of the source cell is E-UTRA, and the first cell is a suitable cell whose RAT is the same as that of the source cell, in the embodiments of this application, the terminal device may perform processing in the following manners.

Manner (1): If the first cell is an E-UTRA cell, in other words, the RAT of the first cell is the same as the RAT of the source cell, the terminal device further reads system information of the first cell, to determine whether the first cell is connected to the source core network.

If the E-UTRA cell is connected to the source core network, the terminal device stops the second timer, starts a third timer, and sends an RRC connection reestablishment request message to a reselected base station.

If the E-UTRA cell cannot provide a connection to the source core network, the terminal device leaves an E-UTRA connected mode. Optionally, when leaving the E-UTRA connected mode, the terminal device sends an RRC connection release indication including a connection release cause value to an upper layer (for example, a non-access stratum NAS). In this way, the upper layer can determine, based on the connection release cause value, whether to change a type of a core network connected to the terminal device. Herein, the connection release cause value may include any one of or any combination of the following information: a handover failure, a type of the first cell, the RAT of the first cell, whether the first cell provides a connection to the source core network, a core network type supported by the first cell, and the like.

For example, the source cell is an E-UTRA-EPC cell, and the first cell is an E-UTRA-5GC cell. The upper layer determines, based on the connection release cause value, that the terminal device cannot continue to use an EPS NAS, but changes to use a 5GS NAS. In this case, the terminal device can access a 5GC in the first cell via the 5GS NAS. For another example, the source cell is an E-UTRA-5GC cell, and the reselected cell is an E-UTRA-EPC cell. The upper layer determines, based on the connection release cause value, that the terminal device cannot continue to use a 5GS NAS, but changes to use an EPS NAS. In this case, the terminal device can access an EPC in the first cell via the EPS NAS.

Manner (2): The terminal device selects a cell that is of an E-UTRA RAT and that can be connected to the source core network as the first cell. In this way, the terminal device may stop the second timer, start a third timer, and send an RRC connection reestablishment request message to a reselected base station. That is, the suitable cell may be defined: Only a cell that can be connected to the source core network or connected to a core network of a same type as the source core network can be used as a suitable cell.

Manner (3): If the first cell is an E-UTRA cell, in other words, the RAT of the first cell is the same as the RAT of the source cell, the terminal device does not further identify whether the E-UTRA cell is connected to the source core network. The terminal device stops the second timer, starts a third timer, and sends an RRC connection reestablishment request message to a reselected base station.

When the RAT of the source cell is E-UTRA, and the RAT of the first cell is different from the RAT of the source cell, in the embodiments of this application, the terminal device may perform processing in the following manners.

Manner I: The terminal device leaves a connected mode.

Specifically, the terminal device deletes the security context, resets the MAC, and releases radio resources including an RLC entity, a MAC configuration, and PDCP entities corresponding to all established RBs.

Optionally, when leaving the connected mode, the terminal device sends an RRC connection release indication including a connection release cause value to an upper layer (for example, a non-access stratum (NAS)). In this way, the upper layer can determine, based on the connection release cause value, whether to change a type of a core network. Herein, the connection release cause value may include any one of or any combination of the following information: a handover failure, a type of the first cell, the RAT of the first cell, whether the first cell provides a connection to the source core network, a core network type supported by the first cell, and the like.

Manner II: If the source core network of the terminal device is a 5GC, the terminal device identifies whether the first cell is an NR cell.

For example, the terminal device determines, based on a cell frequency, a physical signal characteristic, a synchronization signal, or the like, that the first cell is an NR cell.

If the first cell is not an NR cell, the terminal device leaves an NR connected mode, and sends a connection release cause value to an upper layer (for example, a non-access stratum NAS). In this way, the upper layer can determine, based on the connection release cause value, whether to change a type of a core network. Herein, the connection release cause value may include any one of or any combination of the following information: a handover failure, a type of a reselected cell, a RAT of the reselected cell, whether the reselected cell provides a connection to the source core network, a core network type supported by the first cell, and the like.

In addition, the terminal device retains a security configuration. For example, the security configuration includes any one or any combination of the following information: a 5G security context, a source base station key (for example, KgNB or KeNB), a next hop parameter (NH), a next hop chaining count parameter (NCC), a key used for RRC encryption, a key used for RRC integrity protection, an encryption algorithm, an integrity protection algorithm, and the like.

Optionally, user plane processing may include any one or any combination of the following processing:

The terminal device resets a MAC entity, and releases a MAC configuration.

The terminal device may release, reestablish, or retain a source SDAP entity corresponding to a DRB. The terminal device may release, reestablish, or retain a source RLC entity corresponding to the DRB. The terminal device may release, reestablish, or retain a source RLC entity corresponding to an SRB. If the terminal device has retained the source SDAP/PDCP/RLC entity, the terminal device may perform an operation on the SDAP/PDCP/RLC entity after receiving an RRC connection reestablishment message or an RRC connection reconfiguration message (also referred to as an RRC reconfiguration message in NR) sent by the reselected base station.

The terminal device may release, reestablish, or retain a PDCP entity corresponding to the SRB (an SRB 1 and/or an SRB 2). The terminal device may release or retain an RLC entity corresponding to the established SRB. If the terminal device has retained the PDCP/RLC entity corresponding to the established SRB, the terminal device may perform an operation on the PDCP/RLC entity after receiving an RRC connection reestablishment message or an RRC connection reconfiguration message (also referred to as an RRC reconfiguration message in NR) sent by the reselected base station.

It should be noted that the manner I is not only applicable to a case in which the RAT of the source cell is E-UTRA but also applicable to a case in which the RAT of the source cell is NR, and the manner II is applicable to a case in which the source core network is a 5GC and the RAT of the source cell is E-UTRA.

When the RAT of the source cell is NR, and the RAT of the first cell is different from the RAT of the source cell, in the embodiments of this application, the terminal device may perform processing in the following manners.

Manner 1: The terminal device leaves a connected mode.

Specifically, the terminal device resets a MAC, and releases radio resources including an RLC entity, a MAC configuration, and PDCP entities corresponding to all established RBs. Optionally, when leaving the NR connected mode, the terminal device sends an RRC connection release indication including a connection release cause value to an upper layer (for example, a non-access stratum NAS). In this way, the upper layer can determine, based on the connection release cause value, whether to change a type of a core network. Herein, the connection release cause value may include any one of or any combination of the following information: a handover failure, a type of the first cell, the RAT of the first cell, whether the first cell provides a connection to the source core network, a core network type supported by the reselected cell, and the like.

Manner 2: If the first cell is an E-UTRA cell, the terminal device further determines whether the cell is connected to a 5GC.

When the first cell is an E-UTRA cell, if the first cell is connected to the 5GC, the terminal device retains a security configuration. Herein, for a method for retaining the security configuration by the terminal device, refer to the description in the manner II. Details are not described herein again.

If the first cell cannot provide a connection to the 5GC, the terminal device leaves the NR connected mode. For a specific process in which the terminal device leaves the NR connected mode, refer to the description in the manner 1. Details are not described herein again.

Manner 3: The terminal device selects a cell that is of an E-UTRA RAT and that can be connected to the source core network. That is, the suitable cell is defined: Only a cell that is of the E-UTRA RAT and that can be connected to the source core network or connected to a core network of a same type as the source core network can be used as a suitable cell.

In this scenario, the terminal device retains the security configuration. For a method for retaining the security configuration by the terminal device, refer to the description in the manner II. Details are not described herein again.

Step 5: The terminal device sends the RRC connection reestablishment request message to the reselected base station.

The RRC connection reestablishment request message includes a cell identifier (for example, a PCI of a source primary cell) of the source cell, a terminal device identifier (for example, a C-RNTI) used in the source cell, and second security parameter information (for example, short MAC-I).

Step 6: The reselected base station checks the RRC connection reestablishment request message.

The reselection base station obtains the context of the terminal device based on the cell identifier of the source cell and the terminal device identifier used in the source cell. Optionally, when the reselected base station is an ng-eNB, the reselected base station determines a type of the source core network. If the reselected base station is an original serving base station of the terminal device or the source base station, the reselected base station may learn of the type of the source core network of the terminal device. Alternatively, if the reselected base station is the target base station to which the terminal device is handed over, the reselected base station may learn of the type of the source core network of the terminal device based on a type of handover initiated by the source base station.

For example, if the source base station initiates X2-based handover, the type of the source core network is an EPC. If the source base station initiates Xn-based handover, the type of the source core network is an EPC. If the reselected base station receives intra-system handover request via an S1 interface, the type of the source core network is an EPC. If the reselected base station receives inter-system handover on the S1 interface, the type of the source core network is a 5GC. If the reselected base station receives a request for intra-system handover on an NG interface, the type of the source core network is a 5GC. If the reselected base station receives a request for inter-system handover on the NG interface, the type of the source core network is an EPC.

Optionally, the reselected base station determines the type of the source core network of the terminal device based on the context of the terminal device. The context of the terminal device is carried in the handover request by the source base station in the handover process. The reselected base station checks the RRC connection reestablishment request message based on the first security parameter information in the context of the terminal device.

Specifically, the reselected base station checks whether the second security parameter information is valid. Optionally, if the target core network to which the terminal device is handed over is different from the source core network, a handover request message received by the target base station carries a context that is of the terminal device and that is applicable in the target core network. When the target base station is also connected to the source core network, if the source base station sends a source context of the terminal device to the target base station, the target base station is capable of performing RRC connection reestablishment for the terminal device. For example, when initiating inter-core-network handover, the source base station includes the source context of the terminal device in the handover request message. Further, optionally, when initiating inter-core-network handover, the source base station determines whether the target base station supports the source core network, and if the target base station supports the source core network, includes the source context of the terminal device in the handover request message.

Optionally, if the context that is of the terminal device and that is obtained by the reselected base station includes the first security parameter information, and the reselected base station is connected to the source core network, the reselected base station sends an RRC connection reestablishment message to the terminal device, that is, performs step 7. If the context that is of the terminal device and that is obtained by the reselected base station does not include the first security parameter information, the reselected base station sends an RRC connection reestablishment reject message to the terminal device, that is, performs step 12.

Step 7: The reselected base station sends the RRC connection reestablishment message to the terminal device.

Optionally, the RRC connection reestablishment message includes configuration information of the SRB 1.

Step 8: The terminal device reconfigures the SRB 1 based on the configuration information of the SRB 1.

Specifically, because the terminal device has reverted to the source configuration in step 3, a core network accessed by the terminal device is the source core network, an operating NAS is a source NAS, and a used security context is a security context of a source system. Therefore, after receiving the RRC connection reestablishment message, the terminal device reconfigures the SRB 1 based on the configuration information of the SRB 1.

Optionally, in a scenario in which the terminal device has released a source PDCP entity of the SRB 1 before sending the RRC connection reestablishment request message, if the RRC connection reestablishment message includes configuration information (namely, first configuration information) of the PDCP entity, the terminal device establishes a new PDCP entity of the SRB 1 based on the configuration information of the PDCP entity; or if the RRC connection reestablishment message does not include configuration information of the PDCP entity, the terminal device establishes a new PDCP entity of the SRB 1 based on default configuration information (namely, first preset configuration information) of the PDCP.

Optionally, in a scenario in which the terminal device has retained a source PDCP entity of the SRB 1 before sending the RRC connection reestablishment request message, the terminal device uses the retained PDCP entity as a PDCP entity of the SRB 1.

Optionally, in a scenario in which the terminal device has retained a source PDCP entity of the SRB 1 before sending the RRC connection reestablishment request message, the terminal device reestablishes the PDCP entity of the SRB 1.

Optionally, in a scenario in which the terminal device has retained a source PDCP entity of the SRB 1 before sending the RRC connection reestablishment request message, the terminal device releases the source PDCP entity of the SRB 1, and establishes a new PDCP entity of the SRB 1.

Optionally, before sending the RRC connection reestablishment request message, the terminal device reestablishes an NR PDCP entity of the SRB 1, and the terminal device uses the NR PDCP entity as a PDCP entity of the SRB 1.

It should be noted that when the source core network is an EPC, both a PDCP entity, used by the terminal device in the source cell, of the SRB 1 and a reestablished PDCP entity of the SRB 1 should be E-UTRA PDCP entities. When the source core network is a 5GC, both a PDCP entity, used by the terminal device in the source cell, of the SRB 1 and a reestablished PDCP entity of the SRB 1 should be NR PDCPs.

Optionally, in a scenario in which the terminal device has released a source RLC entity of the SRB 1 before sending the RRC connection reestablishment request message, if the RRC connection reestablishment message includes configuration information of the RLC entity, the terminal device establishes a new RLC entity of the SRB 1 based on the configuration information of the RLC entity; or if the RRC connection reestablishment message does not include configuration information of the RLC entity, the terminal device establishes a new RLC entity of the SRB 1 based on default configuration information of the RLC entity.

Optionally, in a scenario in which the terminal device has retained a source RLC entity of the SRB 1 before sending the RRC connection reestablishment request message, the terminal device releases the source RLC entity, and establishes a new RLC entity of the SRB 1.

It should be noted that when the source core network is an EPC, both an RLC entity, used by the terminal device in the source cell, of the SRB 1 and a reestablished RLC entity of the SRB 1 should be E-UTRA RLCs. When the source core network is a 5GC, and the RAT of the source cell is E-UTRA, an RLC entity, used by the terminal device in the source cell, of the SRB 1 should be an E-UTRA RLC. If reestablishment in the NR cell succeeds, the used RLC entity of the SRB 1 should be an NR RLC. When the source core network is a 5GC, and the RAT of the source cell is E-UTRA, an RLC entity, used by the terminal device in the source cell, of the SRB 1 should be an E-UTRA RLC. If reestablishment in the E-UTRA cell succeeds, the used RLC entity of the SRB 1 should be an E-UTRA RLC. When the source core network is a 5GC, and the RAT of the source cell is NR, an RLC entity, used by the terminal device in the source cell, of the SRB 1 should be an NR RLC. If reestablishment in the NR cell succeeds, the used RLC entity of the SRB 1 should be an NR RLC. When the source core network is a 5GC, and the RAT of the source cell is NR, an RLC entity, used by the terminal device in the source cell, of the SRB 1 should be an NR RLC. If reestablishment in the E-UTRA cell succeeds, the used RLC entity of the SRB 1 should be an E-UTRA RLC.

Step 9 (optional): The terminal device sends an RRC connection reestablishment complete message to the reselected base station through the SRB 1.

Step 10 (optional): The reselected base station sends an RRC connection reconfiguration (RRC Connection Reconfiguration) message to the terminal device.

The RRC connection reconfiguration message may include configuration information of an RB (an SRB 2 and/or a DRB).

Step 11: The terminal device reconfigures or configures the RB based on the configuration information included in the RRC connection reconfiguration message.

Optionally, in a scenario in which the terminal device has released a source PDCP entity of the RB before sending the RRC connection reestablishment request message, if the RRC connection reestablishment message includes configuration information of the PDCP, the terminal device establishes a new PDCP entity of the RB based on the configuration information of the PDCP; or if the RRC connection reestablishment message does not include configuration information of the PDCP, the terminal device establishes a new PDCP entity of the RB based on default configuration information of the PDCP.

Optionally, in a scenario in which the terminal device has retained a source PDCP entity of the RB before sending the RRC connection reestablishment request message, the terminal device releases the source PDCP entity of the RB. After releasing the source PDCP entity of the RB, the terminal device establishes a new PDCP entity of the RB. It is easy to understand that a manner of "establishing a new PDCP entity of the RB by the terminal device" is relatively simple, especially for the SRB, and a status of the source PDCP entity is not particularly helpful to data transmission continuity. Therefore, establishing a new PDCP entity is the simplest operation.

Optionally, in a scenario in which the terminal device has retained a source PDCP entity of the RB before sending the RRC connection reestablishment request message, the terminal device reestablishes the PDCP entity of the RB. In a manner of "reestablishing the PDCP entity of the RB by the terminal device", both a status and a variable of the PDCP entity can continue to be used, especially for the DRB, and data transmission continuity can be ensured.

Optionally, before sending the RRC connection reestablishment request message, the terminal device reestablishes an NR PDCP entity of the RB, and the terminal device uses the NR PDCP entity as a PDCP entity of the RB.

Optionally, in a scenario in which the terminal device has released a source RLC entity of the RB before sending the RRC connection reestablishment request message, if the RRC connection reestablishment message includes configuration information of the RLC, the terminal device establishes a new RLC entity of the RB based on the configuration information of the RLC; or if the RRC connection reestablishment message does not include configuration information of the RLC, the terminal device establishes a new RLC entity of the RB based on default configuration information of the RLC.

Optionally, in a scenario in which the terminal device has retained a source RLC entity of the RB before sending the RRC connection reestablishment request message, the terminal device releases the source RLC entity, and establishes a new RLC entity of the RB.

Optionally, in a scenario in which the terminal device has released a source SDAP entity of the DRB before sending the RRC connection reestablishment request message, if the RRC connection reestablishment message includes configuration information of the SDAP, the terminal device establishes a new SDAP entity of the DRB based on the configuration information of the SDAP.

Optionally, in a scenario in which the terminal device has retained a source SDAP entity of the DRB before sending the RRC connection reestablishment request message, the terminal device releases the source SDAP entity of the DRB, and establishes a new SDAP entity of the DRB.

Optionally, in a scenario in which the terminal device has retained a source SDAP entity of the DRB before sending the RRC connection reestablishment request message, the terminal device reestablishes the SDAP entity of the DRB.

Optionally, in a scenario in which the terminal device has retained a source SDAP entity of the DRB before sending the RRC connection reestablishment request message, the terminal device applies the SDAP entity of the DRB.

Step 12: The reselected base station sends the RRC connection reestablishment reject message to the terminal device, and the terminal device leaves the connected mode.

Optionally, the RRC connection reestablishment reject message includes a reject cause value, and the reject cause value is used to indicate that the reselected base station/the reselected cell is not connected to the source core network of the terminal device. Optionally, the terminal device determines, based on the reject cause value, to change an accessed core network/handover NAS.

It should be noted that step 1 to step 3$a$ are optional steps, and are applicable to an RRC connection reestablishment process triggered by a handover failure; and step 3$b$ to step 12 may be used as a complete RRC connection reestablishment process, and are not only applicable to an RRC connection reestablishment process triggered by a handover failure, but also applicable to an RRC connection reestablishment process triggered at another event. For example, when discovering a radio link failure, an integrity check failure, an RRC reconfiguration failure, or the like, the terminal device may perform an RRC connection reestablishment process by using step 3$b$ to step 12.

For ease of understanding, with reference to the network structure shown in FIG. 2, the connection reestablishment method provided in the embodiments of this application is described in detail below in cases of different source core networks.

Figure 5A:
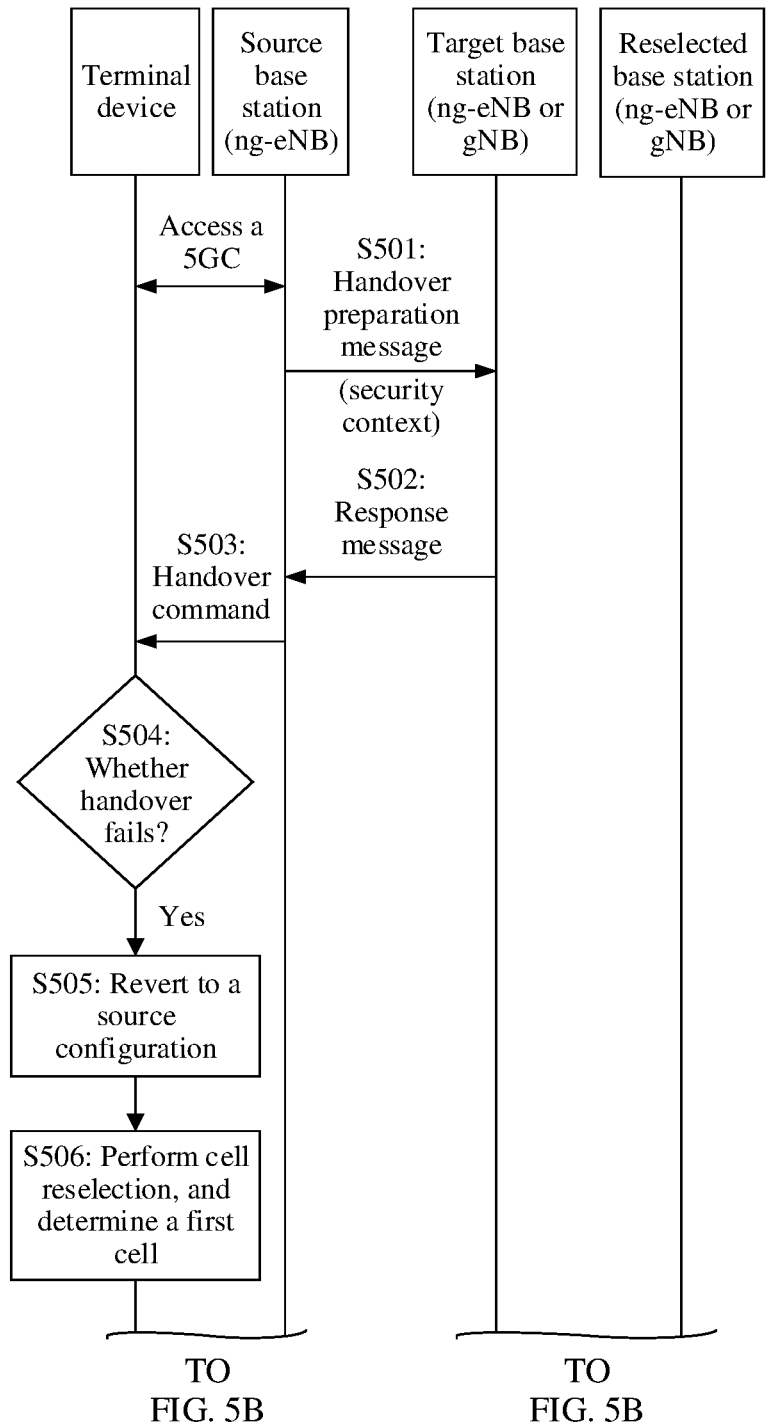
FIG. 5A to FIG. 5C are a schematic flowchart 1 of a connection reestablishment method according to an embodiment of this application.
Figure 5B:
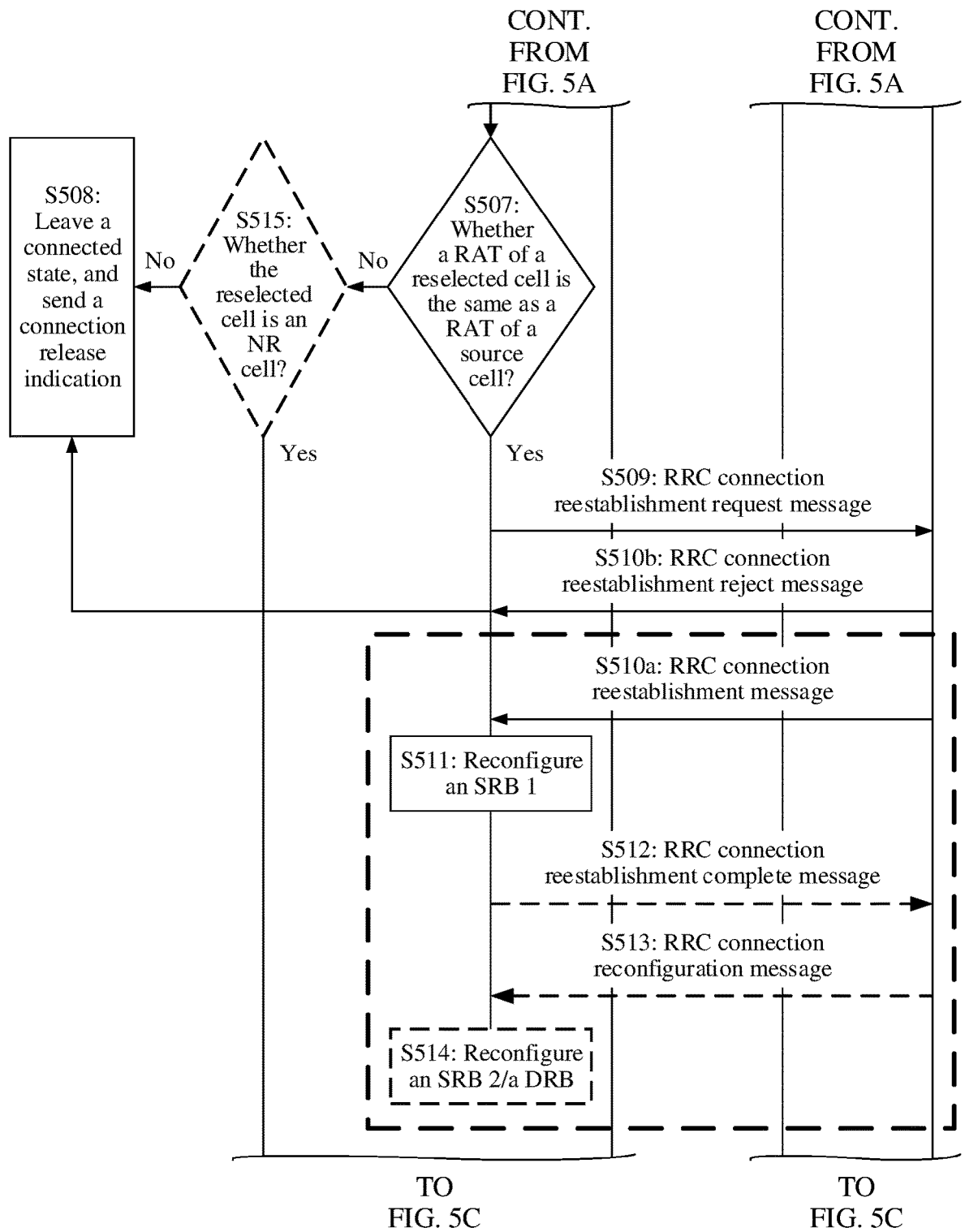
Figure 5C:
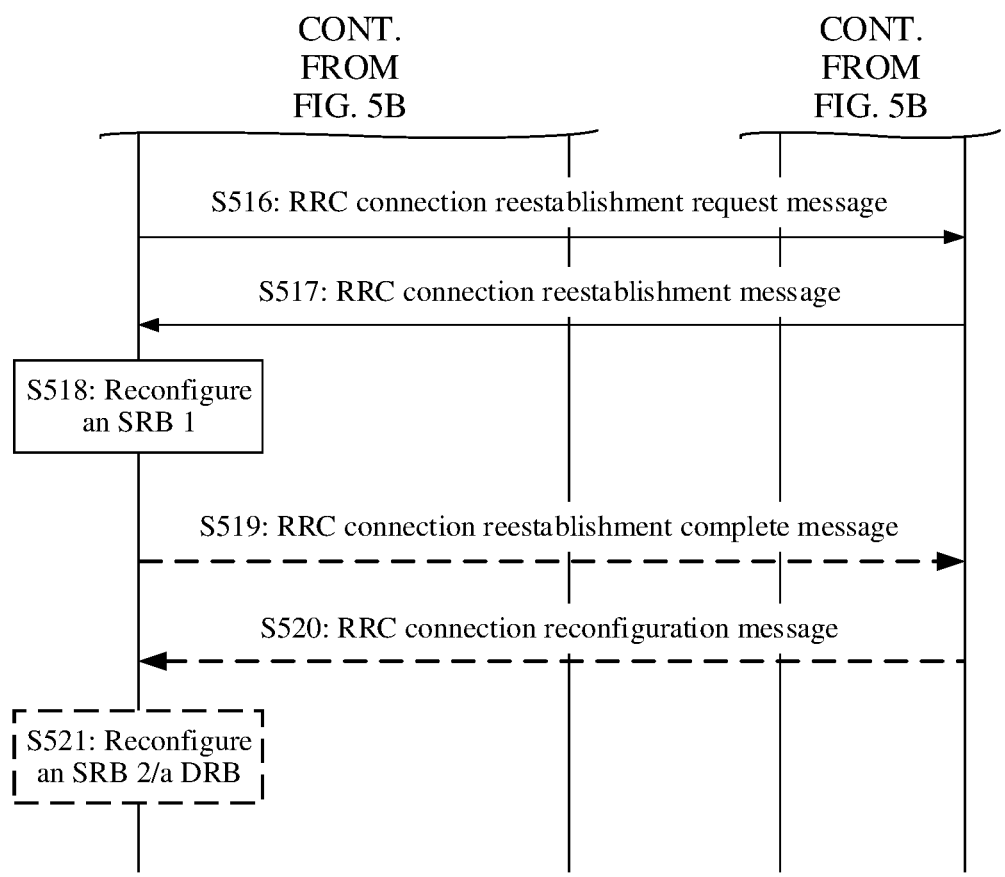

FIG. 5A to FIG. 5C show a connection reestablishment method provided in an embodiment of this application in a scenario in which a source base station is an ng-eNB, a source core network is a 5GC, and a source cell is an E-UTRA-5GC cell. As shown in FIG. 5A to FIG. 5C, the processing method includes the following steps.

S501: After determining to hand over a terminal device from the source cell to a target cell that is served by a target base station, the source base station sends a handover preparation message to the target base station.

Optionally, the source base station may send the handover preparation message to the source core network, and a source core network node directly forwards the handover preparation message or forwards the handover preparation message to the target base station via a target core network node.

The target base station in this scenario is an ng-eNB or a gNB. The handover preparation message includes a security context of the terminal device, and the security context includes first security parameter information.

For example, the first security parameter information includes one or a combination of the following information: a 5G system security context, a source base station key (for example, KeNB), a target base station key (for example, KgNB and KeNB), and a next hop parameter (NH), a next hop chaining count parameter (NCC), a key used for RRC encryption, a key used for RRC integrity protection, an encryption algorithm, an integrity protection algorithm, a security check parameter calculated based on a 5G system security mechanism, a source C-RNTI, a source PCI, and a target cell ID, and the like.

S502: In response to the handover preparation message, the target base station prepares a resource for the terminal device, and sends, to the source base station, a response message used to indicate the terminal device to hand over.

S503: The source base station sends a handover command to the terminal device.

The handover command includes first duration.

S504: The terminal device performs a handover operation according to the handover command, and determines whether the handover fails.

It can be learned from the foregoing description that, after receiving the handover command, the terminal device starts a first timer, and updates a related configuration of the terminal device to a configuration of the target cell. Duration of the first timer is the first duration. If the terminal device has not completed the handover when the first timer expires, the terminal device determines that the handover fails.

S505: If the terminal device is unsuccessfully handed over, the terminal device reverts to (revert back to) a source configuration, and starts an RRC connection reestablishment procedure.

S506: The terminal device starts a second timer, performs cell reselection, and determines a first cell.

For example, a reselected cell is a suitable cell.

S507: The terminal device determines whether a RAT of the first cell is the same as a RAT of the source cell.

Optionally, the terminal device determines the RAT of the first cell based on a cell frequency, a physical signal characteristic, or a synchronization signal. After determining the RAT of the first cell, the terminal device determines whether the RAT of the first cell is the same as the RAT of the source cell.

If the RAT of the first cell is the same as the RAT of the source cell, the terminal device performs S509 after S507. Optionally, if the RAT of the first cell is different from the RAT of the source cell, the terminal device performs S508 after S507.

S508: The terminal device leaves a connected mode, and sends a connection release indication including a connection release cause value to an upper layer.

In this embodiment, the source cell is an E-UTRA-5GC cell. If the RAT of the first cell is different from the RAT of the source cell, a reselected base station may be a gNB. In this case, optionally, the terminal device leaves the connected mode, enters an idle mode, and sends the connection release indication including the connection release cause value to a NAS. In this way, the NAS can determine, based on the connection release cause value, whether to change a type of a core network.

S509: The terminal device sends an RRC connection reestablishment request message to the reselected base station.

In this embodiment, the source cell is an E-UTRA-5GC cell. If the RAT of the first cell is the same as the RAT of the source cell, the first cell is an E-UTRA-5GC cell or an E-UTRA-EPC cell.

If the first cell is an E-UTRA-5GC cell, both the first cell and the source cell are connected to the 5GC. In this way, the reselected base station can obtain the context of the terminal device, and further check the RRC connection reestablishment request message based on the context of the terminal device, to accept the request sent by the terminal device.

In addition, if the RAT of the first cell is the same as the RAT of the source cell, the terminal device further retains a security configuration of the terminal device. For a specific process in which the terminal device retains the security configuration of the terminal device, refer to the foregoing description. Details are not described herein again.

If the first cell is an E-UTRA-5GC cell, S510a and S511 are sequentially performed after S509.

If the first cell is an E-UTRA-EPC cell, the reselected base station cannot obtain the context of the terminal device. In this case, the reselected base station rejects the request sent by the terminal device. If the first cell is an E-UTRA-EPC cell, S510b is performed after S509.

S510a: The reselected base station sends an RRC connection reestablishment message to the terminal device.

The RRC connection reestablishment message includes configuration information of an SRB 1.

S511: The terminal device reconfigures the SRB 1 based on the configuration information of the SRB 1.

For a method used by the terminal device to reconfigure the SRB 1 based on the configuration information of the SRB 1, refer to the description in step 8. Details are not described herein again.

Optionally, after S511, S512 to S514 are further included.

S512 (optional): The terminal device sends an RRC connection reestablishment complete message to the reselected base station through the reconfigured SRB 1.

S513 (optional): The reselected base station sends an RRC connection reconfiguration message to the terminal device.

The RRC connection reconfiguration message may include configuration information of a target RB (an SRB 2 and/or a DRB).

S514 (optional): The terminal device reconfigures or configures the target RB based on the configuration information of the target RB.

For 514, refer to the description of step 11. Details are not described herein again.

S510b: The reselected base station sends an RRC connection reestablishment reject message to the terminal device.

After receiving the RRC connection reestablishment reject message, the terminal device performs S508.

It is easy to understand that in this embodiment, the source cell is an E-UTRA-5GC cell. If the first cell is an NR cell, the reselected base station may also obtain the context of the terminal device. In this way, after initiating the RRC connection reestablishment request, the terminal device can still resume an RRC connection to the terminal device. The NR cell has a RAT different from that of the E-UTRA-5GC cell. Therefore, in a scenario in which the RAT of the first cell is different from the RAT of the source cell, the terminal device may further determine whether the first cell is an NR cell.

Optionally, between S507 and S508, the connection reestablishment method provided in this embodiment may further include S515.

S515: The terminal device determines whether the first cell is an NR cell.

S515 is optional, and therefore is represented by a dashed box in FIG. 5A to FIG. 5C.

If the first cell is not an NR cell, the terminal device leaves a connected mode, and sends a connection release indication to an upper layer, that is, performs S508.

If the first cell is an NR cell, S516 to S521 are performed after S515.

S516: The terminal device sends an RRC connection reestablishment request message to the reselected base station.

The reselected base station in S516 is a gNB.

S517: The reselected base station sends an RRC connection reestablishment message to the terminal device.

The RRC connection reestablishment message includes configuration information of an SRB 1. The gNB can obtain the context of the terminal device, and check the RRC connection reestablishment request message based on the context of the terminal device, to accept the request sent by the terminal device. Correspondingly, the gNB sends the RRC connection reestablishment message to the terminal device.

S518: The terminal device reconfigures the SRB 1 based on the configuration information of the SRB 1.

For S518, refer to the description of step 8. Details are not described herein again.

S519 (optional): The terminal device sends an RRC connection reestablishment complete message to the reselected base station through the reconfigured SRB 1.

S520 (optional): The reselected base station sends an RRC connection reconfiguration message to the terminal device.

The RRC connection reconfiguration message may include configuration information of a target RB (an SRB 2 and/or a DRB).

S521 (optional): The terminal device reconfigures or configures the target RB based on the configuration information of the target RB.

For S521, refer to the description of step 11. Details are not described herein again.

It can be learned from the foregoing description of S509 that, in step S509, the first cell is an E-UTRA-5GC cell or an E-UTRA-EPC cell. To improve a success rate of reestablishing an RRC connection by the terminal device and reduce signaling exchange, in this embodiment of this application, after the terminal device determines that the RAT of the first cell is different from the RAT of the source cell, and before the terminal device sends the RRC connection reestablishment request message to the reselected base station, whether the reselected base station that serves the first cell is connected to the source core network may be further determined.

Figure 6A:
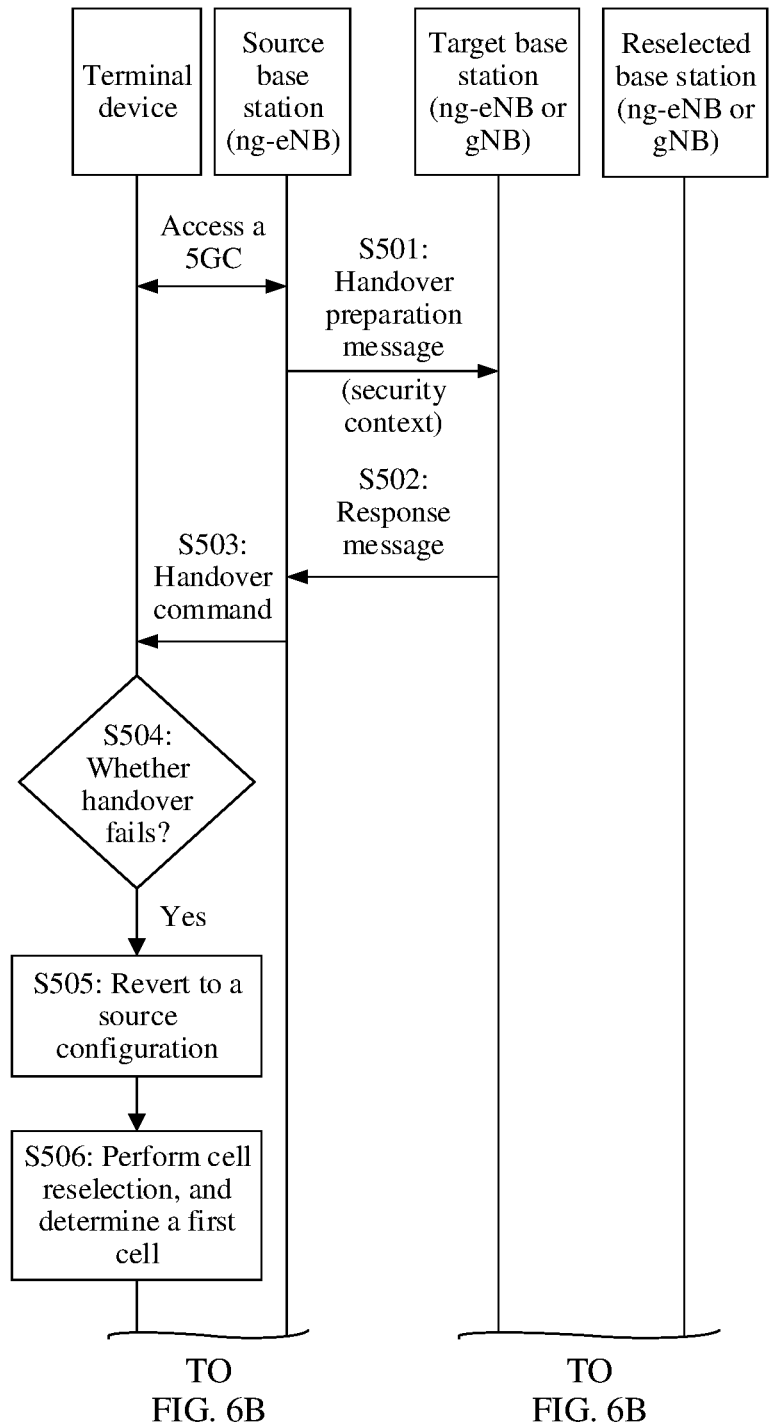
FIG. 6A to FIG. 6C are a schematic flowchart 2 of a connection reestablishment method according to an embodiment of this application.
Figure 6B:
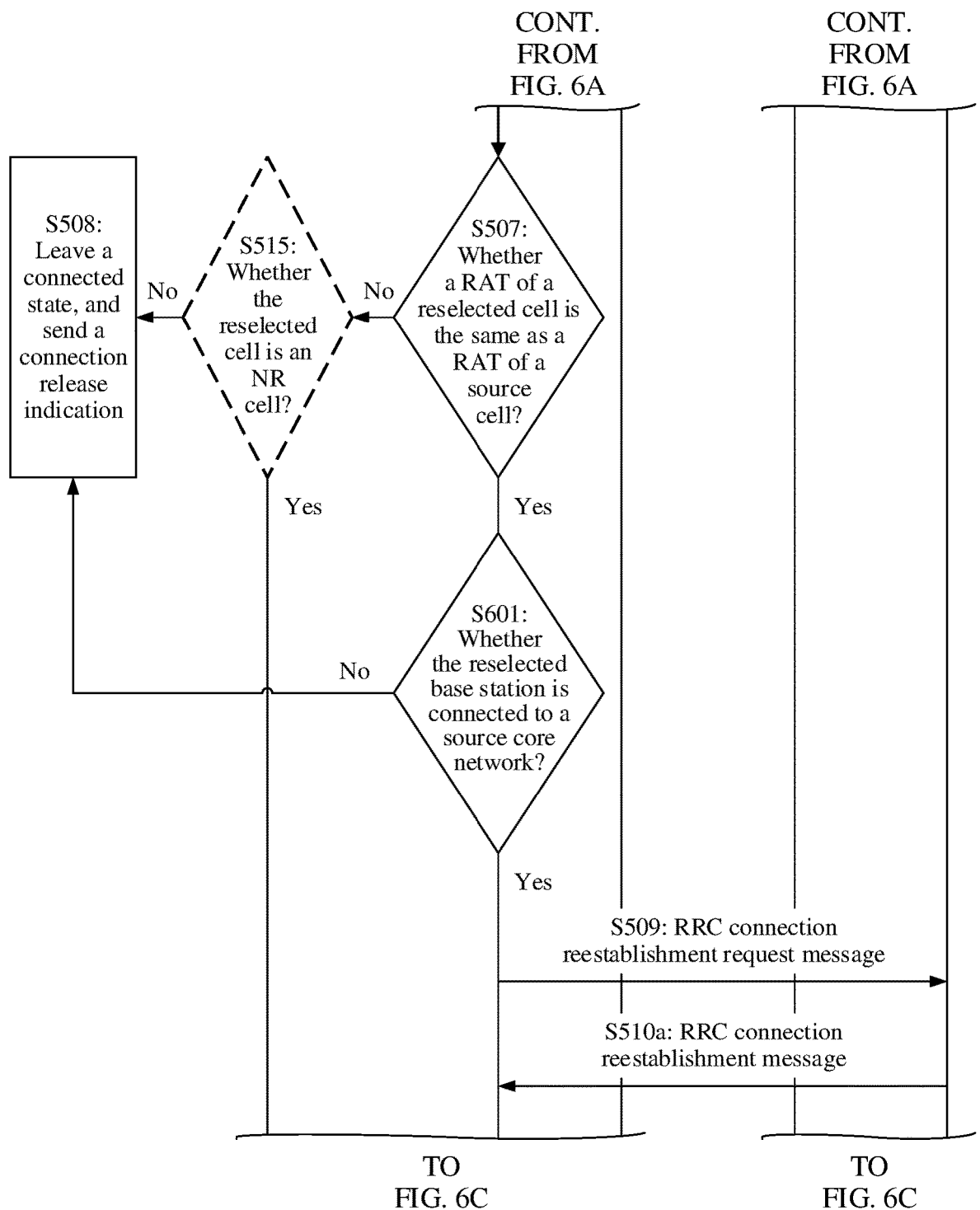
Figure 6C:
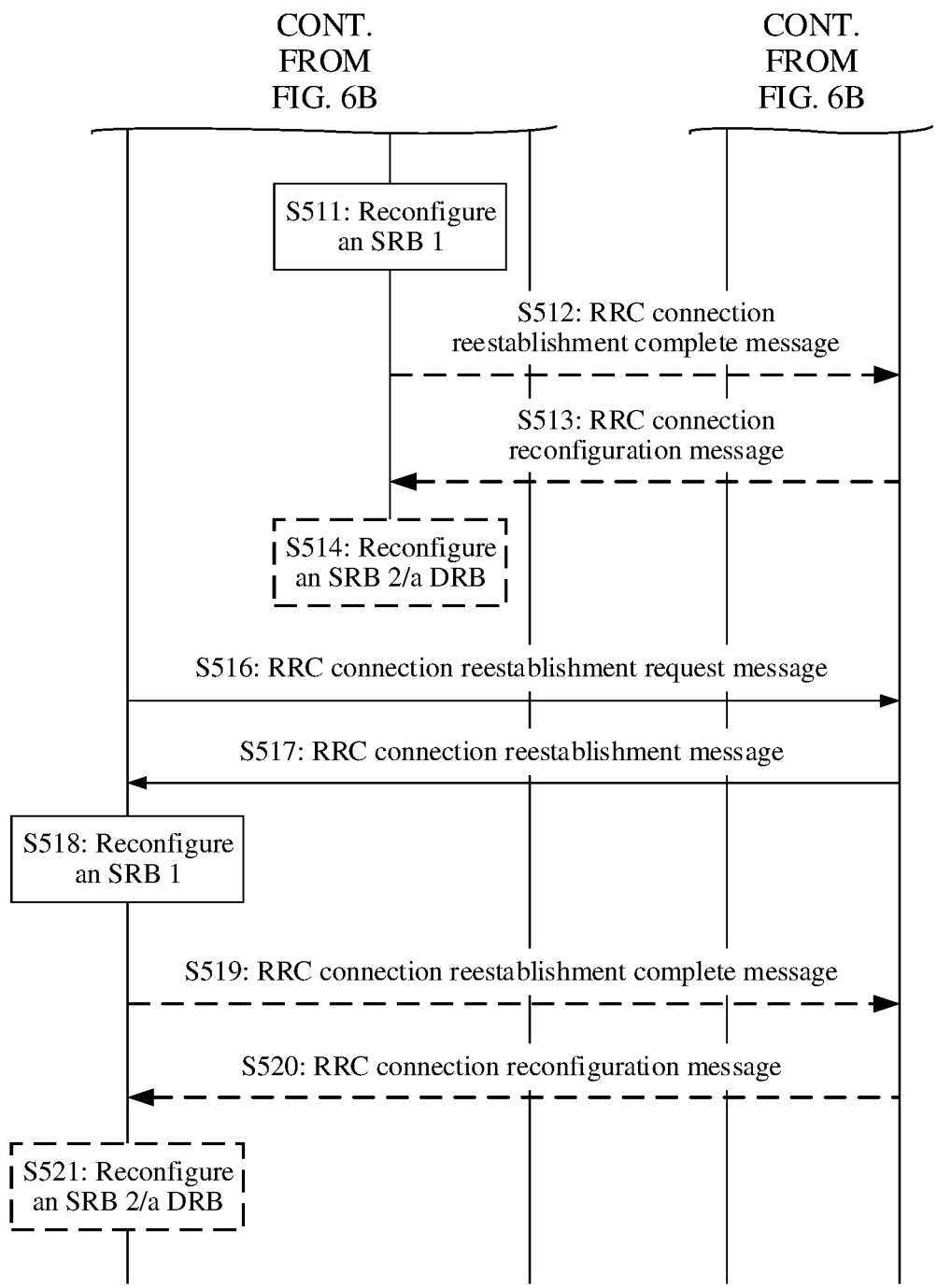

Specifically, with reference to FIG. 5A to FIG. 5C, as shown in FIG. 6A to FIG. 6C, between S507 and S509, the connection reestablishment method provided in this embodiment of this application further includes S601; and after S509, only S510a to S514 are included, and S510b is not included. S601 is as follows:

S601: The terminal device determines whether the reselected base station is connected to the source core network.

The reselected base station can reestablish an RRC connection for the terminal device and continue to provide a connection to the source core network for the terminal device, only when the reselected base station is connected to the source core network. The reselected base station needs to have the context of the terminal device, to perform check based on the context of the terminal device. Therefore, when the reselected base station is connected to the source core network, the terminal device performs S509.

When the reselected base station is not connected to the source core network, the reselected base station cannot support RRC connection reestablishment of the terminal device. Therefore, after determining that the reselected base station is not connected to the source core network, the terminal device leaves the connected mode, and sends the connection release indication to the upper layer, that is, performs S508.

Optionally, in the connection reestablishment method provided in this application, the suitable (suitable) cell may be further redefined. The suitable (suitable) cell is redefined as a cell that can be connected to the source core network or connected to a core network of a same type as the source core network. In other words, the first cell determined by the terminal device is a cell that can be connected to the source core network or connected to the core network of the same type as the source core network. In this way, when the RAT of the first cell is the same as the RAT of the source cell, a possibility that the reselected base station sends the RRC connection reestablishment message to the terminal device after the terminal device sends the RRC connection reestablishment request message to the reselected base station increases, and a possibility that the reselected base station sends the RRC connection reestablishment reject message because the reselected base station does not support the type of the source core network decreases.

Figure 7A:
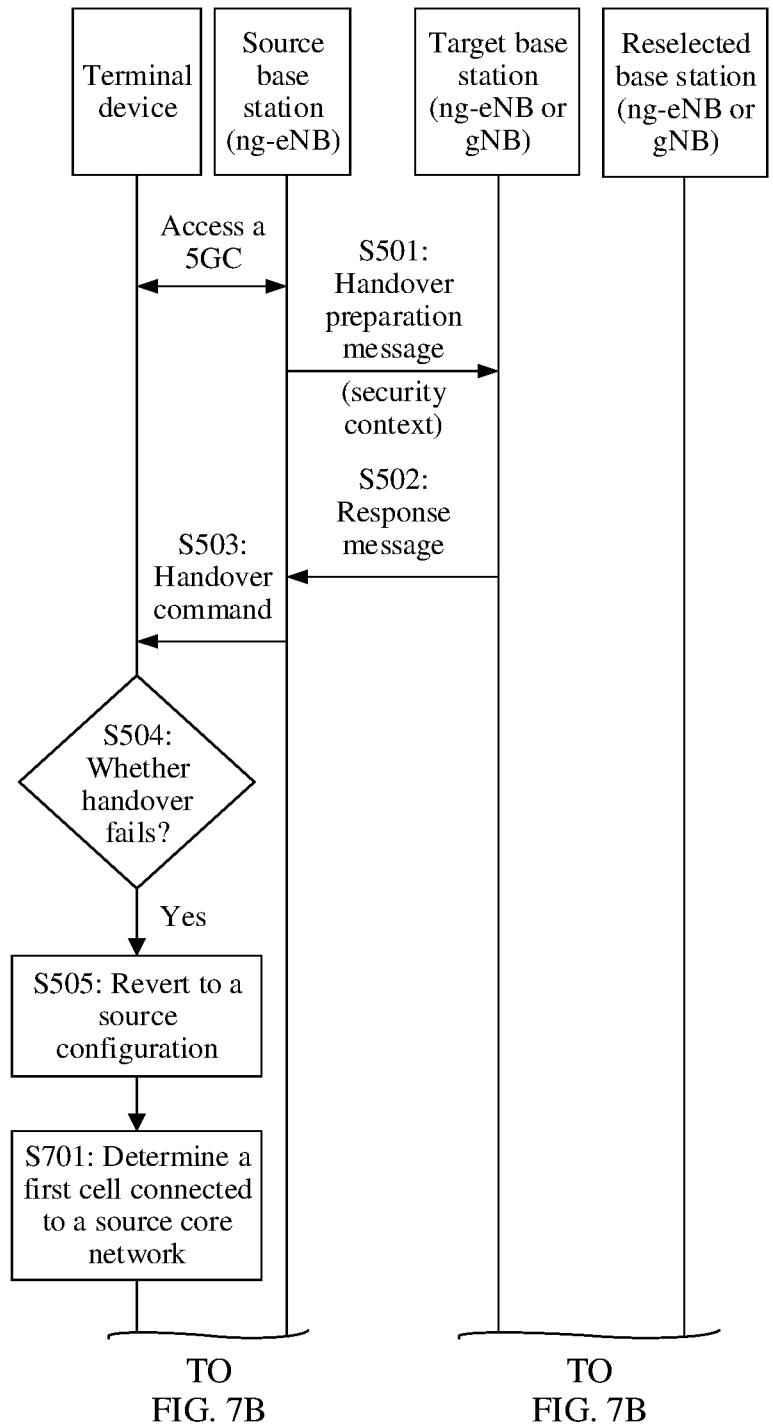
FIG. 7A to FIG. 7C are a schematic flowchart 3 of a connection reestablishment method according to an embodiment of this application.
Figure 7B:
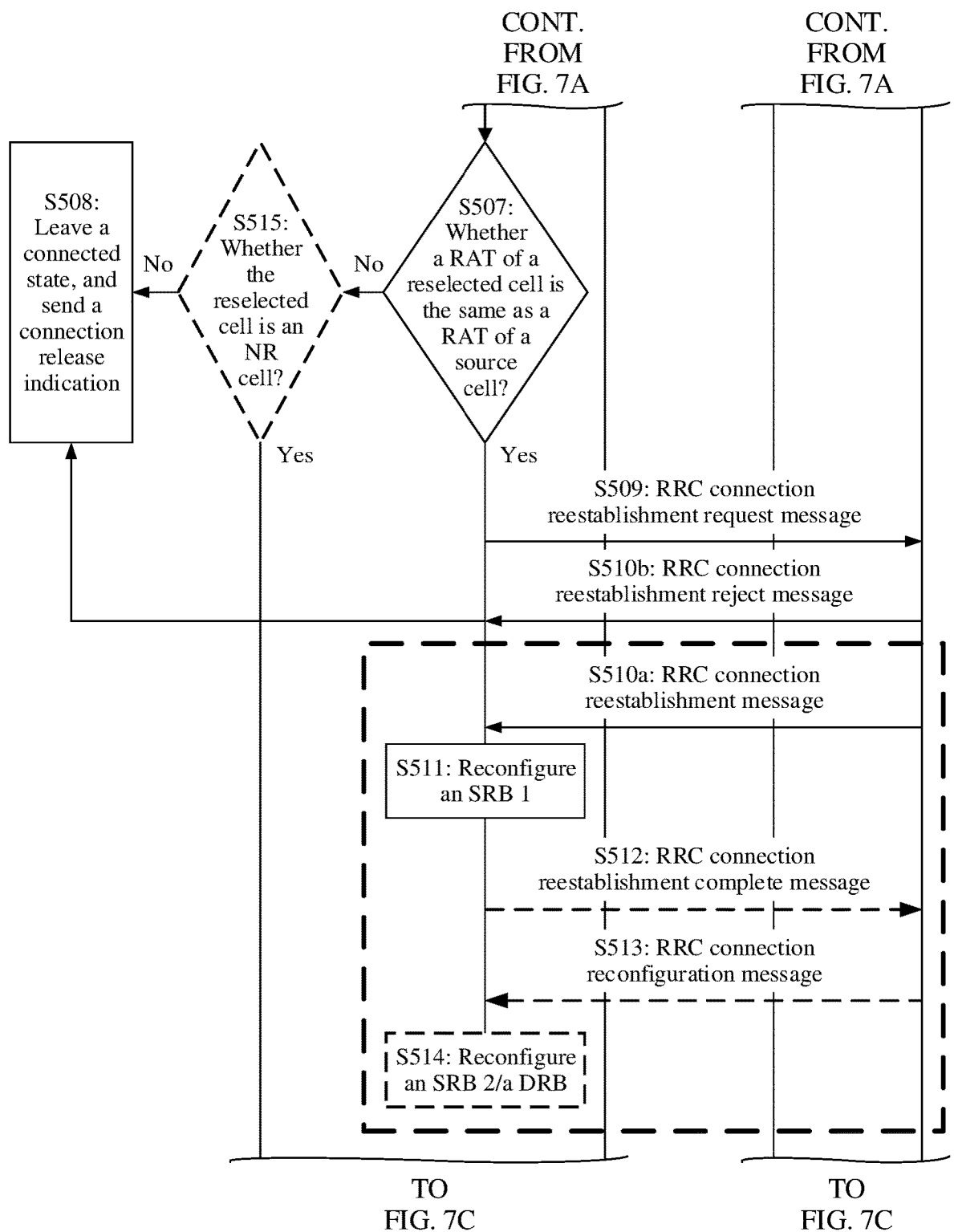
Figure 7C:
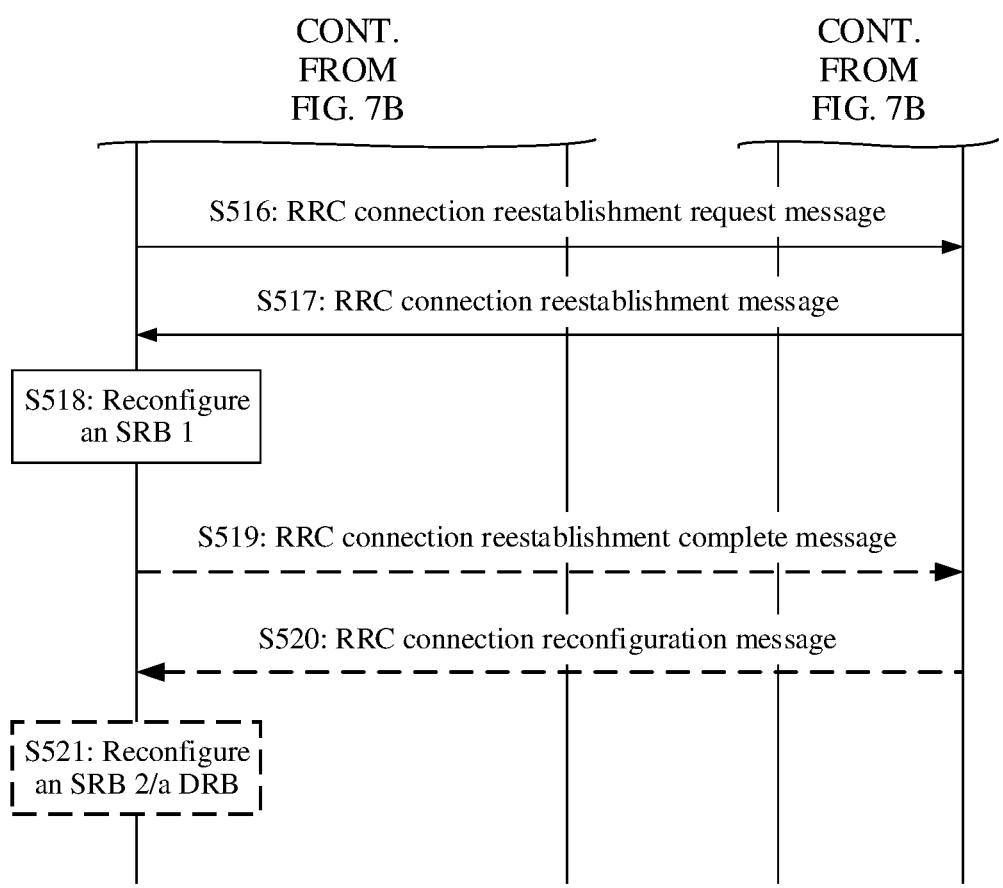

With reference to FIG. 5A to FIG. 5C, FIG. 7A to FIG. 7C show a procedure of a connection reestablishment method in a scenario in which a suitable cell is redefined. As shown in FIG. 7A to FIG. 7C, the method includes S501 to S505, S701, S507 to S509, S510a to S514, and S515 to S521. S701 is as follows.

S701: The terminal device starts a second timer, performs cell reselection, and determines a first cell connected to the source core network.

For example, a reselected cell is a suitable cell. The terminal device may consider only a cell that supports a connection to the source core network, as the suitable cell.

It can be learned that, in this embodiment of this application, after the handover fails, the terminal device not only determines whether the RAT of the first cell is the same as the RAT of the source cell, but also determines whether the first cell is connected to the source core network. The terminal device determines, based on all determining results, whether to send the RRC connection reestablishment request message to the reselected base station, thereby effectively increasing a probability of resuming an RRC connection by the terminal device, and reducing signaling exchange.

It should be noted that, for the implementations shown in FIG. 5A to FIG. 5C, FIG. 6A to FIG. 6C, and FIG. 7A to FIG. 7C, steps S501 to S504 are steps in a handover scenario, and may be used as optional steps. The solution in steps S505 to S521 may be applicable to a common RRC connection reestablishment procedure, and a trigger condition of the RRC connection reestablishment procedure may be a handover failure, a radio link failure, an RRC reconfiguration failure, an integrity check failure, or the like.

Figure 8A:
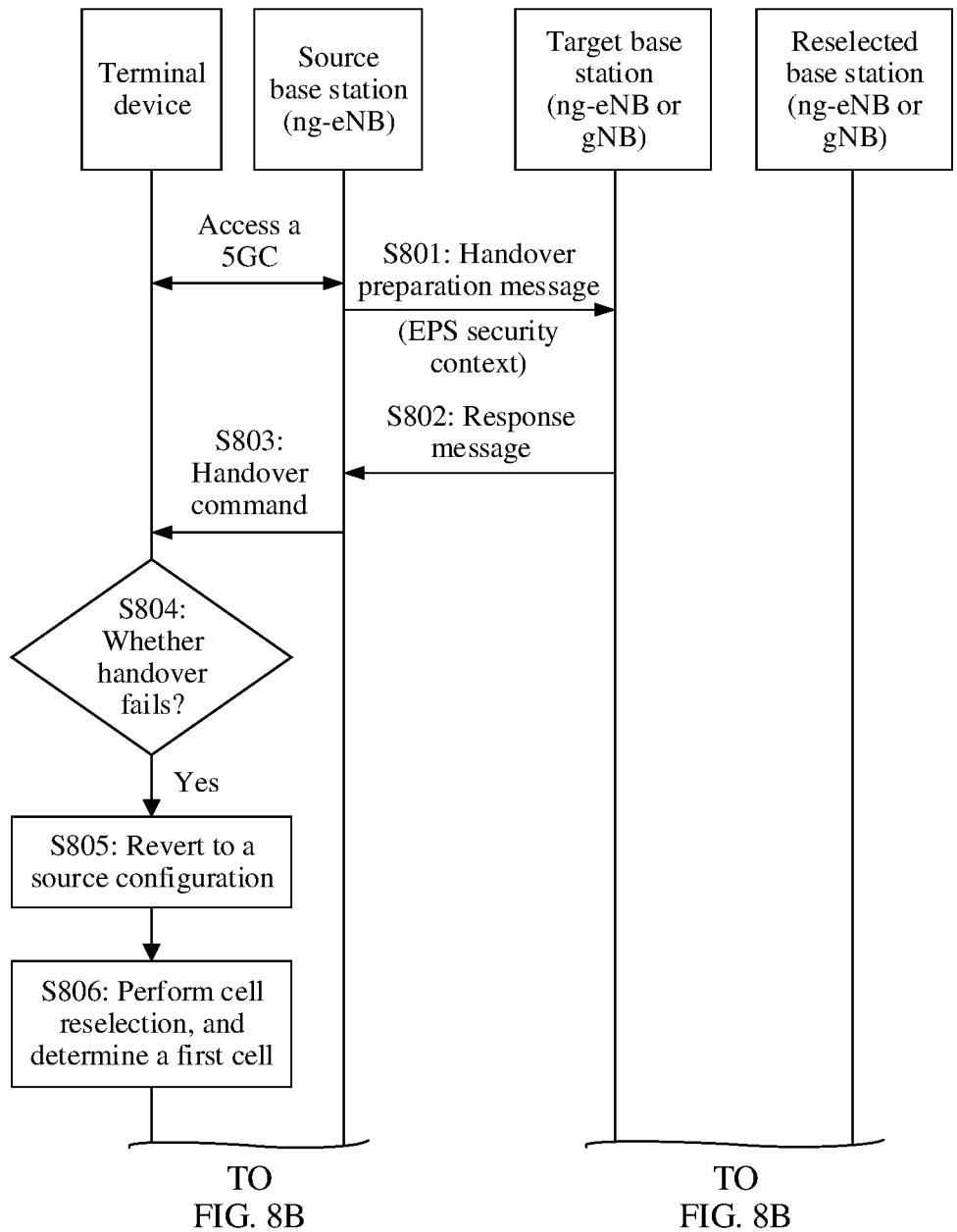
FIG. 8A and FIG. 8B are a schematic flowchart 4 of a connection reestablishment method according to an embodiment of this application.
Figure 8B:
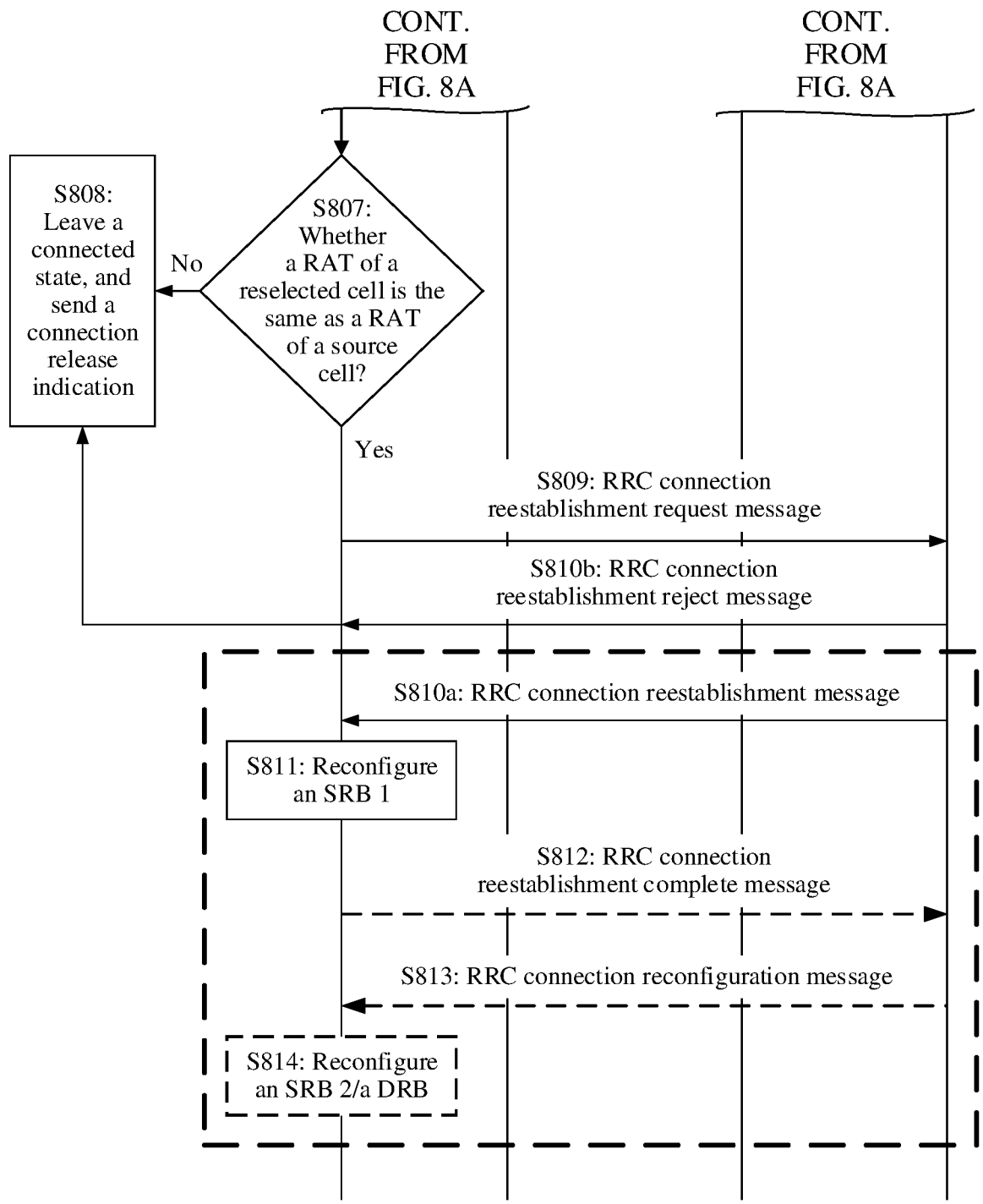

FIG. 8A and FIG. 8B show a connection reestablishment method provided in an embodiment of this application in a scenario in which a source base station is an ng-eNB or an eNB, a source core network is an EPC, and a source cell is an E-UTRA-EPC cell. As shown in FIG. 8A and FIG. 8B, the processing method includes the following steps.

S801: After determining to hand over a terminal device from the source cell to a target cell that is served by a target base station, the source base station sends a handover preparation message to the target base station or the source core network.

The target base station in this scenario may be an ng-eNB, an eNB, or a gNB.

Optionally, when the target base station is an ng-eNB/eNB, if the source base station triggers inter-core-network handover, and the target base station also supports a connection to the source core network, the handover preparation message further includes a source context of the terminal device, for example, a security context of the terminal device in the EPS, where the security context includes first security parameter information. In this way, a probability of successful connection reestablishment of the terminal device can be increased.

S802: In response to the handover preparation message, the target base station prepares a resource for the UE, and sends, to the source base station, a response message used to indicate to hand over the UE.

S803: The source base station sends a handover command to the terminal device.

The handover command includes first duration.

S804: The terminal device performs a handover operation according to the handover command, and determines whether the handover fails.

It can be learned from the foregoing description that, after receiving the handover command, the terminal device starts a first timer, and updates a related configuration of the terminal device to a configuration of the target cell. Duration of the first timer is the first duration. If the terminal device has not completed the handover when the first timer expires, the terminal device determines that the handover fails.

S805: If the terminal device is unsuccessfully handed over, the terminal device reverts to (revert back to) a source configuration, and starts an RRC connection reestablishment procedure.

S806: The terminal device starts a second timer, performs cell reselection, and determines a first cell.

S807: The terminal device determines whether a RAT of the first cell is the same as a RAT of the source cell.

Optionally, the terminal device determines the RAT of the first cell based on a cell frequency, a physical signal characteristic, or a synchronization signal. After determining the RAT of the first cell, the terminal device determines whether the RAT of the first cell is the same as the RAT of the source cell.

If the RAT of the first cell is different from the RAT of the source cell, the terminal device performs S808 after S807. If the RAT of the first cell is the same as the RAT of the source cell, the terminal device performs S809 after S807.

S808: The terminal device leaves a connected mode, and sends a connection release indication including a connection release cause value to an upper layer.

In this embodiment, the source cell is an E-UTRA-EPC cell. If the RAT of the first cell is different from the RAT of the source cell, the first cell should be an NG cell, and the reselected base station is a gNB.

Optionally, the terminal device leaves the connected mode, enters an idle mode, and sends the connection release indication including the connection release cause value to a NAS. In this way, the NAS can determine, based on the connection release cause value, whether to change a type of a core network.

S809: The terminal device sends an RRC connection reestablishment request message to the reselected base station.

In this embodiment, the source cell is an E-UTRA-EPC cell. If the RAT of the first cell is the same as the RAT of the source cell, the first cell is an E-UTRA-5GC cell or an E-UTRA-EPC cell.

If the first cell is an E-UTRA-EPC cell, both the first cell and the source cell are connected to the EPC. In this way, if the reselected base station can obtain the context of the terminal device, and further check the RRC connection reestablishment request message based on the context of the terminal device, the reselected base station may accept the request sent by the terminal device.

In addition, if the RAT of the first cell is the same as the RAT of the source cell, the terminal device further retains a security configuration of the terminal device. For a specific process in which the terminal device retains the security configuration of the terminal device, refer to the foregoing description. Details are not described herein again.

If the first cell is an E-UTRA-EPC cell, S810a and S811 are sequentially performed after S809.

If the first cell is an E-UTRA-5GC cell, in other words, the reselected cell is not connected to the source core network, the reselected cell cannot reestablish an RRC connection for the UE and resume a connection to the source core network. In this case, the reselected base station rejects the request sent by the terminal device. If the first cell is an E-UTRA-5GC cell, S810b is performed after S809.

S810a: The reselected base station sends an RRC connection reestablishment message to the terminal device.

The RRC connection reestablishment message includes configuration information of an SRB 1.

S811: The terminal device reconfigures the SRB 1 based on the configuration information of the SRB 1.

For a method used by the terminal device to reconfigure the SRB 1 based on the configuration information of the SRB 1, refer to the description in step 8. Details are not described herein again.

Optionally, after S811, S812 to S814 are further included.

S812 (optional): The terminal device sends an RRC connection reestablishment complete message to the reselected base station through the reconfigured SRB 1.

S813 (optional): The reselected base station sends an RRC connection reconfiguration message to the terminal device.

The RRC connection reconfiguration message may include configuration information of a target RB (an SRB 2 and/or a DRB).

S814 (optional): The terminal device reconfigures or configures the target RB based on the configuration information of the target RB.

For S814, refer to the description of step 11. Details are not described herein again.

S810b: The reselected base station sends an RRC connection reestablishment reject message to the terminal device.

Optionally, the RRC connection reestablishment reject message includes a reject cause value, and the reject cause value may be one or a combination of the following information: the reselected base station/cell is not connected to the source core network, the terminal device is indicated to change a core network, and a core network (for example, a 5GC) connected to the reselected base station/cell. Optionally, the terminal device performs NAS recovery or NAS switching (for example, changing an operating NAS from an EPS NAS to a 5GS NAS) based on a reject cause.

After receiving the RRC connection reestablishment reject message, the terminal device performs S808.

Figure 9A:
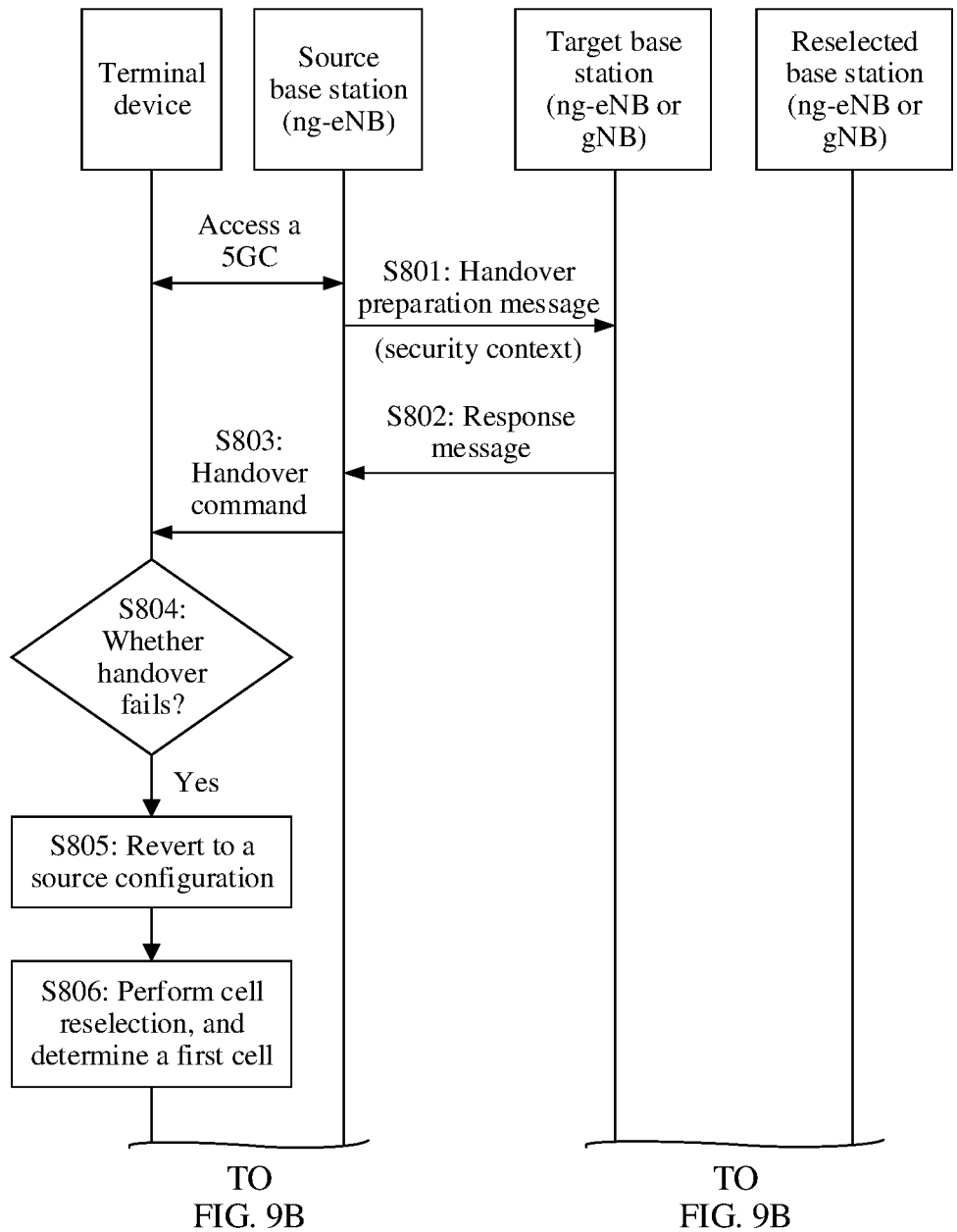
FIG. 9A and FIG. 9B are a schematic flowchart 5 of a connection reestablishment method according to an embodiment of this application.
Figure 9B:
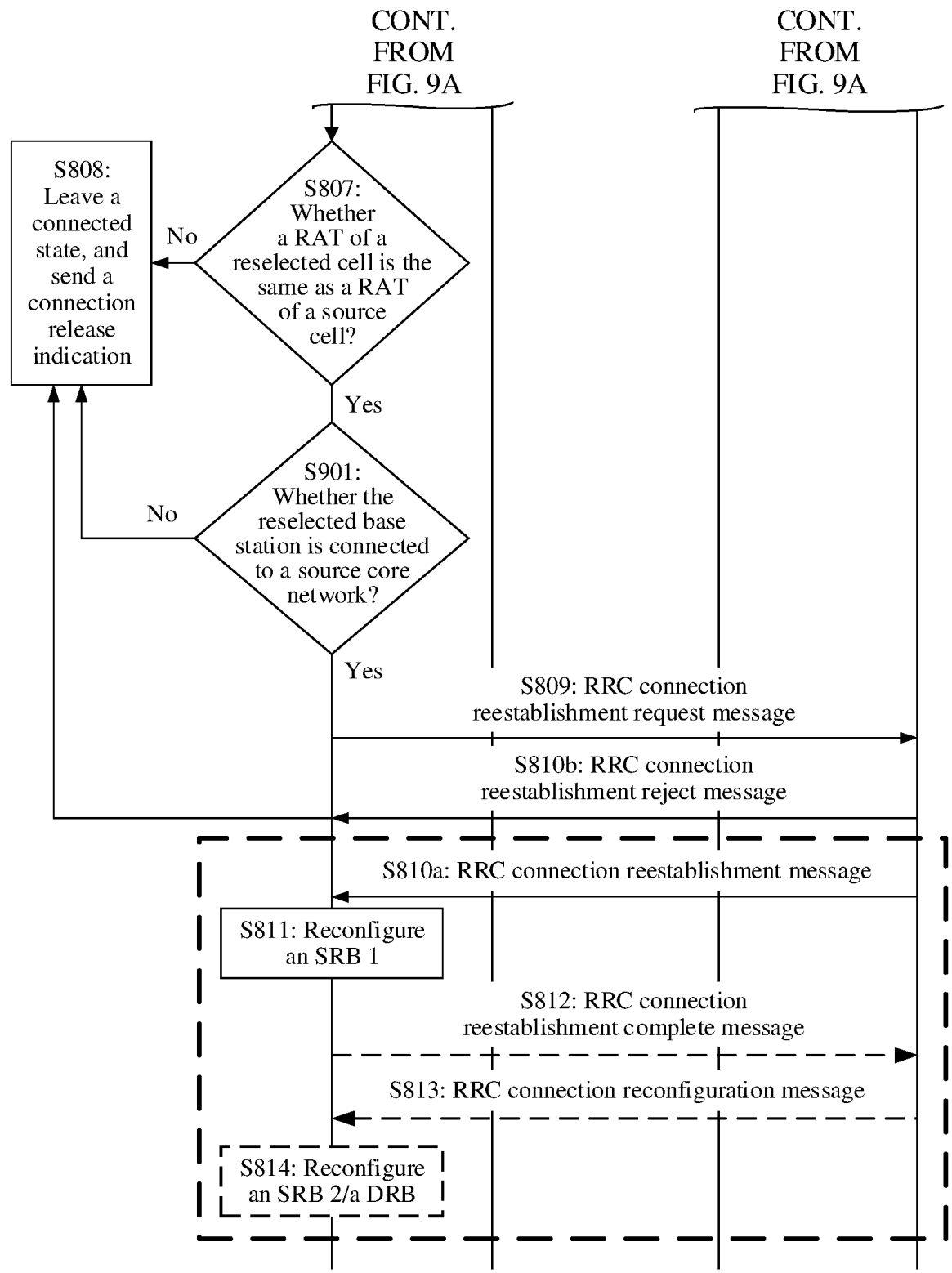

Specifically, with reference to FIG. 8A and FIG. 8B, as shown in FIG. 9A and FIG. 9B, between S807 and S809, the connection reestablishment method provided in this embodiment of this application further includes S901. S901 is as follows.

S901: The terminal device determines whether the reselected base station is connected to the source core network.

The reselected base station can reestablish an RRC connection for the UE and resume the connection to the source core network, only when the reselected base station is connected to the source core network. If the reselected base station has the context of the terminal device, the reselected base station performs check based on the obtained context of the terminal device. Therefore, when the reselected base station is connected to the source core network, the terminal device performs S809.

When the reselected base station is not connected to the source core network, the reselected base station cannot support RRC connection reestablishment of the terminal device. Therefore, after determining that the reselected base station is not connected to the source core network, the terminal device leaves the connected mode, and sends the connection release indication to the upper layer, that is, performs S808.

Optionally, in the connection reestablishment method provided in this application, the suitable cell may be further redefined. The suitable cell is redefined as a cell that can be connected to the source core network or connected to a core network of a same type as the source core network. In other words, the first cell determined by the terminal device is a cell that can be connected to the source core network or connected to the core network of the same type as the source core network. In this way, when the RAT of the first cell is the same as the RAT of the source cell, after the terminal device sends the RRC connection reestablishment request message to the reselected base station, the reselected base station sends the RRC connection reestablishment message rather than the RRC connection reestablishment reject message to the terminal device.

Figure 10A:
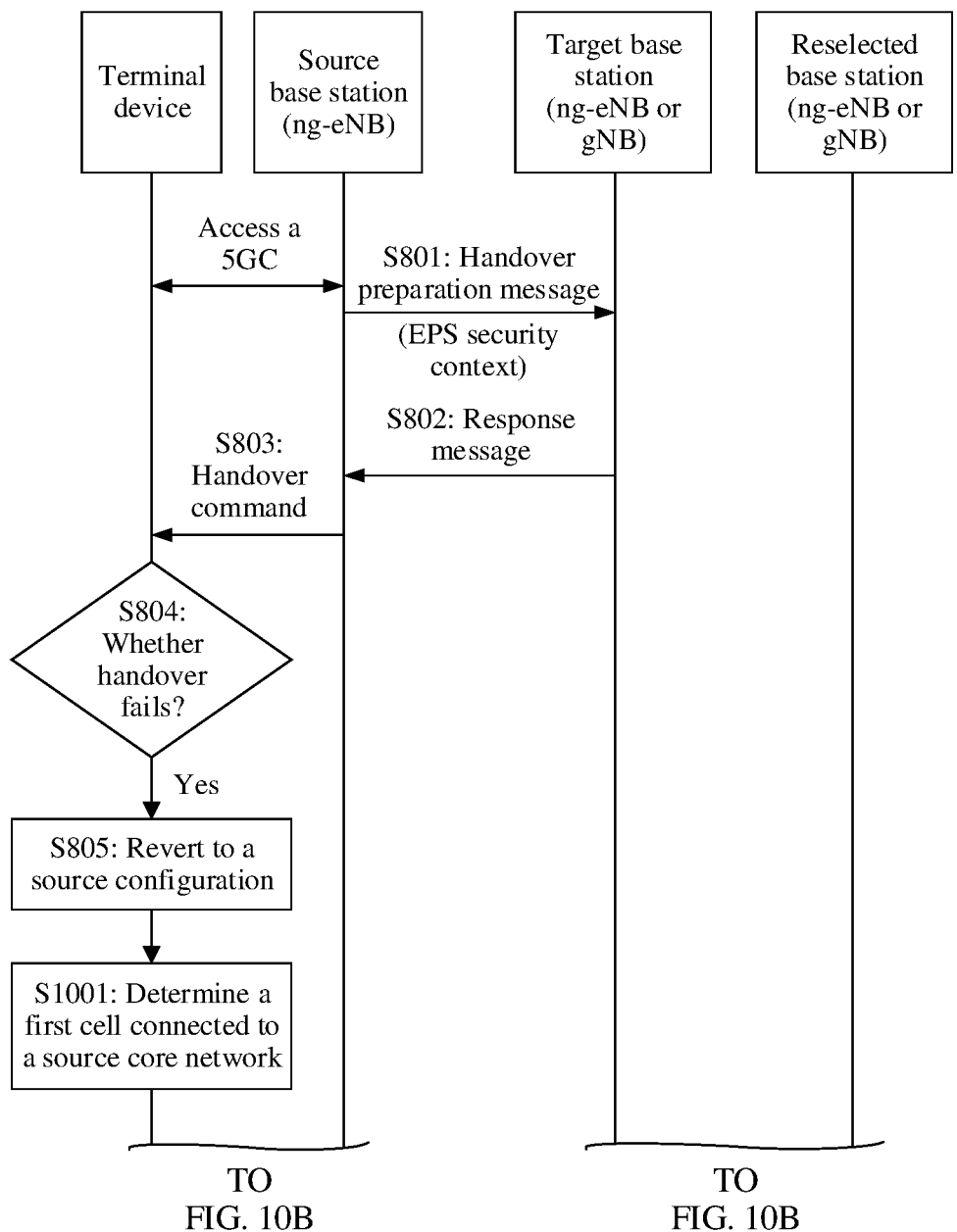
FIG. 10A and FIG. 10B are a schematic flowchart 6 of a connection reestablishment method according to an embodiment of this application.
Figure 10B:
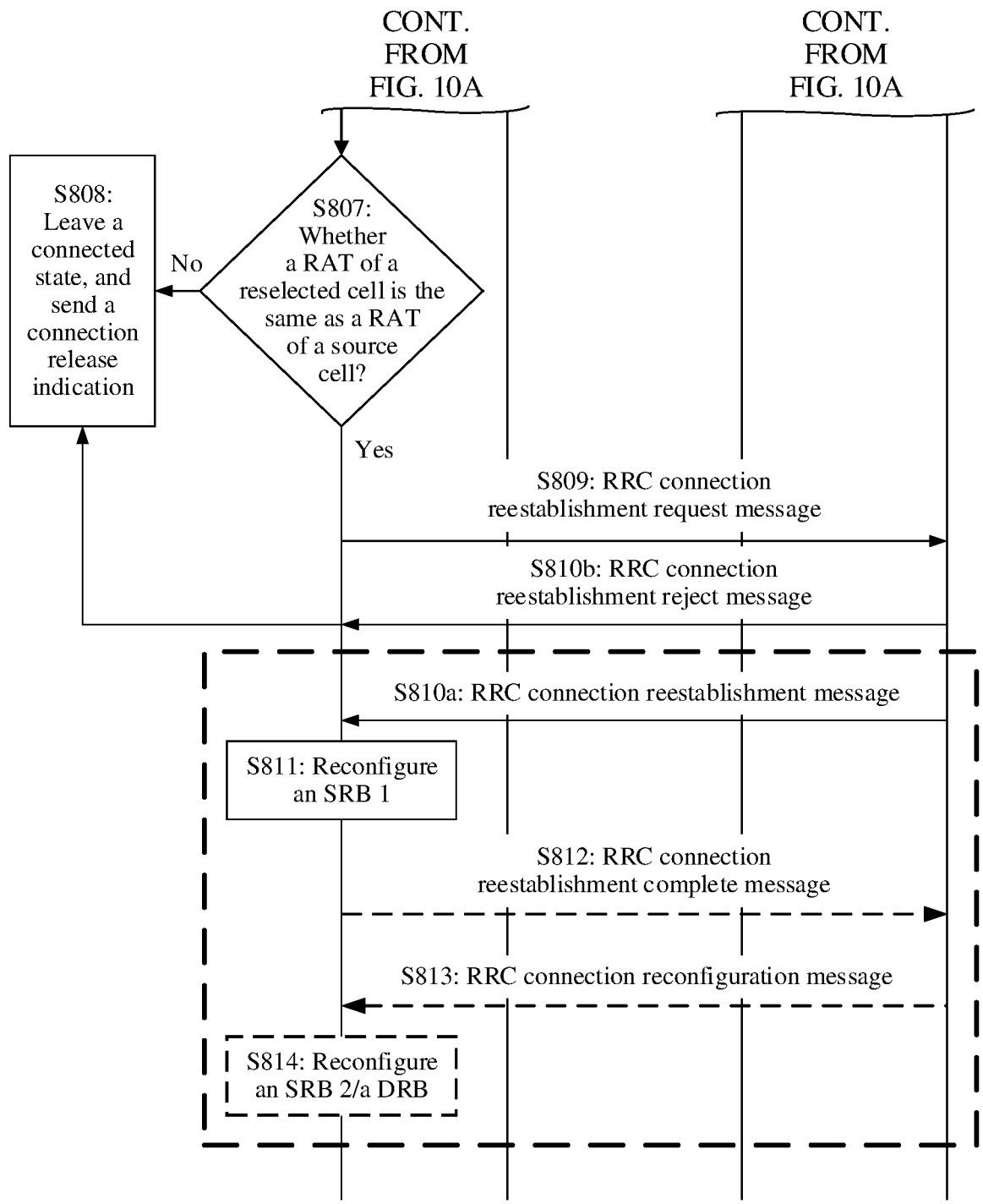

With reference to FIG. 8A and FIG. 8B, FIG. 10A and FIG. 10B show a procedure of a connection reestablishment method in a scenario in which a suitable cell is redefined. As shown in FIG. 10A and FIG. 10B, in the connection reestablishment method, S806 in FIG. 8A is replaced with S1001. S1001 is as follows.

S1001: The terminal device starts a second timer, performs cell reselection, and determines a first cell connected to the source core network.

It can be learned that, in this embodiment of this application, after the handover fails, the terminal device not only determines whether the RAT of the first cell is the same as the RAT of the source cell, but also determines whether the first cell is connected to the source core network. The terminal device determines, based on all determining results, whether to send the RRC connection reestablishment request message to the reselected base station, thereby effectively increasing a probability of resuming an RRC connection by the terminal device, and reducing signaling exchange.

It should be noted that, for the implementations shown in FIG. 8A and FIG. 8B, FIG. 9A and FIG. 9B, and FIG. 10A and FIG. 10B, steps S801 to S804 are steps in a handover scenario, and may be used as optional steps. The solution in steps S805 to S814 and S901 may be applicable to a common RRC connection reestablishment procedure, and a trigger condition of the RRC connection reestablishment procedure may be a handover failure, a radio link failure, an RRC reconfiguration failure, an integrity check failure, or the like.

Figure 11A:
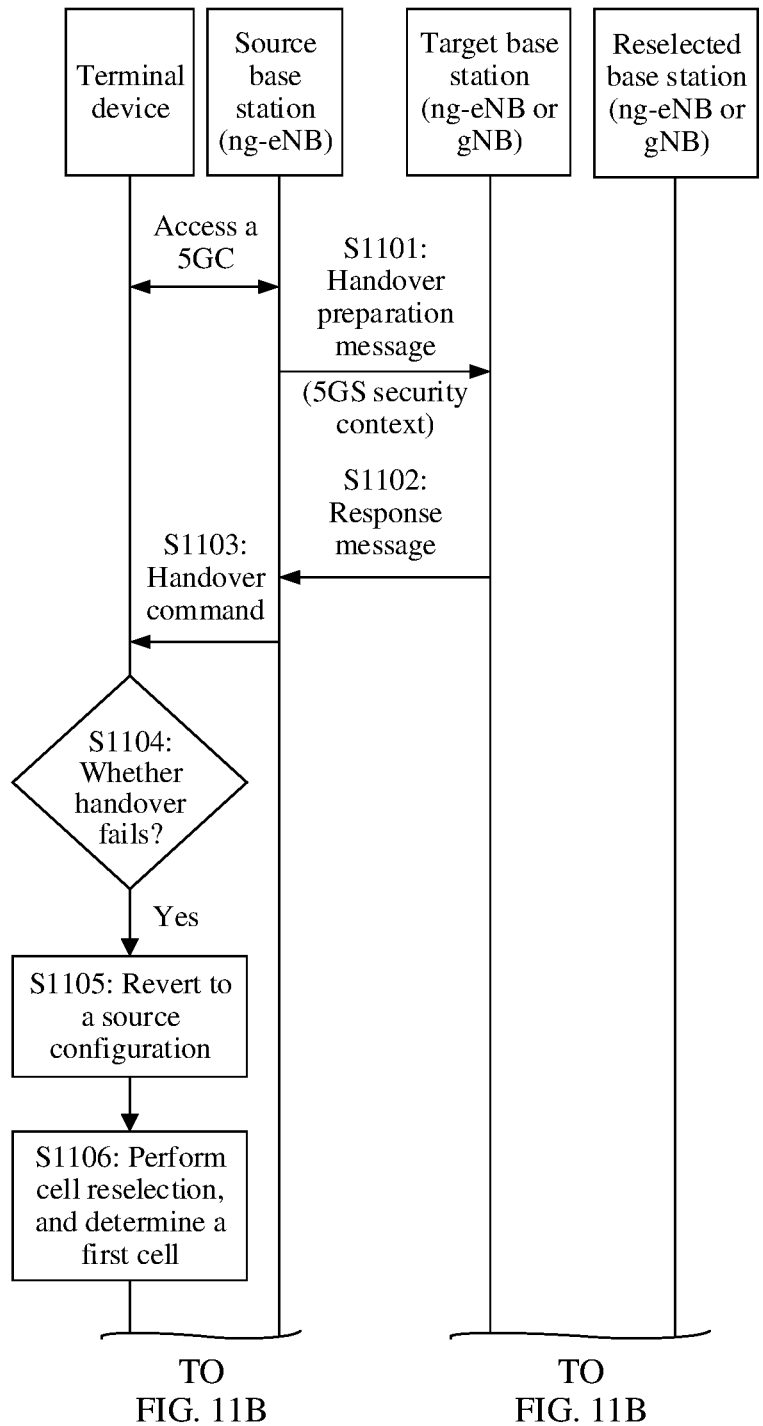
FIG. 11A to FIG. 11C are a schematic flowchart 7 of a connection reestablishment method according to an embodiment of this application.
Figure 11B:
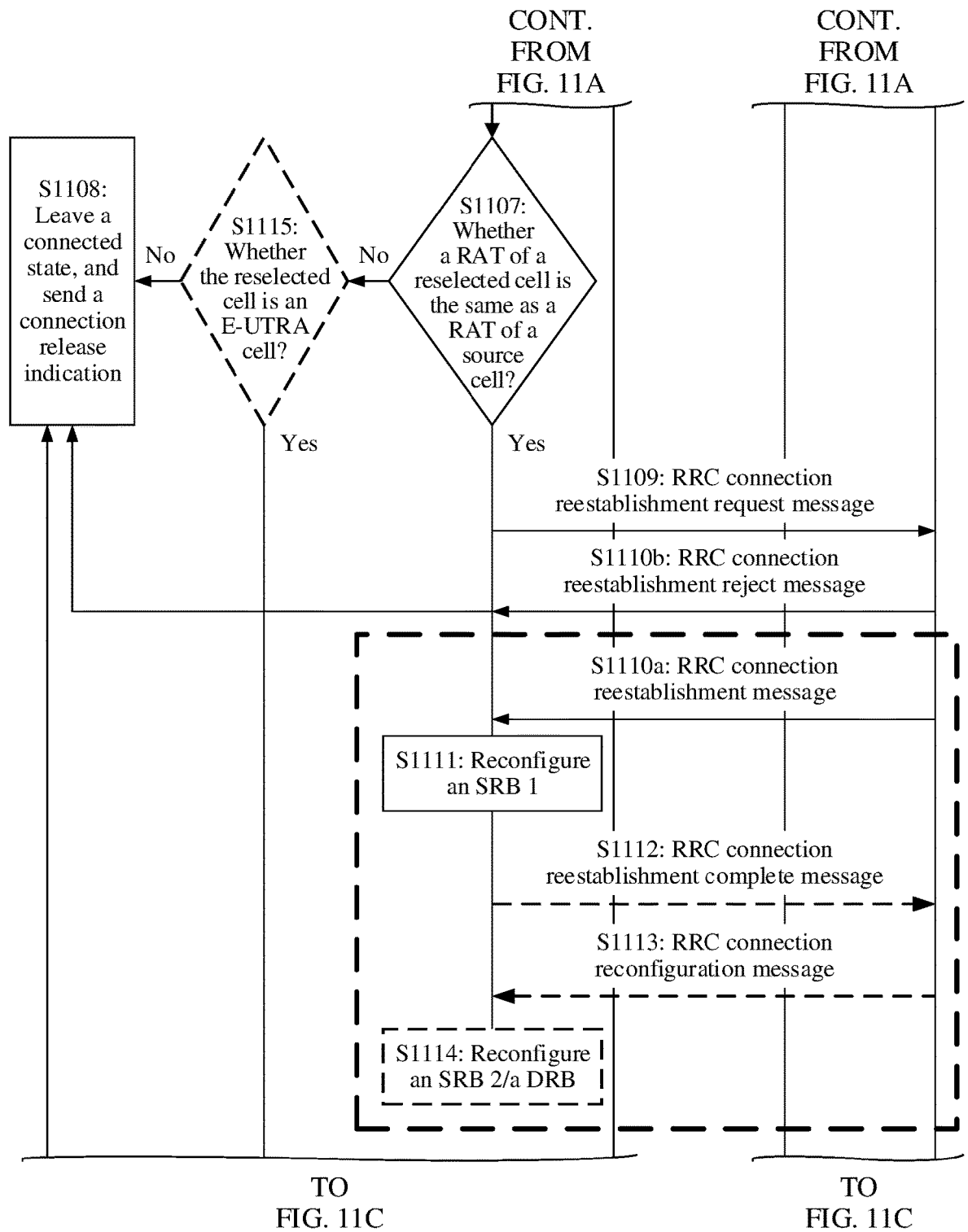
Figure 11C:
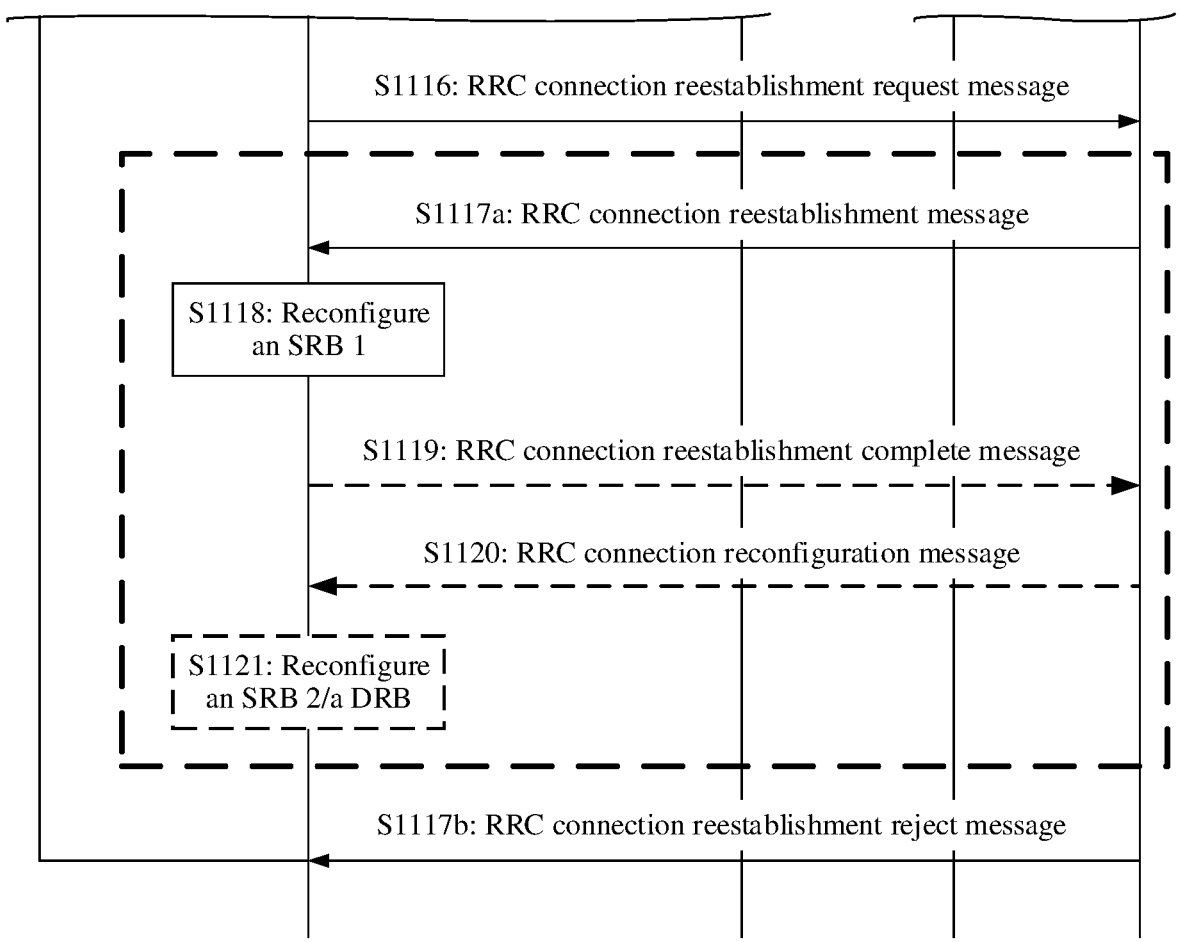

FIG. 11A to FIG. 11C show a connection reestablishment method provided in an embodiment of this application in a scenario in which a source base station is a gNB, a source core network is a 5GC, and a source cell is an NR cell. As shown in FIG. 11A to FIG. 11C, the processing method includes the following steps.

S1101: After determining to hand over a terminal device from the source cell to a target cell that is served by a target base station, the source base station sends a handover preparation message to the target base station.

Optionally, when the target base station is an ng-eNB, the source base station triggers inter-core-network handover (that is, a type of a target core network is an EPC), and the target base station is also connected to the source core network, the source base station may include a source context of the UE, for example, a security context of the terminal device in the 5GS, in the handover preparation message, where the security context includes first security parameter information. In this case, the context of the UE in the source system may be carried in the inter-core-network handover, to increase a possibility that the UE successfully reestablishes a connection in a cell of the target base station.

S1102: In response to the handover preparation message, the target base station prepares a resource for the UE, and sends, to the source base station, a response message used to indicate to hand over the UE.

S1103: The source base station sends a handover command to the terminal device.

The handover command includes first duration.

S1104: The terminal device performs a handover operation according to the handover command, and determines whether the handover fails.

It can be learned from the foregoing description that, after receiving the handover command, the terminal device starts a first timer, and updates a related configuration of the terminal device to a configuration of the target cell. Duration of the first timer is the first duration. If the terminal device has not completed the handover when the first timer expires, the terminal device determines that the handover fails.

S1105: If the terminal device is unsuccessfully handed over, the terminal device reverts to (revert back to) a source configuration, and starts an RRC connection reestablishment procedure.

S1106: The terminal device starts a second timer, performs cell reselection, and determines a first cell.

S1107: The terminal device determines whether a RAT of the first cell is the same as a RAT of the source cell.

Optionally, the terminal device determines the RAT of the first cell based on a cell frequency, a physical signal characteristic, or a synchronization signal. After determining the RAT of the first cell, the terminal device determines whether the RAT of the first cell is the same as the RAT of the source cell.

If the RAT of the first cell is different from the RAT of the source cell, the terminal device performs S1108 after S1107. If the RAT of the first cell is the same as the RAT of the source cell, the terminal device performs S1109 after S1107.

S1108: The terminal device leaves a connected mode, and sends a connection release indication including a connection release cause value to an upper layer.

In this embodiment, the source cell is an NR cell. If the RAT of the first cell is different from the RAT of the source cell, when the reselected base station should be an ng-eNB, optionally, the terminal device leaves the connected state, enters an idle state, and sends the connection release indication including the connection release cause value to a NAS. In this way, the NAS can determine, based on the connection release cause value, whether to change a type of a core network.

S1109: The terminal device sends an RRC connection reestablishment request message to the reselected base station.

In this embodiment, the source cell is an NR cell. If the RAT of the first cell is the same as the RAT of the source cell, the first cell is an NR cell.

If a reselected cell is an NR cell, both the reselected cell and the source cell are connected to the 5GC. If the reselected base station has a context of the terminal device, the reselected base station may check the RRC connection reestablishment request message based on the context of the terminal device. If the check succeeds, the reselected base station may accept the reestablishment request sent by the terminal device.

In addition, if the RAT of the first cell is the same as the RAT of the source cell, the terminal device further retains a security configuration of the terminal device. For a specific process in which the terminal device retains the security configuration of the terminal device, refer to the foregoing description. Details are not described herein again.

If the first cell is an NR cell, S1110a and S1111 are sequentially performed after S1109.

If the first cell does not have the context of the UE or the check fails, the reselected base station rejects the request sent by the terminal device. In this case, S1110b is performed after S1109.

S1110a: The reselected base station sends an RRC connection reestablishment message to the terminal device.

The RRC connection reestablishment message includes configuration information of an SRB 1.

S1111: The terminal device reconfigures the SRB 1 based on the configuration information of the SRB 1.

For a method used by the terminal device to reconfigure the SRB 1 based on the configuration information of the SRB 1, refer to the description in step 8. Details are not described herein again.

Optionally, after S1111, S1112 to S1114 are further included.

S1112 (optional): The terminal device sends an RRC connection reestablishment complete message to the reselected base station through the reconfigured SRB 1.

S1113 (optional): The reselected base station sends an RRC connection reconfiguration message to the terminal device.

The RRC connection reconfiguration message may include configuration information of a target RB (an SRB 2 and/or a DRB).

S1114 (optional): The terminal device reconfigures or configures the target RB based on the configuration information of the target RB.

For S1114, refer to the description of step 11. Details are not described herein again.

S1110b: The reselected base station sends an RRC connection reestablishment reject message to the terminal device.

After receiving the RRC connection reestablishment reject message, the terminal device performs S1108.

It is easy to understand that the source cell in this embodiment is an NR cell. If the reselected cell is an E-UTRA-5GC cell, the reselected base station also supports a connection to the source core network. That is, the reselected base station may reestablish an RRC connection for the UE, and may be connected to the source base station. When the reselected base station has the context of the terminal device, after the terminal device initiates an RRC connection reestablishment request, the reselected cell can resume the RRC connection of the terminal device. The NR cell has a RAT different from that of the E-UTRA-5GC cell. Therefore, in a scenario in which a RAT of the reselected cell is different from the RAT of the source cell, the terminal device may further determine whether the reselected cell is an E-UTRA cell.

Optionally, between S1107 and S1108, the connection reestablishment method provided in this embodiment may further include S1115.

S1115: The terminal device determines whether the first cell is an E-UTRA cell.

S1115 is optional, and therefore is represented by a dashed box in FIG. 11A to FIG. 11C.

If the first cell is not an E-UTRA cell, the terminal device leaves a connected mode, and sends a connection release indication to an upper layer, that is, performs S1108.

If the first cell is an E-UTRA cell, S1116 is performed after S1115. In a scenario in which the first cell is an E-UTRA cell, specifically, the first cell may be an E-UTRA-5GC cell, or may be an E-UTRA-EPC cell.

S1116: The terminal device sends an RRC connection reestablishment request message to the reselected base station.

The reselected base station in S1116 is an ng-eNB.

If the reselected cell is an E-UTRA-5GC cell, the reselected base station is connected to the source core network. If the reselected base station has the context of the terminal device, and the check performed based on the obtained context of the terminal device succeeds, the reselected base station may accept the connection reestablishment request sent by the terminal device, that is, performs S1117a after S1116. If the reselected cell is an E-UTRA-5GC cell, and the reselected base station cannot obtain the context of the terminal device, the reselected base station rejects the connection reestablishment request sent by the terminal device, that is, performs S1117b after S1116. If the reselected cell is an E-UTRA-EPC cell, the reselected base station is not connected to the source core network. In this case, the reselected base station rejects the connection reestablishment request sent by the terminal device, that is, performs S1117b after S1116.

S1117a: The reselected base station sends an RRC connection reestablishment message to the terminal device.

The RRC connection reestablishment message includes configuration information of an SRB 1. The reselected base station can obtain the context of the terminal device, and check the RRC connection reestablishment request message based on the context of the terminal device, to accept the request sent by the terminal device. Correspondingly, the reselected base station sends the RRC connection reestablishment message to the terminal device.

S1118: The terminal device reconfigures the SRB 1 based on the configuration information of the SRB 1.

For S1118, refer to the description of step 8. Details are not described herein again.

S1119 (optional): The terminal device sends an RRC connection reestablishment complete message to the reselected base station through the reconfigured SRB 1.

S1120 (optional): The reselected base station sends an RRC connection reconfiguration message to the terminal device.

The RRC connection reconfiguration message may include configuration information of a target RB (an SRB 2 and/or a DRB).

S1121 (optional): The terminal device reconfigures or configures the target RB based on the configuration information of the target RB.

For S1121, refer to the description of step 11. Details are not described herein again.

S1117b: The reselected base station sends an RRC connection reestablishment reject message to the terminal device.

Optionally, the RRC connection reestablishment reject message includes a reject cause value, and the reject cause value is used to indicate that the reselected base station/the reselected cell is not connected to the source core network of the terminal device. For example, the reject cause value may be one or a combination of the following information: the reselected base station/cell is not connected to the source core network, the UE is indicated to change a core network, and a core network connected to the reselected base station/cell. Optionally, the UE performs NAS recovery (NAS recovery) or NAS switching based on a reject cause.

After receiving the RRC connection reestablishment reject message, the terminal device performs S1108.

It can be learned from the foregoing description of S1115 that, in step S1115, the first cell is an E-UTRA-5GC cell or an E-UTRA-EPC cell. To improve a success rate of reestablishing an RRC connection by the terminal device and reduce signaling exchange, in this embodiment of this application, after the terminal device determines that the RAT of the first cell is different from the RAT of the source cell, and before the terminal device sends the RRC connection reestablishment request message to the reselected base station, whether the reselected base station that serves the first cell is connected to the source core network may be further determined.

Figure 12A:
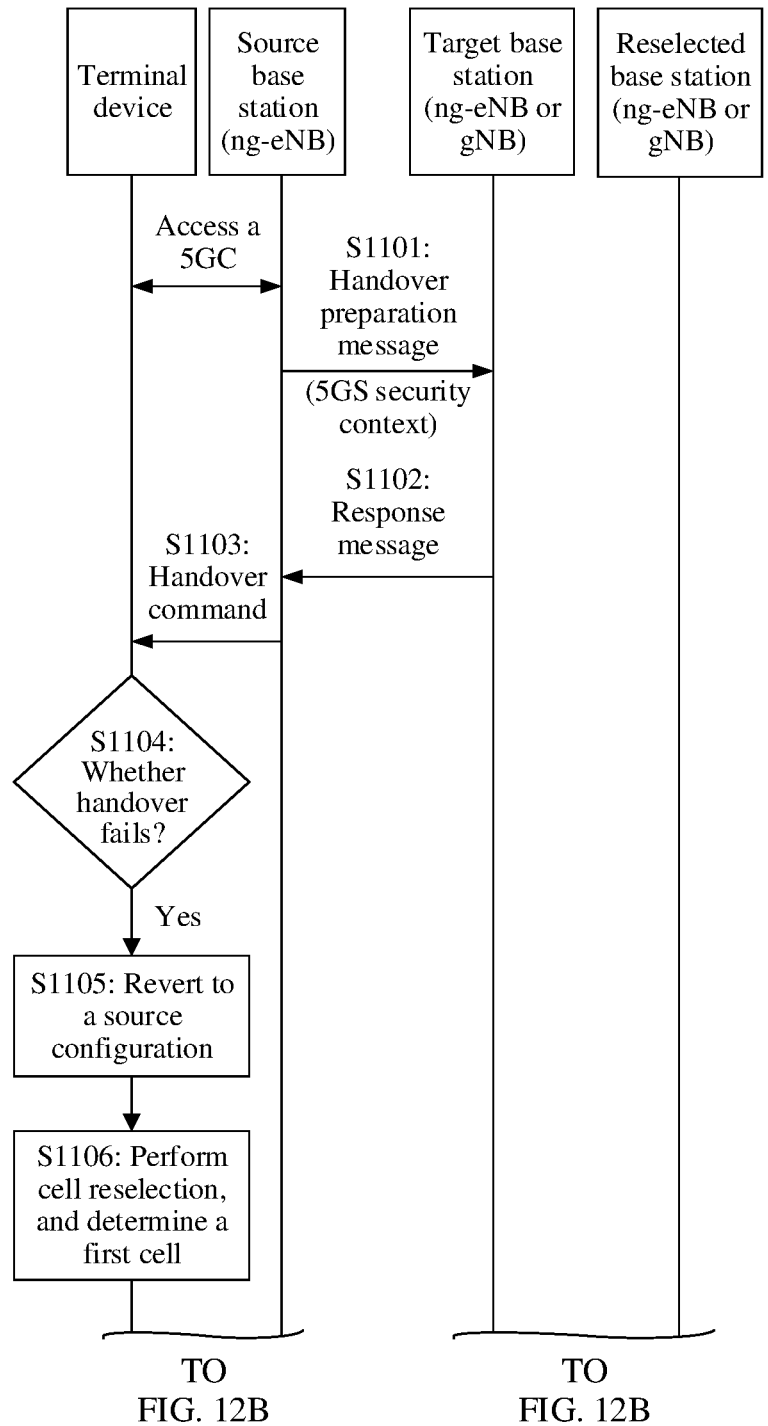
FIG. 12A to FIG. 12C are a schematic flowchart 8 of a connection reestablishment method according to an embodiment of this application.
Figure 12B:
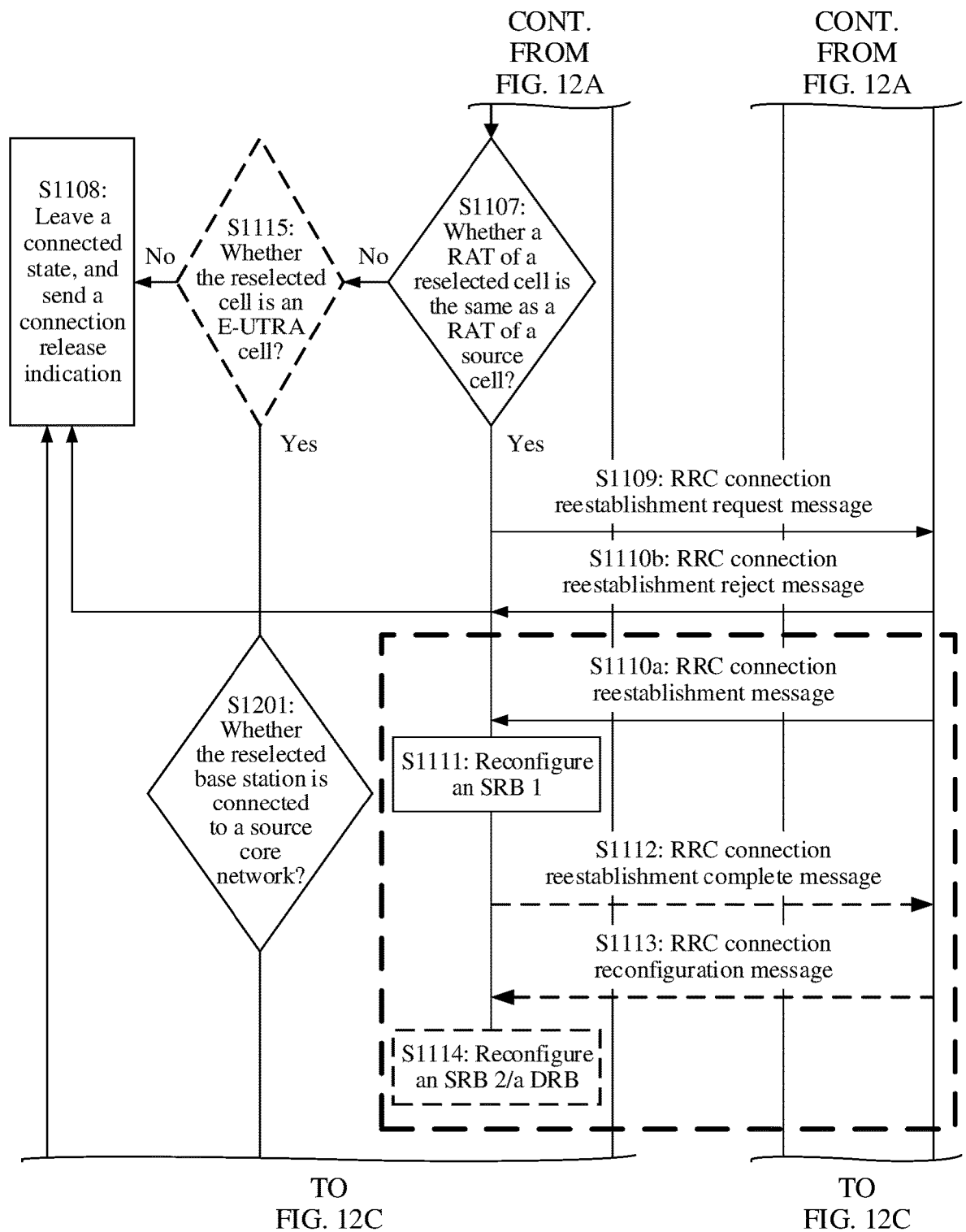
Figure 12C:
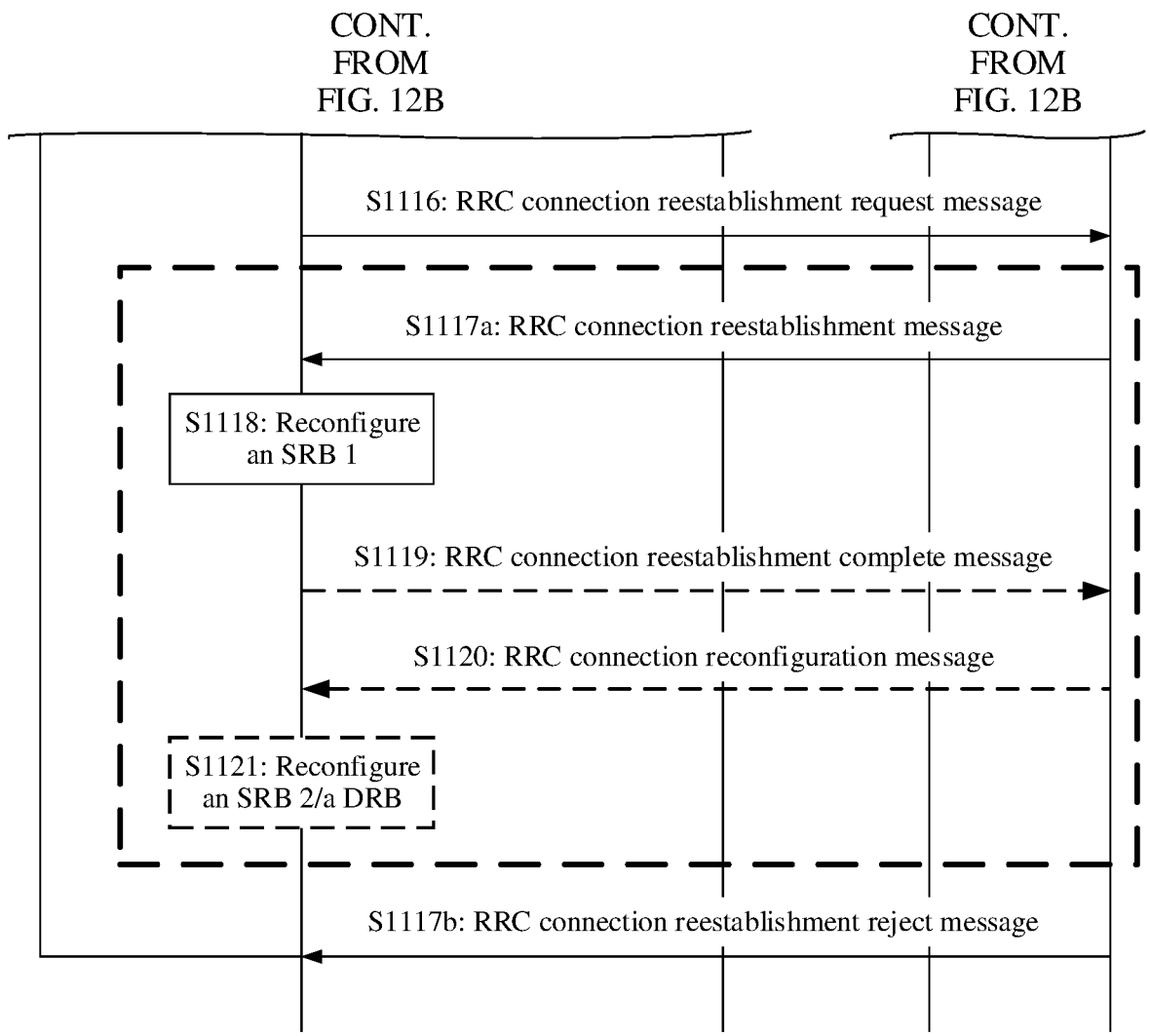

Specifically, with reference to FIG. 11A to FIG. 11C, as shown in FIG. 12A to FIG. 12C, between S1115 and S1116, the connection reestablishment method provided in this embodiment of this application further includes S1201. S1201 is as follows.

S1201: The terminal device determines whether the reselected base station is connected to the source core network.

When the reselected base station is connected to the source core network, the reselected base station can provide a connection to the source core network. When the reselected base station has the context of the terminal device, the reselected base station may perform check based on the obtained context of the terminal device. If the check succeeds, the reselected base station may receive the reestablishment request of the terminal device. Therefore, when the reselected base station is connected to the source core network, the terminal device performs S1116.

When the reselected base station is not connected to the source core network, the reselected base station cannot support RRC connection reestablishment of the terminal device. Therefore, after determining that the reselected base station is not connected to the source core network, the terminal device leaves the connected mode, and sends the connection release indication to the upper layer, that is, performs S1108.

Optionally, in the connection reestablishment method provided in this application, the suitable cell may be further redefined. The suitable cell is redefined as a cell that can be connected to the source core network or connected to a core network of a same type as the source core network. In other words, the first cell determined by the terminal device is a cell that can be connected to the source core network or connected to the core network of the same type as the source core network. In this way, when the RAT of the first cell is the same as the RAT of the source cell, after the terminal device sends the RRC connection reestablishment request message to the reselected base station, the reselected base station sends the RRC connection reestablishment message rather than the RRC connection reestablishment reject message to the terminal device.

Figure 13A:
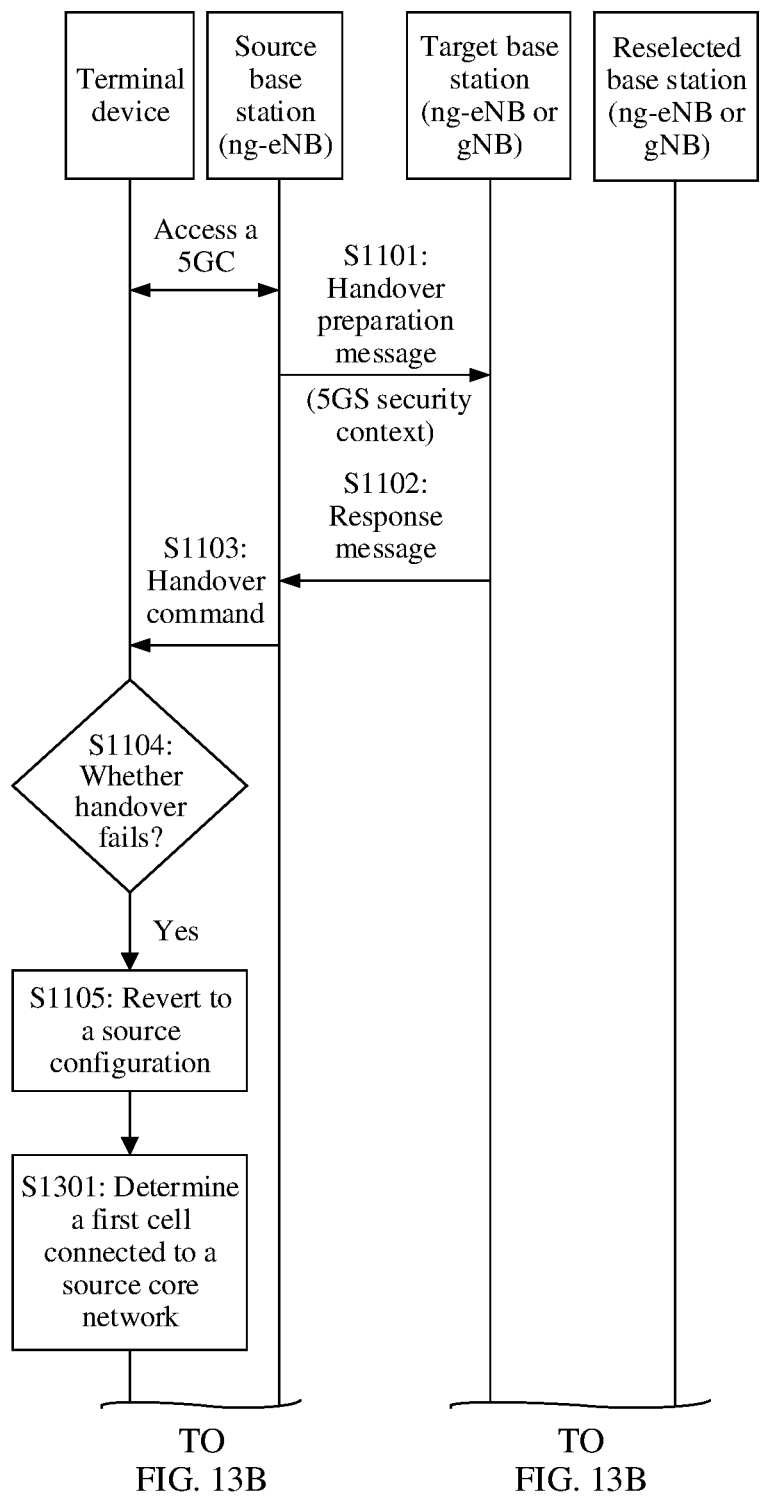
FIG. 13A to FIG. 13C are a schematic flowchart 9 of a connection reestablishment method according to an embodiment of this application.
Figure 13B:
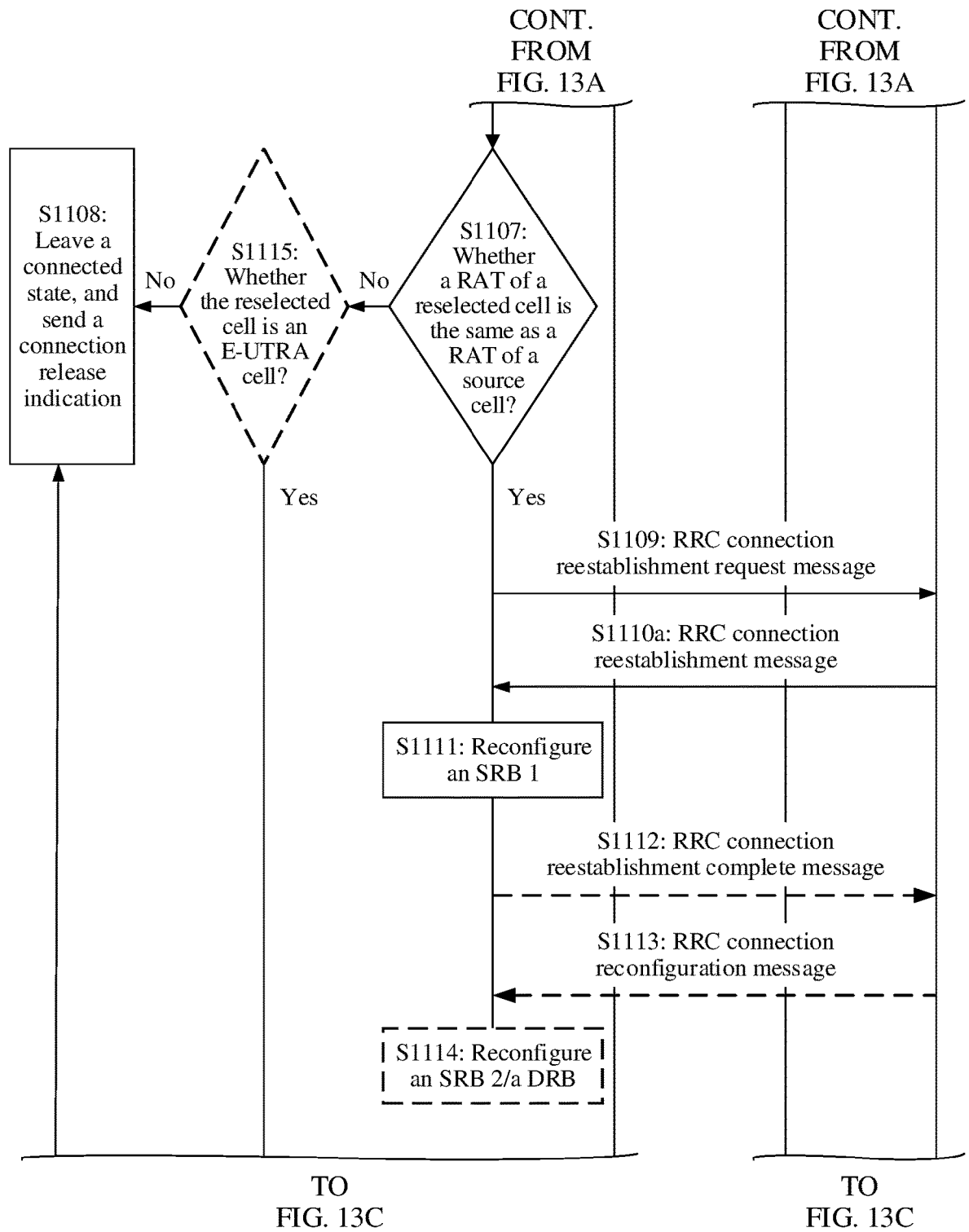
Figure 13C:
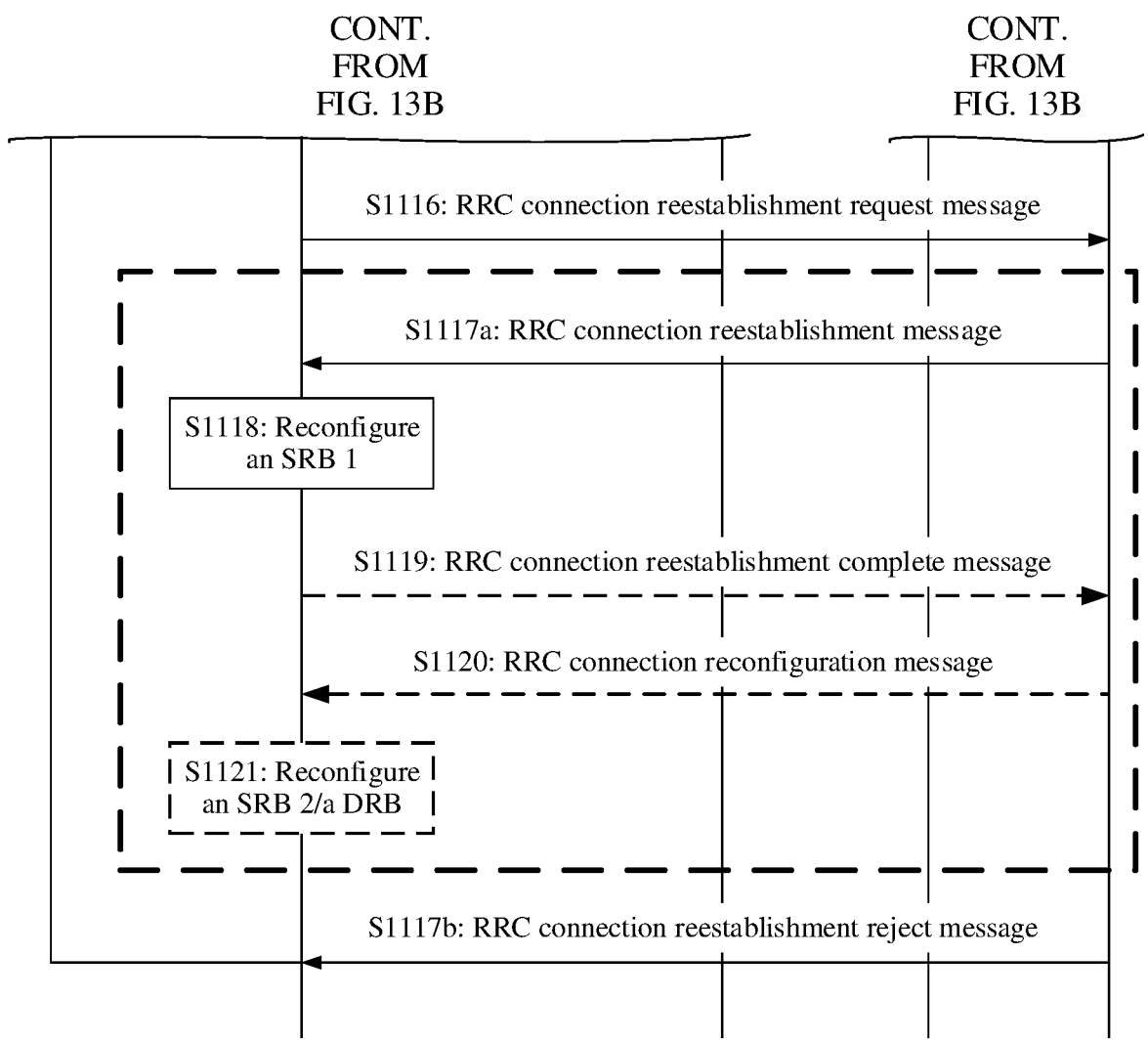

With reference to FIG. 11A to FIG. 11C, FIG. 13A to FIG. 13C show a procedure of a connection reestablishment method in a scenario in which a suitable (suitable) cell is redefined. As shown in FIG. 13A to FIG. 13C, in the connection reestablishment method, S1106 in FIG. 11A is replaced with S1301. S1301 is as follows:

S1301: The terminal device starts a second timer, performs cell reselection, and determines a first cell connected to the source core network.

It can be learned that, in this embodiment of this application, after the handover fails, the terminal device not only determines whether the RAT of the first cell is the same as the RAT of the source cell, but also determines whether the first cell is connected to the source core network. The terminal device determines, based on all determining results, whether to send the RRC connection reestablishment request message to the reselected base station, thereby effectively increasing a probability of resuming an RRC connection by the terminal device, and reducing signaling exchange.

It should be noted that, for the implementations shown in FIG. 11A to FIG. 11C, FIG. 12A to FIG. 12C, and FIG. 13A to FIG. 13C, steps S1101 to S1104 are steps in a handover scenario, and may be used as optional steps. The solution in steps S1105 to S1121, S1201, and S1301 may be applicable to a common RRC connection reestablishment procedure, and a trigger condition of the RRC connection reestablishment procedure may be a handover failure, a radio link failure, an RRC reconfiguration failure, an integrity check failure, or the like.

An embodiment of this application provides a connection reestablishment apparatus. The connection reestablishment apparatus is a terminal device or a chip in a terminal device. The connection reestablishment apparatus is configured to perform the steps performed by the terminal device in the foregoing connection reestablishment methods. The connection reestablishment apparatus provided in this embodiment of this application may include modules corresponding to corresponding steps.

In this embodiment of this application, the connection reestablishment apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, division into the modules is an example, and is merely a logical function division. In actual implementation, another division manner may be used.

Figure 14:
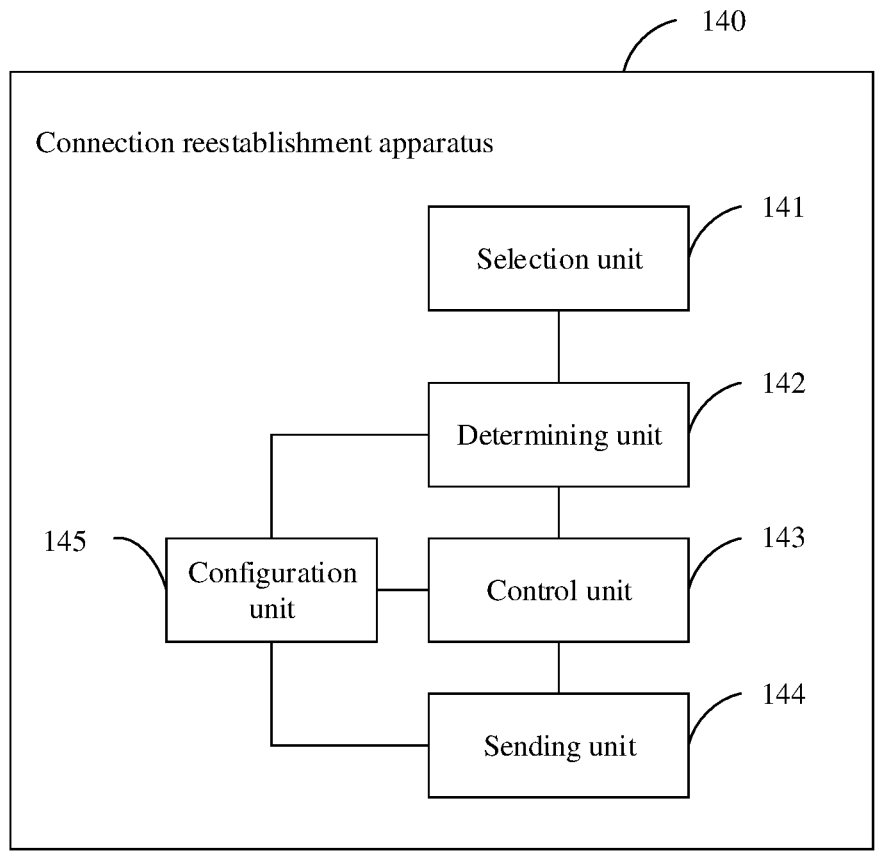
FIG. 14 is a schematic structural diagram 1 of a connection reestablishment apparatus according to an embodiment of this application.

When each functional module is obtained through division based on each corresponding function, FIG. 14 is a possible schematic structural diagram of a connection reestablishment apparatus 140. As shown in FIG. 14, the connection reestablishment apparatus 140 includes a selection unit 141, a determining unit 142, a control unit 143, a sending unit 144, and a configuration unit 145. The selection unit 141 is configured to support the connection reestablishment apparatus 140 in performing S506, S806, and S1106 in the foregoing embodiments, and/or is configured to perform another process of the technology described in this specification. The determining unit 142 is configured to support the connection reestablishment apparatus 140 in performing S507, S515, S601, S701, S804, S807, S901, S1001, S1104, S1107, S1115, S1201, and S1301 in the foregoing embodiments, and/or is configured to perform another process of the technology described in this specification. The control unit 143 is configured to support the connection reestablishment apparatus 140 in performing S508, S808, and S1108 in the foregoing embodiments, and/or is configured to perform another process of the technology described in this specification. The sending unit 144 is configured to support the connection reestablishment apparatus 140 in performing S509, S512, S516, S519, S809, S812, S1109, S1112, S1116, and S1119 in the foregoing embodiments, and/or is configured to perform another process of the technology described in this specification. The configuration unit 145 is configured to support the connection reestablishment apparatus 140 in performing S511, S514, S518, S521, S811, S814, S1111, S1114, S1118, and S1121 in the foregoing embodiments, and/or is configured to perform another process of the technology described in this specification. Certainly, the connection reestablishment apparatus 140 provided in this embodiment of this application includes but is not limited to the foregoing modules. For example, the connection reestablishment apparatus 140 may further include a storage unit. The storage unit may be configured to store program code of the connection reestablishment apparatus 140. All related content of the steps in the foregoing method embodiments may be cited in function descriptions of corresponding functional modules. Details are not described herein again.

The selection unit 141, the determining unit 142, the control unit 143, and the configuration unit 145 may be the processor 301 in FIG. 3, the sending unit 144 may be the antenna in FIG. 3, and the storage unit may be the memory 303 in FIG. 3.

When the connection reestablishment apparatus 140 runs, the connection reestablishment apparatus 140 performs the steps of the terminal device in the connection reestablishment method in the embodiment shown in any one of FIG. 5A to FIG. 13C.

Another embodiment of this application further provides a computer-readable storage medium. The computer-readable storage medium stores an instruction. When the instruction is run on the connection reestablishment apparatus 140, the connection reestablishment apparatus 140 performs the steps of the terminal device in the connection reestablishment method in the embodiment shown in any one of FIG. 5A to FIG. 13C.

In another embodiment of this application, a computer program product is further provided. The computer program product includes a computer-executable instruction, and the computer-executable instruction is stored in a computer-readable storage medium. At least one processor of the connection reestablishment apparatus 140 may read the computer-executable instruction from the computer-readable storage medium, and the at least one processor executes the computer-executable instruction, so that the connection reestablishment apparatus 140 performs the steps of the terminal device in the connection reestablishment method in the embodiment shown in any one of FIG. 5A to FIG. 13C.

In another embodiment of this application, a chip is further provided. The chip may include one or more processors, a memory, and a communications bus. The memory is configured to store one or more computer instructions. The one or more processors are connected to the memory through the communications bus. When the chip runs, the one or more processors execute the one or more computer instructions stored in the memory, so that the chip performs the connection reestablishment method in the embodiment shown in any one of FIG. 5A to FIG. 13C.

An embodiment of this application provides a connection reestablishment apparatus. The connection reestablishment apparatus may be a radio access network device or a chip in a radio access network device. The connection reestablishment apparatus is configured to perform the steps performed by the reselected base station in the foregoing connection reestablishment methods. The connection reestablishment apparatus provided in this embodiment of this application may include modules corresponding to corresponding steps.

In this embodiment of this application, the connection reestablishment apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, division into the modules is an example, and is merely a logical function division. In actual implementation, another division manner may be used.

Figure 15:
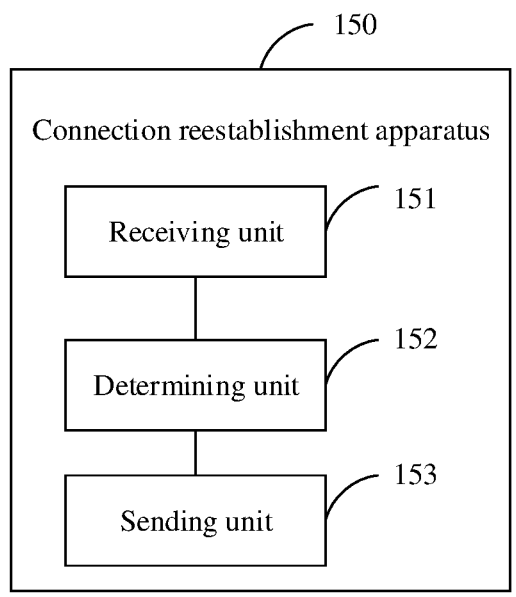
FIG. 15 is a schematic structural diagram 2 of a connection reestablishment apparatus according to an embodiment of this application.

When each functional module is obtained through division based on each corresponding function, FIG. 15 is a possible schematic structural diagram of a connection reestablishment apparatus 150 according to an embodiment of this application. As shown in FIG. 15, the connection reestablishment apparatus 150 includes a receiving unit 151, a determining unit 152, and a sending unit 153. The receiving unit 151 is configured to indicate the connection reestablishment apparatus 150 to perform S509, S512, S516, S519, S809, S812, S1109, S1112, S1116, and S1119 in the foregoing embodiments, and/or is configured to perform another process of the technology described in this specification. The determining unit 152 is configured to support the connection reestablishment apparatus 150 in performing "determining whether to accept establishment of a connection to an access network by a terminal device", and/or is configured to perform another process of the technology described in this specification. The sending unit 153 is configured to support the connection reestablishment apparatus 150 in performing S510a, S510b, S513, S517, S520, S810a, S810b, S813, S1110a, S1110b, S1113, S1117, and S1120 in the foregoing embodiments, and/or is configured to perform another process of the technology described in this specification. All related content of the steps in the foregoing method embodiments may be cited in function descriptions of corresponding functional modules. Details are not described herein again. Certainly, the connection reestablishment apparatus 150 provided in this embodiment of this application includes but is not limited to the foregoing modules. For example, the connection reestablishment apparatus 150 may further include a storage unit. The storage unit may be configured to store program code and data of the connection reestablishment apparatus 150.

The determining unit 152 may be the processor 41 in FIG. 4, the receiving unit 151 and the sending unit 153 may be the transceiver 43 in FIG. 4, and the storage unit may be the memory 42 in FIG. 4.

Another embodiment of this application further provides a computer-readable storage medium. The computer-readable storage medium includes one or more pieces of program code, the one or more pieces of program code includes an instruction, and when a processor of the connection reestablishment apparatus 150 executes the program code, the connection reestablishment apparatus 150 performs the connection reestablishment method in the embodiment shown in any one of FIG. 5A to FIG. 13C.

In another embodiment of this application, a computer program product is further provided. The computer program product includes a computer-executable instruction, and the computer-executable instruction is stored in a computer-readable storage medium. At least one processor of the connection reestablishment apparatus 150 may read the computer-executable instruction from the computer-readable storage medium, and the at least one processor executes the computer-executable instruction, so that the connection reestablishment apparatus 150 performs the steps of the reselected base station in the connection reestablishment method in the embodiment shown in any one of FIG. 5A to FIG. 13C.

In another embodiment of this application, a chip is further provided. The chip may include one or more processors, a memory, and a communications bus. The memory is configured to store one or more computer instructions. The one or more processors are connected to the memory through the communications bus. When the chip runs, the one or more processors execute the one or more computer instructions stored in the memory, so that the chip performs the connection reestablishment method in the embodiment shown in any one of FIG. 5A to FIG. 13C.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data terminal device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions about implementations allow a person skilled in the art to understand that, for the purpose of convenient and brief description, division of the foregoing functional modules is taken as an example for illustration. During actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   selecting, by a terminal device, a first cell;
   when a radio access technology (RAT) of the first cell is the same as a RAT of a source cell, determining whether the first cell is connected to a source core network accessed in the source cell by the terminal device; and
   when it is determined that the first cell is connected to the source core network, performing the following:

sending, by the terminal device, a first message to a reselected radio access network device, wherein the first message requests to reestablish a radio resource control (RRC) connection between the terminal device and an access network, and the reselected radio access network device is a radio access network device to which the first cell belongs; and receiving, by the terminal device, a second message sent by the reselected radio access network device, wherein the second message indicates to the terminal device to establish a connection to the reselected radio access network device.

2. The method according to claim 1, wherein before sending the first message to the reselected radio access network device, the method further comprises:

retaining, by the terminal device, a security configuration used in the source cell, wherein the security configuration comprises at least one of an RRC integrity protection key or an RRC integrity protection algorithm.

3. The method according to claim 1, wherein before sending the first message to the reselected radio access network device, the method further comprises:

performing, at least one of the following actions:
resetting a media access control (MAC) entity;
retaining a source service data adaptation protocol (SDAP) entity corresponding to a data radio bearer (DRB);
retaining a source packet data convergence protocol (PDCP) entity corresponding to a signaling radio bearer (SRB); or
retaining a source PDCP entity corresponding to a DRB.

4. The method according to claim 3, wherein after receiving the second message sent by the reselected radio access network device, the method further comprises:

when the terminal device has retained a source PDCP entity of a first signaling radio bearer (SRB 1), reestablishing, by the terminal device, the PDCP entity of the SRB 1.

5. The method according to claim 1, wherein selecting the first cell comprises:

determining, by the terminal device, a to-be-selected cell connected to a source core network, as the first cell.

6. An apparatus, comprising:
at least one processor; and
a non-transitory memory storing instructions for execution by the at least one processor;
wherein, when executed, the instructions cause the apparatus to perform operations comprising:
selecting a first cell;
when a radio access technology (RAT) of the first cell is the same as a RAT of a source cell, determine whether the first cell is connected to a source core network accessed in the source cell by the apparatus; and
when it is determined that the first cell is connected to the source core network, perform the following:
sending a first message to a reselected radio access network device, wherein the first message requests to reestablish a radio resource control (RRC) connection between a terminal device and an access network, the reselected radio access network device is a radio access network device to which the first cell belongs, and the apparatus is applied to the terminal device; and receiving a second message sent by the reselected radio access network device, wherein the second message indicates to the terminal device to establish a connection to the reselected radio access network device.

7. The apparatus according to claim 6, wherein, when executed, the instructions cause the apparatus to perform operations further comprising:

before sending the first message to the reselected radio access network device, retaining a security configuration used in the source cell, wherein the security configuration comprises at least one of an RRC integrity protection key or an RRC integrity protection algorithm.

8. The apparatus according to claim 6, wherein, when executed, the instructions cause the apparatus to perform operations further comprising:

before sending the first message to the reselected radio access network device, performing at least one of the following actions:
resetting a media access control (MAC) entity;
retaining a source service data adaptation protocol (SDAP) entity corresponding to a data radio bearer (DRB);
retaining a source packet data convergence protocol (PDCP) entity corresponding to a signaling radio bearer (SRB); or
retaining a source PDCP entity corresponding to a DRB.

9. The apparatus according to claim 6, wherein, when executed, the instructions cause the apparatus to perform operations further comprising:

after receiving the second message sent by the reselected radio access network device, and when the terminal device has retained a source packet data convergence protocol (PDCP) entity of a first signaling radio bearer (SRB 1), reestablishing the PDCP entity of the SRB 1.

10. The apparatus according to claim 6, wherein selecting the first cell comprises:

determining a to-be-selected cell connected to a source core network as the first cell.

11. A non-transitory memory storage medium comprising computer-executable instructions that, when executed, cause a device to:

select a first cell;
when a radio access technology (RAT) of the first cell is the same as a RAT of a source cell, determine whether the first cell is connected to a source core network accessed in the source cell by the device; and
when it is determined that the first cell is connected to the source core network, perform the following:
send a first message to a reselected radio access network device, wherein the first message requests to reestablish a radio resource control (RRC) connection between a terminal device and an access network, and the reselected radio access network device is a radio access network device to which the first cell belongs; and
receive a second message sent by the reselected radio access network device, wherein the second message indicates to the terminal device to establish a connection to the reselected radio access network device.

12. The non-transitory memory storage medium according to claim 11, wherein the instructions, when executed, further cause the device to:

before sending the first message to the reselected radio access network device, retain a security configuration used in the source cell, wherein the security configuration comprises at least one of an RRC integrity protection key or an RRC integrity protection algorithm.

13. The non-transitory memory storage medium according to claim 11, wherein the instructions, when executed, further cause the device to:
before sending the first message to the reselected radio access network device, perform at least one of the following actions:
resetting a media access control (MAC) entity;
retaining a source service data adaptation protocol (SDAP) entity corresponding to a data radio bearer (DRB);
retaining a source packet data convergence protocol (PDCP) entity corresponding to a signaling radio bearer (SRB); or
retaining a source PDCP entity corresponding to a DRB.

14. The non-transitory memory storage medium according to claim 13, wherein the instructions, when executed, further cause the device to:
after receiving the second message sent by the reselected radio access network device, and when the terminal device has retained a source PDCP entity of a first signaling radio bearer (SRB 1), reestablish the PDCP entity of the SRB 1.

15. The non-transitory memory storage medium according to claim 13, wherein selecting the first cell comprises:
determining a to-be-selected cell connected to a source core network as the first cell.

* * * * *